(12) United States Patent
Ko et al.

(10) Patent No.: US 9,154,290 B2
(45) Date of Patent: *Oct. 6, 2015

(54) APPARATUS FOR TRANSMITTING AND RECEIVING A SIGNAL AND METHOD OF TRANSMITTING AND RECEIVING A SIGNAL

(75) Inventors: Woo Suk Ko, Seoul (KR); Sang Chul Moon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 621 days.

This patent is subject to a terminal disclaimer.

(21) Appl. No.: 12/747,685

(22) PCT Filed: Dec. 11, 2008

(86) PCT No.: PCT/KR2008/007346
§ 371 (c)(1),
(2), (4) Date: Sep. 28, 2010

(87) PCT Pub. No.: WO2009/075539
PCT Pub. Date: Jun. 18, 2009

(65) Prior Publication Data
US 2011/0019753 A1 Jan. 27, 2011

Related U.S. Application Data

(60) Provisional application No. 61/013,298, filed on Dec. 12, 2007, provisional application No. 61/013,643, filed on Dec. 14, 2007, provisional application No. 61/015,194, filed on Dec. 19, 2007.

(30) Foreign Application Priority Data

Dec. 8, 2008 (KR) .......................... 10-2008-0124330
Dec. 8, 2008 (KR) .......................... 10-2008-0124332

(51) Int. Cl.
*H04J 1/00* (2006.01)
*H04L 5/26* (2006.01)
(Continued)

(52) U.S. Cl.
CPC ................ *H04L 5/26* (2013.01); *H04L 5/0053* (2013.01); *H04L 27/265* (2013.01); *H04L 27/2607* (2013.01); *H04L 27/2662* (2013.01); *H04W 56/005* (2013.01)

(58) Field of Classification Search
CPC ..... H04L 5/0053; H04L 5/26; H04L 27/2657; H04L 27/2662; H04L 27/2607; H04W 56/005
USPC ......... 370/208, 252, 295, 335, 342, 343, 349, 370/389, 344; 375/342
See application file for complete search history.

(56) References Cited

U.S. PATENT DOCUMENTS 6,064,662 A 5/2000 Gitlin et al.
7,248,841 B2 7/2007 Agee et al.
(Continued)

FOREIGN PATENT DOCUMENTS

CN 1253454 5/2000
CN 1572080 A 1/2005
(Continued)

OTHER PUBLICATIONS

Jokeia et al., L1 signaling parameter definition and signaling transmission in T2, Nokia Nov. 2, 2007.*
(Continued)

*Primary Examiner* — Mang Yeung
(74) *Attorney, Agent, or Firm* — Lee, Hong, Degerman, Kang & Waimey

(57) ABSTRACT

A method of transmitting and receiving a signal and an apparatus for transmitting and receiving a signal are disclosed. The method includes receiving the signal of a first frequency band, obtaining layer-1 information from a preamble of the first time-frequency slicing (TFS) signal frame of the received signal, said layer-1 information including a radio frequency (RF) channel identifier of a first TFS signal frame including the PLP in a super frame of TFS structure, and an identifier of a starting radio frequency (RF) channel which can receive the PLP in the TFS signal frame, parsing the TFS signal frame using the layer-1 information and obtaining a physical layer pipe (PLP) of the TFS signal frame, and converting the PLP to a service stream.

4 Claims, 60 Drawing Sheets

(51) Int. Cl.
*H04L 5/00* (2006.01)
*H04L 27/26* (2006.01)
*H04W 56/00* (2009.01)

(56) References Cited

U.S. PATENT DOCUMENTS

| | | | |
|---|---|---|---|
| 7,423,984 | B2 | 9/2008 | Hasegawa et al. |
| 8,493,912 | B2 * | 7/2013 | Ko et al. ........ 370/328 |
| 2004/0110510 | A1 | 6/2004 | Jeon et al. |
| 2004/0151145 | A1 * | 8/2004 | Hammerschmidt ...... 370/338 |
| 2004/0165564 | A1 | 8/2004 | Kim et al. |
| 2004/0185853 | A1 | 9/2004 | Kim et al. |
| 2004/0233838 | A1 | 11/2004 | Sudo et al. |
| 2005/0233716 | A1 | 10/2005 | Laroia et al. |
| 2006/0221810 | A1 | 10/2006 | Vreelj et al. |
| 2007/0098045 | A1 | 5/2007 | Cameron |
| 2009/0067384 | A1 | 3/2009 | Himmanen et al. |
| 2009/0094356 | A1 * | 4/2009 | Vare .............. 709/223 |
| 2009/0103649 | A1 * | 4/2009 | Vare et al. ............ 375/295 |
| 2009/0245399 | A1 | 10/2009 | Lee et al. |

FOREIGN PATENT DOCUMENTS

| | | |
|---|---|---|
| CN | 101064578 A | 10/2007 |
| EP | 0680168 | 11/1995 |
| EP | 1037443 | 9/2000 |
| EP | 1850547 | 10/2007 |
| EP | 2031786 | 6/2012 |
| JP | 2000269920 | 9/2000 |
| KR | 20040037790 | 5/2004 |
| KR | 10-2006-0082744 | 7/2006 |
| KR | 10-2006-0106910 | 10/2006 |
| KR | 10-2007-0061209 | 6/2007 |
| RU | 2006117781 | 11/2001 |
| RU | 2266623 | 12/2005 |
| RU | 2006110517 | 10/2007 |
| WO | 2006131797 | 12/2006 |
| WO | 2007-083947 | 7/2007 |
| WO | 2008/110886 | 9/2008 |
| WO | 2009/031109 | 3/2009 |

OTHER PUBLICATIONS

M.J. Karol et al., "Performance Advantages of Time-Frequency-Sliced Systems," 6th IEEE International Symposium on Personal, Indoor and Mobile Radio Communications (PIMRC), Sep. 1995, XP-009106818.

M.J. Karol et al., "Time-Frequency-Code Slicing: Efficiently Allocating the Communications Spectrum to Multirate Users," IEEE Transactions on Vehicular Technology, vol. 46, No. 4, Nov. 1997.
H. Himmanen, "Evolution of DVB-H and DVB-T2 standards," DTV Group (University of Turku), Nov. 2007, pp. 14-19.
European Telecommunications Standards Institute (ETSI), "Digital Video Broadcasting (DVB); Second Generation Framing Structure, Channel Coding and Modulation Systems for Broadcasting, Interactive Services, News Gathering and Other Broadband Satellite Applications," ETSI EN 302 307 v1.1.2, Jun. 2006, pp. 11-13, 27-32.
European Telecommunications Standards Institute (ETSI), "Digital Video Broadcasting (DVB); Framing Structure, Channel Coding and Modulation for Digital Terrestrial Television," ETSI EN 300 744 v1.6.1, Jan. 2009.
W. Zhang et al., "Space-Time/Frequency Coding for MIMO-OFDM in Next Generation Broadband Wireless Systems," IEEE Wireless Communications, vol. 14, No. 3, Jun. 2007.
British Broadcasting Corporation (BBC), et al., "DVB-T2 Concept," XP-017817443, Jun. 2007.
Nokia et al., "DVB-T2 concept," Jun. 2006.
Nokia et al., "L1 Signaling Parameter Definition and Signaling Transmission in T2," Nov. 2007.
ETSI, "Digital Video Broadcasting (DVB); DVB Specification for Data Broadcasting", ETSI EN 301 192, V1.4.1, Nov. 2004.
U.S. Appl. No. 12/747,165, Final Office Action dated Jan. 7, 2013, 22 pages.
BBC et al., "DVB-T2 Concept" 74 pages, Jun. 2007.
Draft Standard for DVB-T2 Baseline 0.2.5, "DVB-TM-T2 Baseline Description Version 0.2.5", 1 page, Feb. 2008.
Draft Standard for DVB-T2 Baseline 0.5.6, "Draft DVB-T2 Specification Version 0.5.6.", 1 page, Mar. 2008.
Tero Jokela et al., "L1 signaling parameter definition and signaling transmission in T2", 22 pages, Feb. 2007.
BBC et al., "DVB-T2 concept", Presentation at TM-T2 meeting in Helsinki, 38 pages, Jun. 2007.
Digital Video Broadcasting (DVB), Frame structure channel coding and modulation for a second generation digital terrestrial television broadcasting system (DVB-T2), DVB Document A122, 158 pages, Jun. 2008.
Declaration of Chris Nokes, 126 pages, Aug. 2012.
Declaration of Pekka Talmola, 126 pages, Aug. 2012.
Declaration of Erik Stare, 126 pages, Aug. 2012.
Declaration of Dr. Samuel Asangbeng Atungsiri, 136 pages, Aug. 2012.
Digital Video Broadcasting (DVB), "Call for Technologies", v 0.15, DVB TM-T2 0139r2, TM 3719r3, 12 pages, Mar. 2007.
European Patent Office Application Serial No. 08171386.9, Office Action dated Dec. 14, 2012, 32 pages.

* cited by examiner

| RF 1 | RF 2 | RF 3 | RF 4 |
|---|---|---|---|
| 17 | 12 | 7 | Service 2 |
| 16 | 11 | 6 | Service 2 |
| 15 | 10 | 5 | Service 1 |
| 14 | 9 | 4 | Service 1 |
| 13 | 8 | Service 3 | Service 1 |
| 12 | 7 | Service 2 | 17 |
| 11 | 6 | Service 2 | 16 |
| 10 | 5 | Service 1 | 15 |
| 9 | 4 | Service 1 | 14 |
| 8 | Service 3 | Service 1 | 13 |
| 7 | Service 2 | 17 | 12 |
| 6 | Service 2 | 16 | 11 |
| 5 | Service 1 | 15 | 10 |
| 4 | Service 1 | 14 | 9 |
| Service 3 | Service 1 | 13 | 8 |
| Service 2 | 17 | 12 | 7 |
| Service 2 | 16 | 11 | 6 |
| Service 1 | 15 | 10 | 5 |
| Service 1 | 14 | 9 | 4 |
| Service 1 | 13 | 8 | Service 3 |
| P2 | P2 | P2 | P2 |
| P1 | P1 | P1 | P1 |

Time (not in scale)

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 1 | 64800 | 0 | 8100 | 0 | 8100 | 8 |
| Hyb 128-QAM | 3/5 | 38880 | 25920 | 4860 | 4320 | 9180 | 7.0588 |
| 64-QAM | 1 | 64800 | 0 | 10800 | 0 | 10800 | 6 |
| Hyb 32-QAM | 3/5 | 38880 | 25920 | 6480 | 6480 | 12960 | 5 |
| 16-QAM | 1 | 64800 | 0 | 16200 | 0 | 16200 | 4 |
| Hyb 8-QAM | 2/3 | 43200 | 21600 | 10800 | 10800 | 21600 | 3 |
| QPSK | 1 | 64800 | 0 | 32400 | 0 | 32400 | 2 |

Fig. 9

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 1 | 16200 | 0 | 2025 | 0 | 2025 | 8 |
| Hyb 128-QAM | 3/5 | 9720 | 6480 | 1215 | 1080 | 2295 | 7.0588 |
| 64-QAM | 1 | 16200 | 0 | 2700 | 0 | 2700 | 6 |
| Hyb 32-QAM | 3/5 | 9720 | 6480 | 1620 | 1620 | 3240 | 5 |
| 16-QAM | 1 | 16200 | 0 | 4050 | 0 | 4050 | 4 |
| Hyb 8-QAM | 2/3 | 10800 | 5400 | 2700 | 2700 | 5400 | 3 |
| QPSK | 1 | 16200 | 0 | 8100 | 0 | 8100 | 2 |

Fig. 10

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 8/9 | 57600 | 7200 | 7200 | 1200 | 8400 | 7.714285714 |
| Hyb 128-QAM | 4/9 | 28800 | 36000 | 3600 | 6000 | 9600 | 6.75 |
| 64-QAM | 1 | 64800 | 0 | 10800 | 0 | 10800 | 6 |
| Hyb 32-QAM | 5/9 | 36000 | 28800 | 6000 | 7200 | 13200 | 4.909090909 |
| 16-QAM | 1/9 | 7200 | 57600 | 1200 | 14400 | 15600 | 4.153846154 |
| Hyb 8-QAM | 2/3 | 43200 | 21600 | 10800 | 10800 | 21600 | 3 |
| QPSK | 1 | 64800 | 0 | 32400 | 0 | 32400 | 2 |

| | GCD | 1200 |
|---|---|---|

Fig. 11

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 4/5 | 51840 | 12960 | 6480 | 2160 | 8640 | 7.5 |
| Hyb 128-QAM | 8/15 | 34560 | 30240 | 4320 | 5040 | 9360 | 6.923076923 |
| 64-QAM | 1 | 64800 | 0 | 10800 | 0 | 10800 | 6 |
| Hyb 32-QAM | 3/5 | 38880 | 25920 | 6480 | 6480 | 12960 | 5 |
| 16-QAM | 1/15 | 4320 | 60480 | 720 | 15120 | 15840 | 4.090909091 |
| Hyb 8-QAM | 2/3 | 43200 | 21600 | 10800 | 10800 | 21600 | 3 |
| QPSK | 1 | 64800 | 0 | 32400 | 0 | 32400 | 2 |
| | | | | | GCD | 720 | |

Fig. 12

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 44/45 | 63360 | 1440 | 7920 | 240 | 8160 | 7.941176471 |
| Hyb 128-QAM | 28/45 | 40320 | 24480 | 5040 | 4080 | 9120 | 7.105263158 |
| 64-QAM | 1 | 64800 | 0 | 10800 | 0 | 10800 | 6 |
| Hyb 32-QAM | 3/5 | 38880 | 25920 | 6480 | 6480 | 12960 | 5 |
| 16-QAM | 1/15 | 4320 | 60480 | 720 | 15120 | 15840 | 4.090909091 |
| Hyb 8-QAM | 2/3 | 43200 | 21600 | 10800 | 10800 | 21600 | 3 |
| QPSK | 1 | 64800 | 0 | 32400 | 0 | 32400 | 2 |
| | | | | | GCD | 240 | |

Fig. 13

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 8/9 | 14400 | 1800 | 1800 | 300 | 2100 | 7.714285714 |
| Hyb 128-QAM | 4/9 | 7200 | 9000 | 900 | 1500 | 2400 | 6.75 |
| 64-QAM | 1 | 16200 | 0 | 2700 | 0 | 2700 | 6 |
| Hyb 32-QAM | 5/9 | 9000 | 7200 | 1500 | 1800 | 3300 | 4.909090909 |
| 16-QAM | 1/9 | 1800 | 14400 | 300 | 3600 | 3900 | 4.153846154 |
| Hyb 8-QAM | 2/3 | 10800 | 5400 | 2700 | 2700 | 5400 | 3 |
| QPSK | 1 | 16200 | 0 | 8100 | 0 | 8100 | 2 |
| | | | | | GCD | 300 | |

Fig. 14

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 4/5 | 12960 | 3240 | 1620 | 540 | 2160 | 7.5 |
| Hyb 128-QAM | 8/15 | 8640 | 7560 | 1080 | 1260 | 2340 | 6.923076923 |
| 64-QAM | 1 | 16200 | 0 | 2700 | 0 | 2700 | 6 |
| Hyb 32-QAM | 3/5 | 9720 | 6480 | 1620 | 1620 | 3240 | 5 |
| 16-QAM | 1/15 | 1080 | 15120 | 180 | 3780 | 3960 | 4.090909091 |
| Hyb 8-QAM | 2/3 | 10800 | 5400 | 2700 | 2700 | 5400 | 3 |
| QPSK | 1 | 16200 | 0 | 8100 | 0 | 8100 | 2 |
| | | | | | GCD | 180 | |

| bit/cell (exp.) | HOQ ratio | HOQ bits | LOQ bits | HOQ symbols | LOQ symbols | Total symbols | bit/cell |
|---|---|---|---|---|---|---|---|
| 256-QAM | 44/45 | 15840 | 360 | 1980 | 60 | 2040 | 7.941176471 |
| Hyb 128-QAM | 28/45 | 10080 | 6120 | 1260 | 1020 | 2280 | 7.105263158 |
| 64-QAM | 1 | 16200 | 0 | 2700 | 0 | 2700 | 6 |
| Hyb 32-QAM | 3/5 | 9720 | 6480 | 1620 | 1620 | 3240 | 5 |
| 16-QAM | 1/15 | 1080 | 15120 | 180 | 3780 | 3960 | 4.090909091 |
| Hyb 8-QAM | 2/3 | 10800 | 5400 | 2700 | 2700 | 5400 | 3 |
| QPSK | 1 | 16200 | 0 | 8100 | 0 | 8100 | 2 |
| | | | | | GCD | 60 | |

Fig. 20
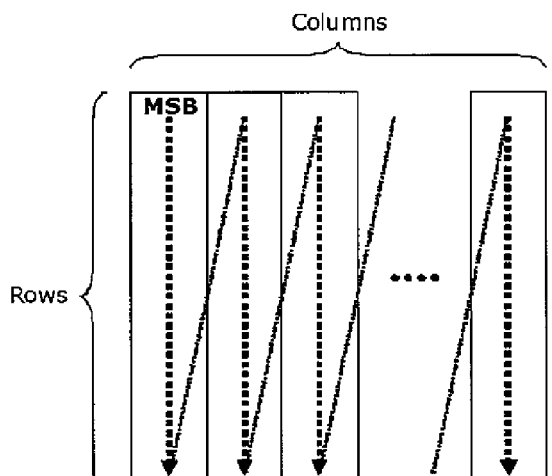
WRITE
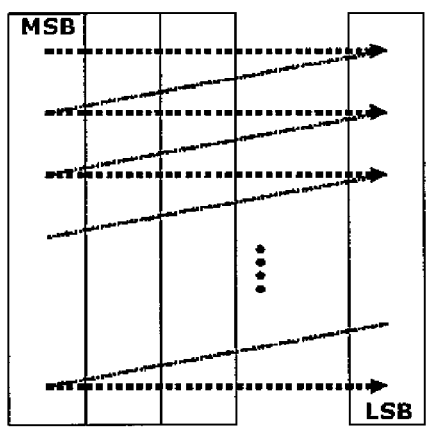
READ
Fig. 21
| QAM type | HOQ Rows | HOQ Columns | LOQ Rows | LOQ Columns |
|---|---|---|---|---|
| 256-QAM | 8100 | 8 | | |
| Hyb 128-QAM | 4860 | 8 | 4320 | 6 |
| 64-QAM | 10800 | 6 | | |
| Hyb 32-QAM | 6480 | 6 | 6480 | 4 |
| 16-QAM | 16200 | 4 | | |
| Hyb 8-QAM | 10800 | 4 | 10800 | 2 |
| 4-QAM | 32400 | 2 | | |

Fig. 22
| QAM type | HOQ Rows | HOQ Columns | LOQ Rows | LOQ Columns |
|---|---|---|---|---|
| 256-QAM | 2025 | 8 | | |
| Hyb 128-QAM | 1215 | 8 | 1080 | 6 |
| 64-QAM | 2700 | 6 | | |
| Hyb 32-QAM | 1620 | 6 | 1620 | 4 |
| 16-QAM | 4050 | 4 | | |
| Hyb 8-QAM | 2700 | 4 | 2700 | 2 |
| 4-QAM | 8100 | 2 | | |
Fig. 23
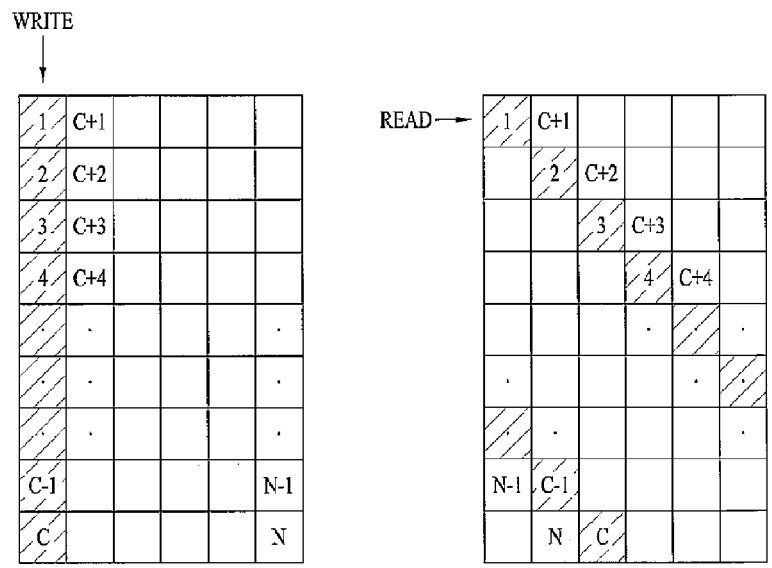
Fig. 24
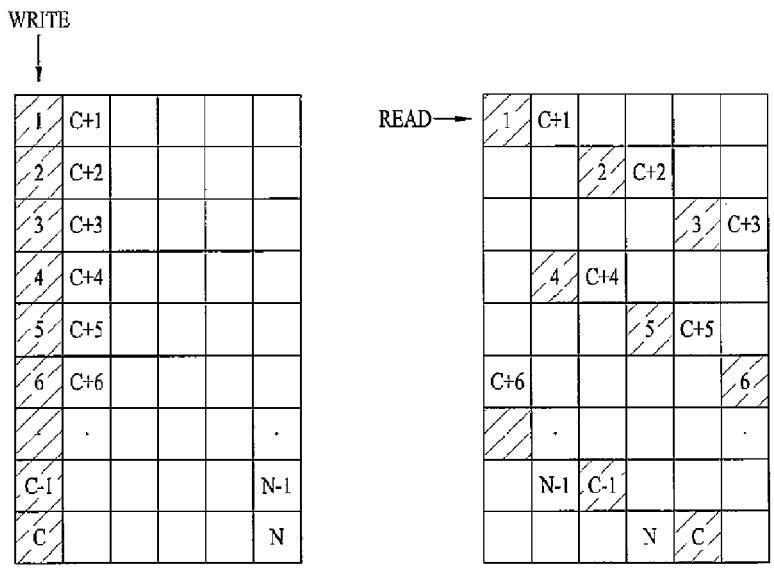

Fig. 27

| QPSK |
|---|
| b 0 maps to y0,0 |
| b 0 maps to y1,0 |

| 16-QAM |
|---|
| b 0 maps to y2,0 |
| b 1 maps to y3,0 |
| b 2 maps to y0,0 |
| b 3 maps to y1,0 |

| 64-QAM |
|---|
| b 0 maps to y4,0 |
| b 1 maps to y5,0 |
| b 2 maps to y2,0 |
| b 3 maps to y3,0 |
| b 4 maps to y0,0 |
| b 5 maps to y1,0 |

| 256-QAM |
|---|
| b 0 maps to y6,0 |
| b 1 maps to y7,0 |
| b 2 maps to y4,0 |
| b 3 maps to y5,0 |
| b 4 maps to y2,0 |
| b 5 maps to y3,0 |
| b 6 maps to y0,0 |
| b 7 maps to y1,0 |

Fig. 28

| Type | 1st type | 2nd type | 3rd type | 4th type | 5th type | 6th type |
|---|---|---|---|---|---|---|
| QPSK | $b_{1,0}$ maps to $y_{0,0}$<br>$b_{1,1}$ maps to $y_{1,0}$ | $b_{1,0}$ maps to $y_{0,0}$<br>$b_{1,1}$ maps to $y_{1,0}$ | $b_{1,0}$ maps to $y_{0,0}$<br>$b_{1,1}$ maps to $y_{1,0}$ | $b_{1,0}$ maps to $y_{0,0}$<br>$b_{1,1}$ maps to $y_{1,0}$ | $b_{1,0}$ maps to $y_{0,0}$<br>$b_{1,1}$ maps to $y_{1,0}$ | $b_{1,0}$ maps to $y_{0,0}$<br>$b_{1,1}$ maps to $y_{1,0}$ |
| 16-QAM | $b_{1,0}$ maps to $y_{0,0}$<br>$b_{1,1}$ maps to $y_{2,0}$<br>$b_{1,2}$ maps to $y_{1,0}$<br>$b_{1,3}$ maps to $y_{3,0}$ | $b_{1,0}$ maps to $y_{2,0}$<br>$b_{1,1}$ maps to $y_{0,0}$<br>$b_{1,2}$ maps to $y_{3,0}$<br>$b_{1,3}$ maps to $y_{1,0}$ | $b_{1,0}$ maps to $y_{0,0}$<br>$b_{1,1}$ maps to $y_{2,0}$<br>$b_{1,2}$ maps to $y_{3,0}$<br>$b_{1,3}$ maps to $y_{1,0}$ | $b_{1,0}$ maps to $y_{2,0}$<br>$b_{1,1}$ maps to $y_{0,0}$<br>$b_{1,2}$ maps to $y_{1,0}$<br>$b_{1,3}$ maps to $y_{3,0}$ | $b_{1,0}$ maps to $y_{2,0}$<br>$b_{1,1}$ maps to $y_{3,0}$<br>$b_{1,2}$ maps to $y_{0,0}$<br>$b_{1,3}$ maps to $y_{1,0}$ | $b_{1,0}$ maps to $y_{0,0}$<br>$b_{1,1}$ maps to $y_{1,0}$<br>$b_{1,2}$ maps to $y_{2,0}$<br>$b_{1,3}$ maps to $y_{3,0}$ |
| 64-QAM | $b_{1,0}$ maps to $y_{0,0}$<br>$b_{1,1}$ maps to $y_{2,0}$<br>$b_{1,2}$ maps to $y_{4,0}$<br>$b_{1,3}$ maps to $y_{1,0}$<br>$b_{1,4}$ maps to $y_{3,0}$<br>$b_{1,5}$ maps to $y_{5,0}$ | $b_{1,0}$ maps to $y_{4,0}$<br>$b_{1,1}$ maps to $y_{2,0}$<br>$b_{1,2}$ maps to $y_{0,0}$<br>$b_{1,3}$ maps to $y_{5,0}$<br>$b_{1,4}$ maps to $y_{3,0}$<br>$b_{1,5}$ maps to $y_{1,0}$ | $b_{1,0}$ maps to $y_{0,0}$<br>$b_{1,1}$ maps to $y_{2,0}$<br>$b_{1,2}$ maps to $y_{4,0}$<br>$b_{1,3}$ maps to $y_{5,0}$<br>$b_{1,4}$ maps to $y_{3,0}$<br>$b_{1,5}$ maps to $y_{1,0}$ | $b_{1,0}$ maps to $y_{4,0}$<br>$b_{1,1}$ maps to $y_{2,0}$<br>$b_{1,2}$ maps to $y_{0,0}$<br>$b_{1,3}$ maps to $y_{1,0}$<br>$b_{1,4}$ maps to $y_{3,0}$<br>$b_{1,5}$ maps to $y_{5,0}$ | $b_{1,0}$ maps to $y_{4,0}$<br>$b_{1,1}$ maps to $y_{5,0}$<br>$b_{1,2}$ maps to $y_{2,0}$<br>$b_{1,3}$ maps to $y_{3,0}$<br>$b_{1,4}$ maps to $y_{0,0}$<br>$b_{1,5}$ maps to $y_{1,0}$ | $b_{1,0}$ maps to $y_{0,0}$<br>$b_{1,1}$ maps to $y_{1,0}$<br>$b_{1,2}$ maps to $y_{2,0}$<br>$b_{1,3}$ maps to $y_{3,0}$<br>$b_{1,4}$ maps to $y_{4,0}$<br>$b_{1,5}$ maps to $y_{5,0}$ |
| 256-QAM | $b_{1,0}$ maps to $y_{6,0}$<br>$b_{1,1}$ maps to $y_{2,0}$<br>$b_{1,2}$ maps to $y_{4,0}$<br>$b_{1,3}$ maps to $y_{0,0}$<br>$b_{1,4}$ maps to $y_{1,0}$<br>$b_{1,5}$ maps to $y_{3,0}$<br>$b_{1,6}$ maps to $y_{5,0}$<br>$b_{1,7}$ maps to $y_{7,0}$ | $b_{1,0}$ maps to $y_{6,0}$<br>$b_{1,1}$ maps to $y_{4,0}$<br>$b_{1,2}$ maps to $y_{2,0}$<br>$b_{1,3}$ maps to $y_{0,0}$<br>$b_{1,4}$ maps to $y_{7,0}$<br>$b_{1,5}$ maps to $y_{5,0}$<br>$b_{1,6}$ maps to $y_{3,0}$<br>$b_{1,7}$ maps to $y_{1,0}$ | $b_{1,0}$ maps to $y_{0,0}$<br>$b_{1,1}$ maps to $y_{2,0}$<br>$b_{1,2}$ maps to $y_{4,0}$<br>$b_{1,3}$ maps to $y_{6,0}$<br>$b_{1,4}$ maps to $y_{7,0}$<br>$b_{1,5}$ maps to $y_{5,0}$<br>$b_{1,6}$ maps to $y_{3,0}$<br>$b_{1,7}$ maps to $y_{1,0}$ | $b_{1,0}$ maps to $y_{6,0}$<br>$b_{1,1}$ maps to $y_{4,0}$<br>$b_{1,2}$ maps to $y_{2,0}$<br>$b_{1,3}$ maps to $y_{0,0}$<br>$b_{1,4}$ maps to $y_{1,0}$<br>$b_{1,5}$ maps to $y_{3,0}$<br>$b_{1,6}$ maps to $y_{5,0}$<br>$b_{1,7}$ maps to $y_{7,0}$ | $b_{1,0}$ maps to $y_{6,0}$<br>$b_{1,1}$ maps to $y_{7,0}$<br>$b_{1,2}$ maps to $y_{4,0}$<br>$b_{1,3}$ maps to $y_{5,0}$<br>$b_{1,4}$ maps to $y_{2,0}$<br>$b_{1,5}$ maps to $y_{3,0}$<br>$b_{1,6}$ maps to $y_{0,0}$<br>$b_{1,7}$ maps to $y_{1,0}$ | $b_{1,0}$ maps to $y_{0,0}$<br>$b_{1,1}$ maps to $y_{1,0}$<br>$b_{1,2}$ maps to $y_{2,0}$<br>$b_{1,3}$ maps to $y_{3,0}$<br>$b_{1,4}$ maps to $y_{4,0}$<br>$b_{1,5}$ maps to $y_{5,0}$<br>$b_{1,6}$ maps to $y_{6,0}$<br>$b_{1,7}$ maps to $y_{7,0}$ |

Fig. 30

| qam | cr | DEMUX selection |
|---|---|---|
| 4-qam | 1/4 | all |
| | 1/3 | all |
| | 2/5 | all |
| | 1/2 | all |
| | 3/5 | all |
| | 2/3 | all |
| | 3/4 | all |
| | 4/5 | all |
| | 5/6 | all |
| | 8/9 | all |
| | 9/10 | all |
| 16-qam | 1/4 | No-Int, No-Demux |
| | 1/3 | No-Int, No-Demux |
| | 2/5 | No-Int, No-Demux |
| | 1/2 | No-Int, No-Demux |
| | 3/5 | 9, 10 or 12 |
| | 2/3 | 6 |
| | 3/4 | 6 |
| | 4/5 | 6 |
| | 5/6 | 6 |
| | 8/9 | 6 |
| | 9/10 | 6 |
| 64-qam | 1/4 | No-Int, No-Demux |
| | 1/3 | No-Int, No-Demux |
| | 2/5 | No-Int, No-Demux |
| | 1/2 | No-Int, No-Demux |
| | 3/5 | 9, or 10 |
| | 2/3 | 6 |
| | 3/4 | 6 |
| | 4/5 | 6 |
| | 5/6 | 6 |
| | 8/9 | 6 |
| | 9/10 | 6 |
| 256-qam | 1/4 | No-Int, No-Demux |
| | 1/3 | No-Int, No-Demux |
| | 2/5 | No-Int, No-Demux |
| | 1/2 | No-Int, No-Demux |
| | 3/5 | 9 |
| | 2/3 | 6 |
| | 3/4 | 6 |
| | 4/5 | 6 |
| | 5/6 | 6 |
| | 8/9 | 6 |
| | 9/10 | 6 |

Fig. 31

QPSK : $i = 0, 1, 2, \ldots, \frac{N}{2} - 1$, $$(y_{0,i}, y_{0,i}) = (x_i, x_{N/2+i}),$$

16-QAM : $i = 0, 1, 2, \ldots, \frac{N}{4} - 1$, $$(y_{0,i}, y_{0,i}, y_{2,i}, y_{3,i}) = \left\{ x_{\frac{2N}{4}+i}, x_{\frac{3N}{4}+i}, x_i, x_{\frac{N}{4}+i} \right\}$$

64-QAM : $i = 0, 1, 2, \ldots, \frac{N}{6} - 1$, $$(y_{0,i}, y_{0,i}, y_{2,i}, y_{3,i}, y_{4,i}, y_{5,i}) = \left\{ x_{\frac{4N}{6}+i}, x_{\frac{5N}{6}+i}, x_{\frac{2N}{6}+i}, x_{\frac{3N}{6}+i}, x_i, x_{\frac{N}{6}+i} \right\}$$

256-QAM : $i = 0, 1, 2, \ldots, \frac{N}{8} - 1$, $$(y_{0,i}, y_{0,i}, y_{2,i}, y_{3,i}, y_{4,i}, y_{5,i}, y_{6,i}, y_{7,i}) = \left\{ x_{\frac{6N}{8}+i}, x_{\frac{7N}{8}+i}, x_{\frac{4N}{8}+i}, x_{\frac{5N}{8}+i}, x_{\frac{2N}{8}+i}, x_{\frac{3N}{8}+i}, x_i, x_{\frac{N}{8}+i} \right\}$$

Fig. 63

| L1 signaling |
|---|
| // Static param<br>CELL_ID [16b]<br>NETWORK_ID [16b]<br>NUM_RF [3b]<br>for each RF {<br>   FREQUENCY [32b]<br>}<br>PILOT_PATTERN [3b]<br>FRAME_LENGTH [10b]<br>// Configurable param<br>NUM_PLP [8b]<br>RF_SHIFT [8b]<br>for each PLP {<br>   PLP_ID [8b]<br>   PLP_CR [3b]<br>   PLP_MOD [4b]<br>   PLP_FEC_BLOCK [1b]<br>}<br>PLP0_CR [3b]<br>PLP0_MOD [4b]<br>PLP0_FEC_BLOCK [1b]<br>// Dynamic param<br>FRAME_IDX [8b]<br>NOTIFICATION [1b]<br>L2_SIZE [18b]<br>NOTIF_SIZE [18b]<br>for each PLP {<br>   PLP_NUM_BLOCKS [8b]<br>   PLP_START [20b]<br>}<br>CRC-8 [8b] | for each sub GP-PLP {
   RF_ID [3b]
   GP_PLP_IDX [3b]
   GP_PLP_NUM_BLOCK [8b]
}

Fig. 65

| L1 signaling |
|---|
| // Static param<br>CELL_ID [16b]<br>NETWORK_ID [16b]<br>NUM_RF [3b]<br>for each RF {<br>   FREQUENCY [32b]<br>}<br>PILOT_PATTERN [3b]<br>FRAME_LENGTH [10b]<br>// Configurable param<br>NUM_PLP [8b]<br>RF_SHIFT [8b]<br>for each PLP {<br>   PLP_ID [8b]<br>   PLP_CR [3b]<br>   PLP_MOD [4b]<br>   PLP_FEC_BLOCK [1b]<br>}<br>PLP0_CR [3b]<br>PLP0_MOD [4b]<br>PLP0_FEC_BLOCK [1b]<br>// Dynamic param<br>FRAME_IDX [8b]<br>NOTTIFICATION [1b]<br>L2_SIZE [18b]<br>NOTIF_SIZE [18b]<br>for each PLP {<br>   PLP_NUM_BLOCKS [8b]<br>   PLP_START [20b]<br>}<br>CRC-8 [8b] | for each sub GP-PLP {
   GP_PLP_ID [8b]
   GP_PLP_CR [3b]
   GP_PLP_MOD [4b]
   GP_PLP_FEC_BLOCK [1b]
   GP_PLP_RF_INDICATOR [6b]
   GP_PLP_START_RF_ID [3b]
   GP_PLP_NUM_BLOCK [3b]
} for each sub GP-PLP {
   GP_PLP_IDX [3b]
}

Fig. 67

| L1 signaling |
|---|

```
// Static param
CELL_ID [16b]
NETWORK_ID [16b]
NUM_RF [3b]
for each RF {
    FREQUENCY [32b]
}
PILOT_PATTERN [3b]
FRAME_LENGTH [10b]
// Configurable param
NUM_PLP [8b]
RF_SHIFT [8b]
for each PLP {
    PLP_ID [8b]
    PLP_CR [3b]
    PLP_MOD [4b]
    PLP_FEC_BLOCK [1b]
}
PLP0_CR [3b]
PLP0_MOD [4b]
PLP0_FEC_BLOCK [1b]
// Dynamic param
FRAME_IDX [8b]
NOTTIFICATION [1b]
L2_SIZE [18b]
NOTIF_SIZE [18b]
for each PLP {
    PLP_NUM_BLOCKS [8b]
    PLP_START [20b]
}
CRC-8 [8b]
```

```
for each sub GP-PLP {
    GP_PLP_ID [8b]
    GP_PLP_CR [3b]
    GP_PLP_MOD [4b]
    GP_PLP_FEC_BLOCK [1b]
    GP_PLP_RF_INDICATOR [6b]
    GP_PLP_NUM_BLOCK [3b]
}
```

```
for each sub GP-PLP {
    GP_PLP_START_RF_ID [3b]
    GP_PLP_IDX [3b]
}
```

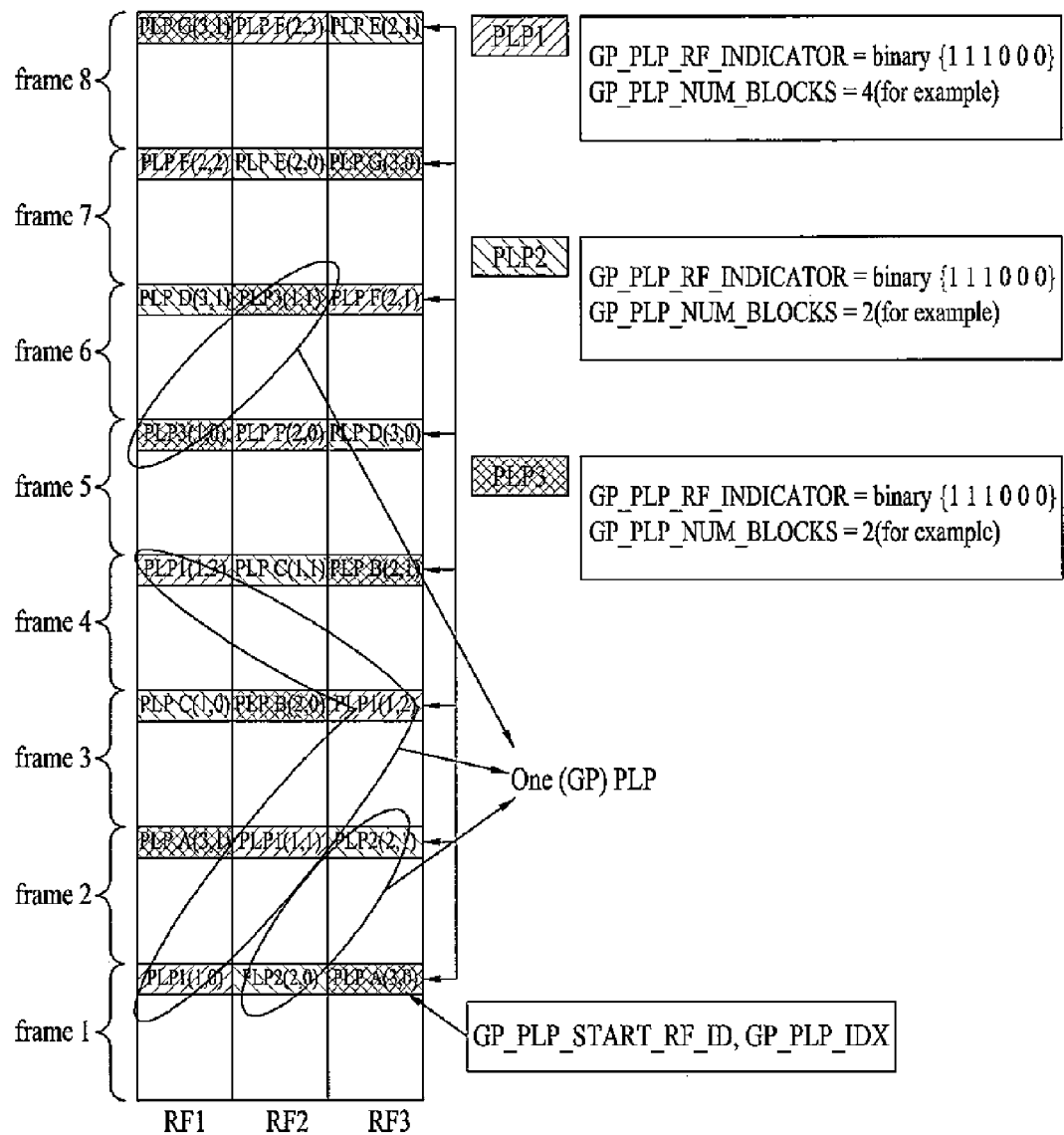

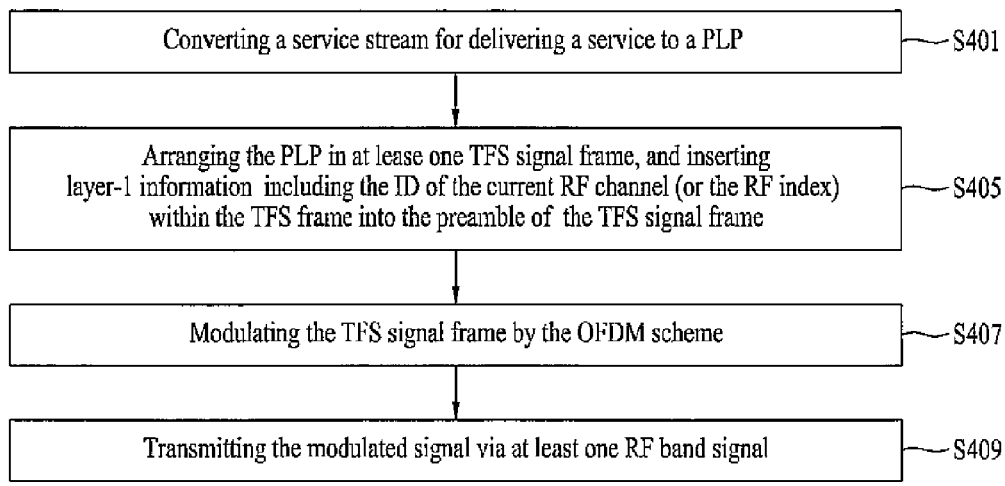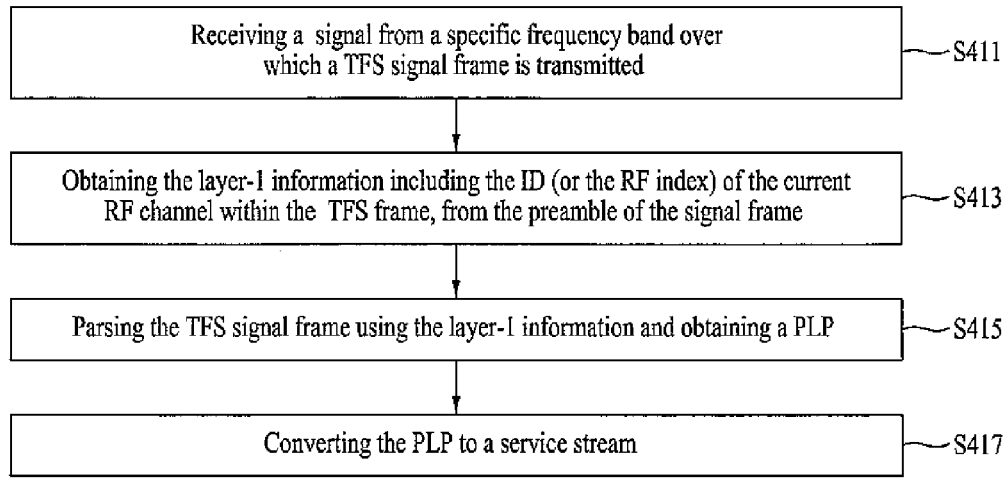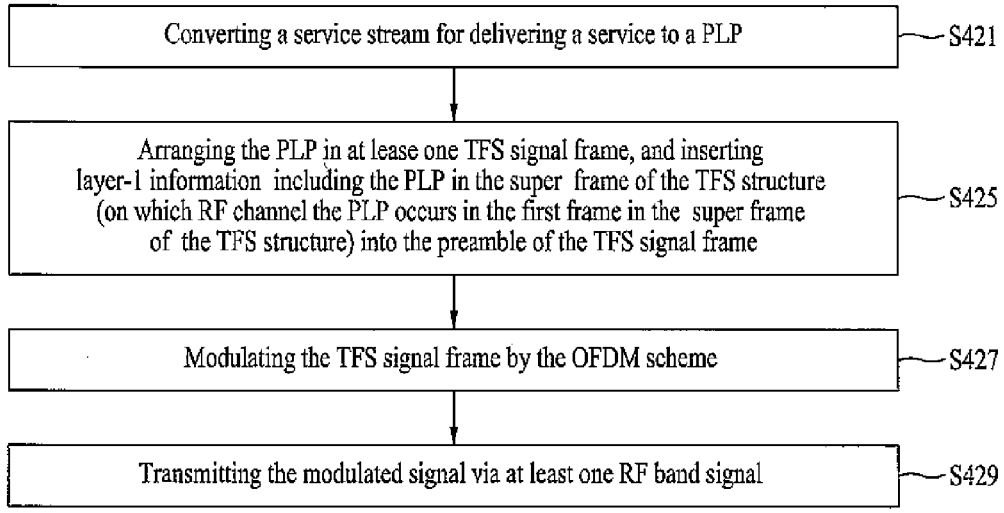

APPARATUS FOR TRANSMITTING AND RECEIVING A SIGNAL AND METHOD OF TRANSMITTING AND RECEIVING A SIGNAL

CROSS-REFERENCE TO RELATED APPLICATIONS

This application is the National Stage filing under 35 U.S.C. § 371 of International Application No. PCT/KR2008/007346, filed on Dec. 11, 2008, which claims the benefit of earlier filing date and right of priority to Korean Application Nos. 10-2008-0124330, filed on Dec. 8, 2008, and 10-2008-0124332, filed on Dec. 8, 2008, and also claims the benefit of U.S. Provisional Application Serial Nos. 61/013,298, filed on Dec. 12, 2007, 61/013,643, filed on Dec. 14, 2007, and 61/015,194, filed on Dec. 19, 2007.

TECHNICAL FIELD

The present invention relates to a method for transmitting and receiving a signal and an apparatus for transmitting and receiving a signal, and more particularly, to a method for transmitting and receiving a signal and an apparatus for transmitting and receiving a signal, which are capable of improving data transmission efficiency.

BACKGROUND ART

As a digital broadcasting technology has been developed, users have received a high definition (HD) moving image. With continuous development of a compression algorithm and high performance of hardware, a better environment will be provided to the users in the future. A digital television (DTV) system can receive a digital broadcasting signal and provide a variety of supplementary services to users as well as a video signal and an audio signal.

With the development of the digital broadcasting technology, a requirement for a service such as a video signal and an audio signal is increased and the size of data desired by a user or the number of broadcasting channels is gradually increased.

DISCLOSURE OF INVENTION

Technical Problem

As a digital broadcasting technology has been developed, users have received a high definition (HD) moving image. With continuous development of a compression algorithm and high performance of hardware, a better environment will be provided to the users in the future. A digital television (DTV) system can receive a digital broadcasting signal and provide a variety of supplementary services to users as well as a video signal and an audio signal.

With the development of the digital broadcasting technology, a requirement for a service such as a video signal and an audio signal is increased and the size of data desired by a user or the number of broadcasting channels is gradually increased.

Technical Solution

An object of the present invention is to provide a method for transmitting and receiving a signal and an apparatus for transmitting and receiving a signal, which are capable of improving data transmission efficiency.

Another object of the present invention is to provide a method for transmitting and receiving a signal and an apparatus for transmitting and receiving a signal, which are capable of improving error correction capability of bits configuring a service.

Another object of the present invention is to provide a method for transmitting and receiving a signal and an apparatus for transmitting and receiving a signal, are capable of readily receiving a service transmitted via a physical layer.

Accordingly, the present invention is directed to a method for transmitting and receiving a signal and an apparatus for transmitting and receiving a signal that substantially obviate one or more problems due to limitations and disadvantages of the related art.

To achieve these objects and other advantages and in accordance with the purpose of the invention, as embodied and broadly described herein, a method of transmitting a signal is disclosed.

The method includes converting a service stream for delivering a service to a physical layer pipe (PLP), arranging the PLP in at least one time-frequency slicing (TFS) signal frame, and inserting layer-1 information into a preamble of the TFS signal frame, modulating the TFS signal frame by an orthogonal frequency division multiplexing (OFDM) scheme and outputting a modulated signal, and transmitting the modulated signal via at least one radio frequency (RF) band signal. Herein said layer-1 information inserted in the preamble of the signal frame includes a radio frequency (RF) channel identifier of a first TFS signal frame including the PLP in a super frame of TFS structure, and an identifier of a starting radio frequency (RF) channel which can receive the PLP in the TFS signal frame.

In another aspect of the present invention, a method of receiving a signal is provided. The method includes receiving the signal of a first frequency band, obtaining layer-1 information from a preamble of the first time-frequency slicing (TFS) signal frame of the received signal, said layer-1 information including a radio frequency (RF) channel identifier of a first time-frequency slicing (TFS) signal frame including a physical layer pipe (PLP) in a super frame of TFS structure and an identifier of a starting RF channel which can receive the PLP in a TFS signal frame, parsing the TFS signal frame using the layer-1 information and obtaining the PLP of the TFS signal frame, and converting the PLP to a service stream.

In another aspect of the present invention, an apparatus for transmitting a signal is disclosed. The apparatus includes a coding and modulation unit configured to encode a service stream for delivering a service by an error-correction-encoding scheme and interleave the encoded service stream, a frame builder configured to map bits of the interleaved service stream to symbols of a physical layer pipe (PLP), split the symbols of the PLP to a plurality of sub-PLPs, arrange the sub-PLPs in a time-frequency slicing (TFS) signal frame, and insert layer-1 information into a preamble of the TFS signal frame, said layer-1 information including a radio frequency (RF) channel identifier of a first TFS signal frame including the PLP in a super frame of TFS structure and an identifier of a starting RF channel which can receive the PLP in the TFS signal frame, into a preamble of the TFS signal frame, a modulator configured to modulate the TFS signal frame by an orthogonal frequency division multiplexing (OFDM) scheme and output a modulated signal, and a transmitter configured to transmit the modulated signal via at least one RF signal.

In another aspect of the present invention, an apparatus for receiving a signal is disclosed. The apparatus includes a receiver configured to receive the signal of a first frequency band, a demodulator configured to obtain layer-1 information from a preamble of a time-frequency slicing (TFS) signal frame of the received signal, said layer-1 information including a radio frequency (RF) channel identifier of a first time-frequency slicing (TFS) signal frame including a physical layer pipe (PLP) in a super frame of TFS structure and an identifier of a starting RF channel which can receive the PLP in the TFS signal frame, a frame parser configured to parse the TFS signal frame using the layer-1 information, obtain the PLP of the TFS signal frame, and symbol-demap symbols of the PLP to bits of a service stream, and a decoding demodulator configured to deinterleave the bits of the service stream and decode the deinterleaved bits of the service stream by error-correction decoding scheme.

The TFS signal frame may include signal frame identification information including a cyclic prefix and cyclic suffix to which useful portions of a first pilot signal in the preamble are frequency-shifted.

Advantageous Effects

According to the apparatus for transmitting and receiving the signal and the method of transmitting and receiving the signal of the invention, if the data symbol configuring the PLP and the symbols configuring the preamble are modulated in the same FFT mode, the probability that the data symbol is detected by the preamble is low and the probability that the preamble is erroneously detected is reduced. If continuous wave (CW) interference is included like the analog TV signal, the probability that the preamble is erroneously detected by a noise DC component generated at the time of correlation is reduced.

According to the apparatus for transmitting and receiving the signal and the method of transmitting and receiving the signal of the invention, if the size of the FFT applied to the data symbol configuring the PLP is larger than that of the FFT applied to the preamble, the preamble detecting performance may be improved even in a delay spread channel having a length equal to or greater than that of the useful symbol portion A of the preamble. Since both the cyclic prefix (B) and the cyclic suffix (C) are used in the preamble, the fractional carrier frequency offset can be estimated.

According to the apparatus for transmitting and receiving the signal and the method of transmitting and receiving the signal of the invention, the receiver can check the current RF channel, check the RF channel, to which the PLP to be searched for is transmitted, in the super frame, and identify and search for the RF channel in the signal frame at which the PLP is located.

Accordingly, even when the signal frame is in the TFS mode, the FF mode or a combination of the both modes, it is possible to readily search for the PLP. If the PLP is a PLP for providing a service or a GP-PLP, it is possible to efficiently search for the PLP using the layer-1 information.

BRIEF DESCRIPTION OF THE DRAWINGS

FIG. 9 is a view showing a second example of a ratio of symbols when the mappers 131a and 131b perform hybrid symbol mapping;

FIG. 10 is a view showing the number of symbols and bit number per cell word according to a symbol mapping scheme in an LDPC normal mode;

FIG. 11 is a view showing another example of the number of symbols according to a symbol mapping scheme in an LDPC normal mode;

FIG. 12 is a view showing another example of the number of symbols according to a symbol mapping scheme in an LDPC normal mode;

FIG. 13 is a view showing the number of symbols according to a symbol mapping scheme in an LDPC short mode;

FIG. 14 is a view showing an example of the number of symbols according to a symbol mapping scheme in an LDPC short mode;

FIG. 20 is a view showing the concept of interleaving of bits by bit interleavers 1312a and 1312b;

FIG. 21 is a view showing a first example of the number of rows and columns of memories of the bit interleavers 1312a and 1312b according to the types of symbol mappers 1315a and 1315b;

FIG. 22 is a view showing a second example of the number of rows and columns of the memories of the bit interleavers 1312a and 1312b according to the types of the symbol mappers 1315a and 1315b;

FIG. 23 is a diagram showing the concept of another embodiment of interleaving of a bit interleaver;

FIG. 24 is a view showing another embodiment of bit interleaving;

FIG. 27 is a view showing an embodiment of demultiplexing an input stream by the demux;

FIG. 28 is a view showing an example of a demultiplexing type according to a symbol mapping method;

FIG. 30 is a view showing a demultiplexing type which is determined according to a code rate of an error correction coding and a symbol mapping method;

FIG. 31 is a view showing an example of expressing the demultiplexing method by an equation;

FIG. 63 is a view showing an example of scheduling PLPs in the unit of signal frames;

FIG. 65 is a view showing scheduling information included in a layer 1 information;

FIG. 67 is a view showing scheduling information included in a layer 1;

FIG. 71 is a view showing another example of obtaining PLPs according to the scheduling method;

FIG. 72 is a view showing another embodiment of a method of transmitting a signal;

FIG. 73 is a view showing another embodiment of a method of receiving a signal;

FIG. 74 is a view showing another embodiment of a method of transmitting a signal;

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

In the following description, the term "service" is indicative of either broadcast contents which can be transmitted/received by the signal transmission/reception apparatus, or content provision.

Prior to the description of an apparatus for transmitting and receiving a signal according to an embodiment of the present invention, a signal frame which is transmitted and received by the apparatus for transmitting and receiving the signal according to an embodiment of the present invention will be described.

Figures 1, 2:
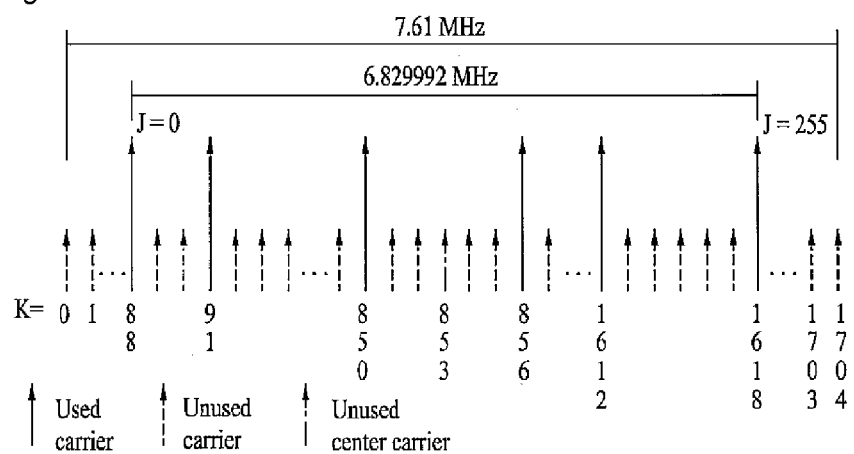
FIG. 1 is a view showing a signal frame for transmitting a service.
FIG. 2 is a view showing the structure of a first pilot signal P1 of the signal frame.

FIG. 1 shows a signal frame for transmitting a service according to an embodiment of the present invention.

The signal frame shown in FIG. 1 shows an exemplary signal frame for transmitting a broadcast service including audio/video (A/V) streams. In this case, a single service is multiplexed in time- and frequency-channels, and the multiplexed service is transmitted. The above-mentioned signal transmission scheme is called a time-frequency slicing (TFS) scheme. Compared with the case in which a single service is transmitted to only one radio frequency (RF) band, the signal transmission apparatus according to an embodiment of he present invention transmits the signal service via at least one RF band (possibly several RF bands), such that it can acquire a statistical multiplexing gain capable of transmitting many more services. The signal transmission/reception apparatus transmits/receives a single service over several RF channels, such that it can acquire a frequency diversity gain.

First to third services (Services 1~3) are transmitted to four RF bands (RF1~RF4). However, this number of RF bands and this number of services have been disclosed for only illustrative purposes, such that other numbers may also be used as necessary. Two reference signals (i.e., a first pilot signal (P1) and a second pilot signal (P2)) are located at the beginning part of the signal frame. For example, in the case of the RF1 band, the first pilot signal (P1) and the second pilot signal (P2) are located at the beginning part of the signal frame. The RF1 band includes three slots associated with the Service 1, two slots associated with the Service 2, and a single slot associated with the Service 3. Slots associated with other services may also be located in other slots (Slots 4~17) located after the single slot associated with the Service 3.

The RF2 band includes a first pilot signal (P1), a second pilot signal (P2), and other slots 13~17. In addition, the RF2 band includes three slots associated with the Service 1, two slots associated with the Service 2, and a single slot associated with the Service 3.

The Services 1~3 are multiplexed, and are then transmitted to the RF3 and RF4 bands according to the time-frequency slicing (TFS) scheme. The modulation scheme for signal transmission may be based on an orthogonal frequency division multiplexing (OFDM) scheme.

In the signal frame, individual services are shifted to the RF bands (in the case that there is a plurality of the RF bands in the signal frame) and a time axis.

If signal frames equal to the above signal frame are successively arranged in time, a super-frame can be composed of several signal frames. A future extension frame may also be located among the several signal frames. If the future extension frame is located among the several signal frames, the super-frame may be terminated at the future extension frame.

FIG. 2 shows a first pilot signal (P1) contained in the signal frame of FIG. 1 according to an embodiment of the present invention.

The first pilot signal P1 and the second pilot signal P2 are located at the beginning part of the signal frame. The first pilot signal P1 is modulated by a 2K FFT mode, and may be transmitted simultaneously while including a ¼ guard interval. In FIG. 2, a band of 7.61 Mhz of the first pilot signal P1 includes a band of 6.82992 Mhz. The first pilot signal uses 256 carriers from among 1705 active carriers. A single active carrier is used for every 6 carriers on average. Data-carrier intervals may be irregularly arranged in the order of 3, 6, and 9. In FIG. 2, a solid line indicates the location of a used carrier, a thin dotted line indicates the location of an unused carrier, and a chain line indicates a center location of the unused carrier. In the first pilot signal, the used carrier can be symbol-mapped by a binary phase shift keying (BPSK), and a pseudo-random bit sequence (PRBS) can be modulated. The size of a FFT used for the second pilot signal can be indicated by several PRBSs.

The signal reception apparatus detects a structure of a pilot signal, and recognizes a time-frequency slicing (TFS) using the detected structure. The signal reception apparatus acquires the FFT size of the second pilot signal, compensates for a coarse frequency offset of a reception signal, and acquires time synchronization.

In the first pilot signal, a signal transmission type and a transmission parameter may be set.

The second pilot signal P2 may be transmitted with a FFT size and a guard interval equal to those of the data symbol. In the second pilot signal, a single carrier is used as a pilot carrier at intervals of three carriers. The signal reception apparatus compensates for a fine frequency synchronization offset using the second pilot signal, and performs fine time synchronization. The second pilot signal transmits information of a first layer (L1) from among Open Systems Interconnection (OSI) layers. For example, the second pilot signal may include a physical parameter and frame construction information. The second pilot signal transmits a parameter value by which a receiver can access a Physical Layer Pipe (PLP) service stream.

L1 (Layer 1) information contained in the second pilot signal P2 is as follows.

The Layer-1 (L1) information includes a length indicator indicating the length of data including the L1 information, such that it can easily use the signaling channels of Layers 1 and 2 (L1 and L2). The Layer-1 (L1) information includes a frequency indicator, a guard-interval length, a maximum number of FEC (Forward Error Correction) blocks for each frame in association with individual physical channels, and the number of actual FEC blocks to be contained in the FEC block buffer associated with a current/previous frame in each physical channel. In this case, the frequency indicator indicates frequency information corresponding to the RF channel.

The Layer-1 (L1) information may include a variety of information in association with individual slots. For example, the Layer-1 (L1) information includes the number of frames associated with a service, a start address of a slot having the accuracy of an OFDM carrier contained in an OFDM symbol, a length of the slot, slots corresponding to the OFDM carrier, the number of bits padded in the last OFDM carrier, service modulation information, service mode rate information, and Multi-Input-Multi-Output (MIMO) scheme information.

The Layer-1 (L1) information may include a cell ID, a flag for service like notification message service(e.g., an emergency message), the number of current frames, and the number of additional bits for future use. In this case, the cell ID indicates a broadcast area transmitted by a broadcast transmitter The second pilot signal P2 is adapted to perform channel estimation for decoding a symbol contained in the P2 signal. The second pilot signal P2 can be used as an initial value for channel estimation for the next data symbol. The second pilot signal P2 may also transmit Layer-2 (L2) information. For example, the second pilot signal is able to describe information associated with the transmission service in Layer-2 (L2) information. The signal transmission apparatus decodes the second pilot signal, such that it can acquire service information contained in the time-frequency slicing (TFS) frame and can effectively perform the channel scanning. Meanwhile, this Layer-2 (L2) information may be included in a specific PLP of the TFS frame. According to another instance, L2 information can be included in a specific PLP, and the service description information also can be transmitted in the specific PLP.

For example, the second pilot signal may include two OFDM symbols of the 8 k FFT mode. Generally, the second pilot signal may be any one of a single OFDM symbol of the 32K FFT mode, a single OFDM symbol of the 16 k FFT mode, two OFDM symbols of the 8 k FFT mode, four OFDM symbols of the 4 k FFT mode, and eight OFDM symbols of the 2 k FFT mode.

In other words, a single OFDM symbol having the size of a large FFT or several OFDM symbols, each of which has the size of a small FFT, may be contained in the second pilot signal P2, such that capacity capable of being transmitted to the pilot can be maintained.

If information to be transmitted to the second pilot signal exceeds capacity of the OFDM symbol of the second pilot signal, OFDM symbols after the second pilot signal can be further used. L1 (Layer 1) and L2 (Layer2) information contained in the second pilot signal is error-correction-coded and is then interleaved, such that data recovery is carried out although an impulse noise occurs.

As described the above, L2 information can also be included in a specific PLP conveying the service description information.

Figure 3:
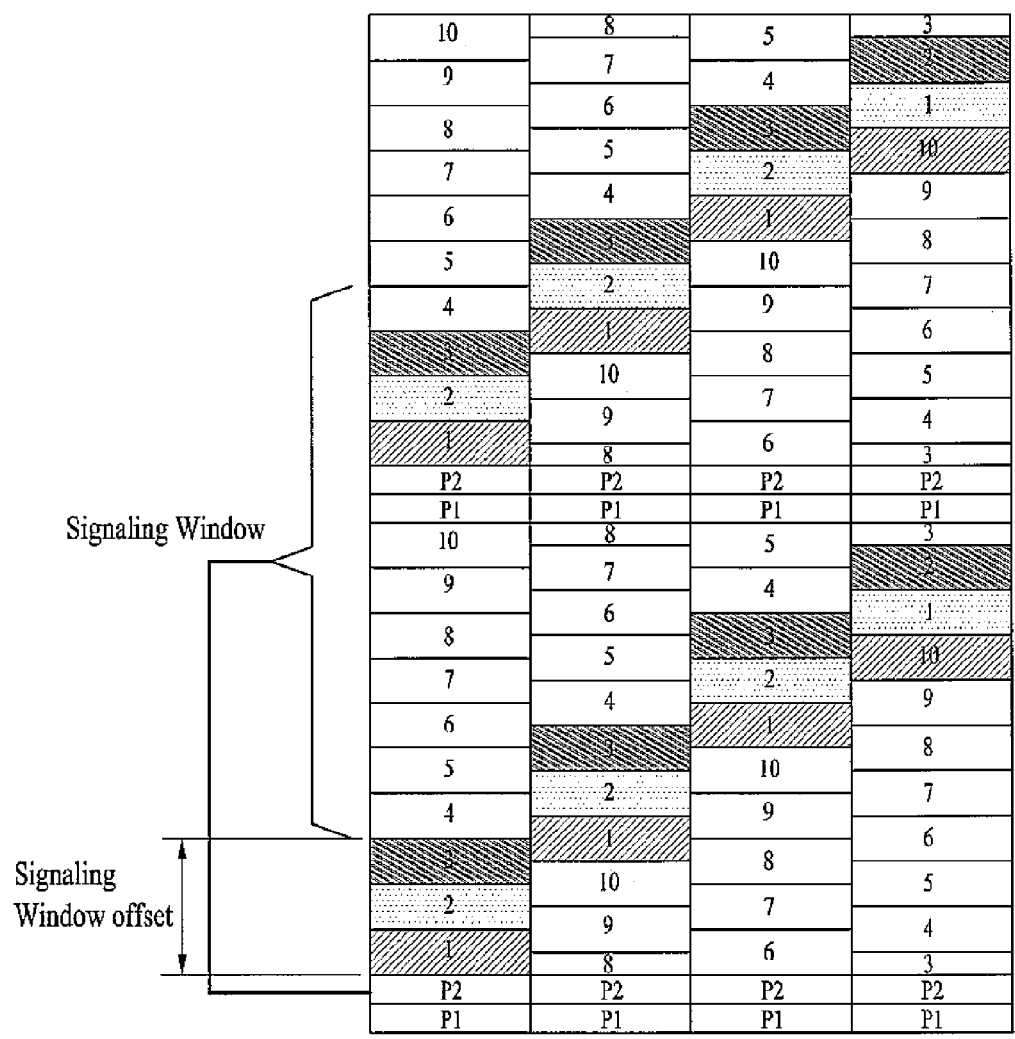
FIG. 3 is a view showing a signaling window.

FIG. 3 shows a signaling window according to an embodiment of the present invention. The time-frequency slicing (TFS) frame shows an offset concept of the signaling information. Layer-1 (L1) information contained in the second pilot signal includes frame construction information and physical layer information required by the signal reception apparatus decoding the data symbol. Therefore, if information of the following data symbols located after the second pilot signal, is contained in the second pilot signal, and the resultant second pilot signal is transmitted, the signal reception apparatus may be unable to immediately decode the above following data symbols due to a decoding time of the second pilot signal.

Therefore, as shown in FIG. 3, the L1 information contained in the second pilot signal (P2) includes information of a single time-frequency slicing (TFS) frame size, and includes information contained in the signaling window at a location spaced apart from the second pilot signal by the signaling window offset.

In the meantime, in order to perform channel estimation of a data symbol constructing the service, the data symbol may include a scatter pilot and a continual pilot.

The signal transmission/reception system capable of transmitting/receiving signal frames shown in FIGS. 1~3 will hereinafter be described. Individual services can be transmitted and received over several RF channels. A path for transmitting each of the services or a stream transmitted via this path is called a PLP. The PLP may be distributed among the timely-divided slots in several RF channels or a single RF band. This signal frame can convey the timely-divided PLP in at least one RF channel. In other word, a single PLP can be transferred through at least one RF channel with timely-divided regions. Hereinafter the signal transmission/reception systems transmitting/receiving a signal frame via at least one RF band will be disclosed.

Figure 4:
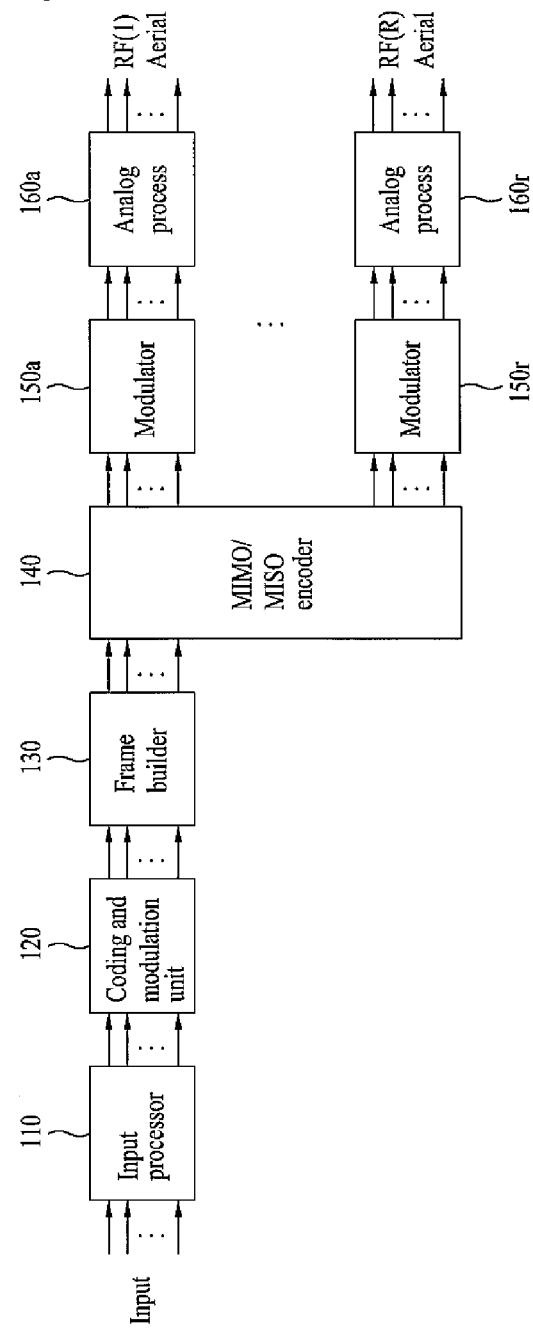
FIG. 4 is a schematic view showing an embodiment of an apparatus for transmitting a signal.

FIG. 4 is a block diagram illustrating an apparatus for transmitting a signal according to one embodiment of the present invention. Referring to FIG. 4, the signal transmission apparatus includes an input processor 110, a coding and modulation unit 120, a frame builder 130, a MIMO/MISO encoder 140, a plurality of modulators (150a, ..., 150r) of the MIMO/MISO encoder 140, and a plurality of analog processors (160a, ..., 160r).

The input processor 110 receives streams equipped with several services, generates P number of baseband frames (P is a natural number) which includes modulation- and coding-information corresponding to transmission paths of the individual services, and outputs the P number of baseband frames.

The coding and modulation unit 120 receives baseband frames from the input processor 110, performs the channel coding and interleaving on each of the baseband frames, and outputs the channel coding and interleaving result.

The frame builder 130 forms frames which transmit baseband frames contained in P number of PLPs to R number of RF channels (where R is a natural number), splits the formed frames, and outputs the split frames to paths corresponding to the R number of RF channels. Several services may be multiplexed in a single RF channel in time. The signal frames generated from the frame builder 140 may include a time-frequency slicing (TFS) structure in which the service is multiplexed in time- and frequency-domains.

The MIMO/MISO encoder 140 encodes signals to be transmitted to the R number of RF channels, and outputs the coded signals to paths corresponding to A number of antennas (where A is a natural number). The MIMO/MISO encoder 140 outputs the coded signal in which a single to be transmitted to a single RF channel is encoded to the A number of antennas, such that a signal is transmitted/received to/from a MIMO (Multi-Input-Multi-Output) or MISO (Multi-Input-Single-Output) structure.

The modulators (150a, ..., 150r) modulate frequency-domain signals entered via the path corresponding to each RF channel into time-domain signals. The modulators (150a, ..., 150r) modulate the input signals according to an orthogonal frequency division multiplexing (OFDM) scheme, and outputs the modulated signals.

The analog processors (160a, ..., 160r) convert the input signals into RF signals, such that the RF signals can be outputted to the RF channels.

The signal transmission apparatus according to this embodiment may include a predetermined number of modulators (150a, ... 150r) corresponding to the number of RF channels and a predetermined number of analog processors (160a, ..., 160r) corresponding to the number of RF channels. However, in the case of using the MIMO scheme, the number of analog processors must be equal to the product of R (i.e., the number of RF channels) and A (i.e., the number of antennas).

Figure 5:
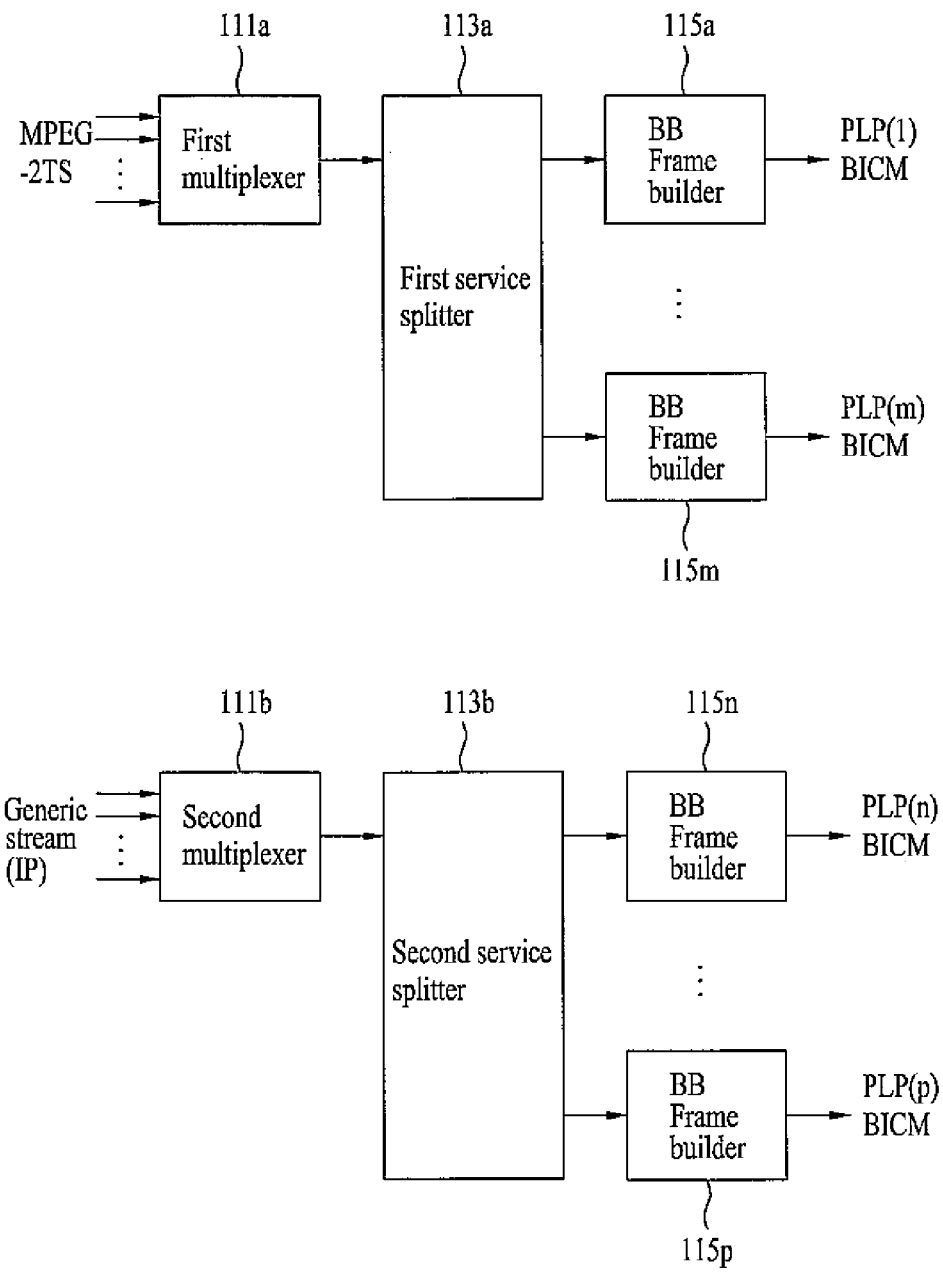
FIG. 5 is a view showing an example of an input processor 110.

FIG. 5 is a block diagram illustrating an input processor 110 according to an embodiment of the present invention. Referring to FIG. 5, the input processor 110 includes the first stream multiplexer 111a, the first service splitter 113a, and a plurality of first baseband (BB) frame builders (115a, ..., 115m). The input processor 110 includes a second stream multiplexer 111b, a second service splitter 113b, and a plurality of second baseband (BB) frame builders (115n, ..., 115p).

For example, the first stream multiplexer 111a receives several MPEG-2 transport streams (TSs), multiplexes the received MPEG-2 TS streams, and outputs the multiplexed MPEG-2 TS streams. The first service splitter 113a receives the multiplexed streams, splits the input streams of individual services, and outputs the split streams. As described above, provided that the service transmitted via a physical-channel path is called a PLP, the first service splitter 113a splits the service to be transmitted to each PLP, and outputs the split service.

The first BB frame builders (115a, ..., 115m) build data contained in a service to be transmitted to each PLP in the form of a specific frame, and output the specific-frame-formatted data. The first BB frame builders (115a, ..., 115m) build a frame including a header and payload equipped with service data. The header of each frame may include mode information based on the modulation and encoding of the service data, and a counter value based on a clock rate of the modulator to synchronize input streams.

The second stream multiplexer 111b receives several streams, multiplexes input streams, and outputs the multiplexed streams. For example, the second stream multiplexer 111b may multiplex Internet Protocol (IP) streams instead of the MPEG-2 TS streams. These streams may be encapsulated by a generic stream encapsulation (GSE) scheme. The streams multiplexed by the second stream multiplexer 111b may be any one of streams. Therefore, the above-mentioned streams different from the MPEG-2 TS streams are called generic streams (GS streams).

The second service splitter 113b receives the multiplexed generic streams, splits the received generic streams according to individual services (i.e., PLP types), and outputs the split GS streams.

The second BB frame builders (115n, . . . , 115p) build service data to be transmitted to individual PLPs in the form of a specific frame used as a signal processing unit, and output the resultant service data. The frame format built by the second BB frame builders (115n, . . . , 115p) may be equal to that of the first BB frame builders (115a, . . . , 115m) as necessary. If required, another embodiment may also be proposed. In another embodiment, the frame format built by the second BB frame builders (115n, . . . , 115p) may be different from that of the first BB frame builders (115a, . . . , 115m). The MPEG-2 TS header further includes a Packet Syncword which is not contained in the GS stream, resulting in the occurrence of different headers.

Figure 6:
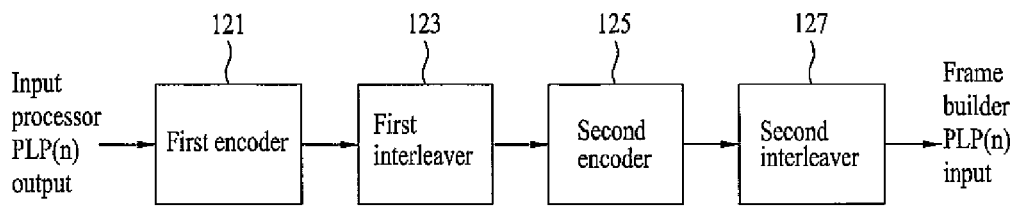
FIG. 6 is a view showing an embodiment of a coding and modulation unit.

FIG. 6 is a block diagram illustrating a coding and modulation unit according to an embodiment of the present invention. The coding and modulation unit includes a first interleaver 123, a second encoder 125, and a second interleaver 127.

The first encoder 121 acts as an outer coder of the input baseband frame, and is able to perform the error correction encoding. The first encoder 121 performs the error correction encoding of the input baseband frame using a Bose-Chaudhuri-Hoc-quenghem (BCH) scheme. The first interleaver 123 performs interleaving of the encoded data, such that it prevents a burst error from being generated in a transmission signal. The first interleaver 123 may not be contained in the above-mentioned embodiment.

The second encoder 125 acts as an inner coder of either the output data of the first encoder 121 or the output data of the first interleaver 123, and is able to perform the error correction encoding. A low density parity bit (LDPC) scheme may be used as an error correction encoding scheme. The second interleaver 127 mixes the error-correction-encoded data generated from the second encoder 125, and outputs the mixed data. The first interleaver 123 and the second interleaver 127 are able to perform interleaving of data in units of a bit.

The coding and modulation unit 120 relates to a single PLP stream. The PLP stream is error-correction-encoded and modulated by the coding and modulation unit 120, and is then transmitted to the frame builder 130.

Figures 7, 8:
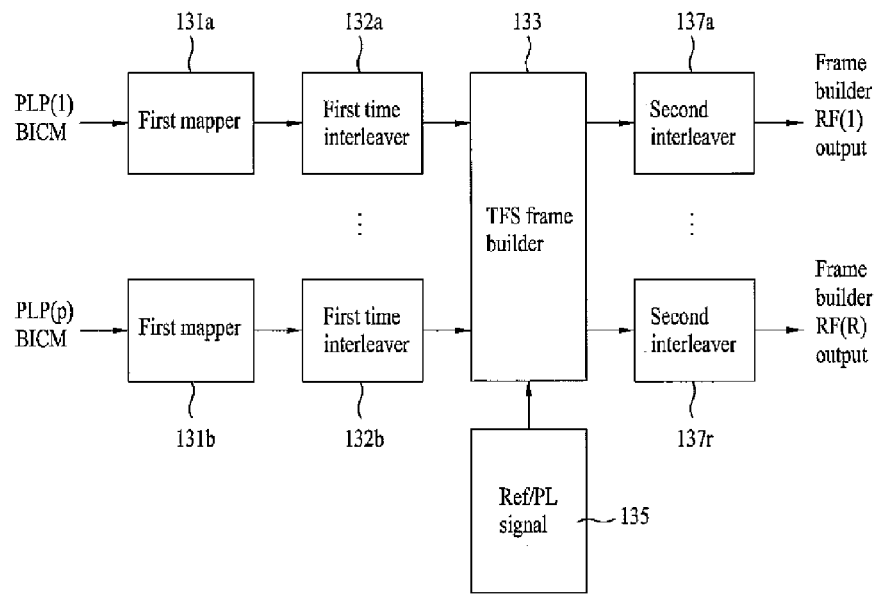
FIG. 7 is a view showing an embodiment of a frame builder.
FIG. 8 is a view showing a first example of a ratio of symbols when mappers 131a and 131b perform hybrid symbol mapping.

FIG. 7 is a block diagram illustrating a frame builder according to an embodiment of the present invention. Referring to FIG. 7, the frame builder 130 receives streams of several paths from the coding and modulation unit 120, and arranges the received streams in a single signal frame. For example, the frame builder may include a first mapper 131a and a first time interleaver 132a in a first path, and may include a second mapper 131b and a second time interleaver 132b in a second path. The number of input paths is equal to the number of PLPs for service transmission or the number of streams transmitted via each PLP.

The first mapper 131a performs mapping of data contained in the input stream according to the first symbol mapping scheme. For example, the first mapper 131a may perform mapping of the input data using a QAM scheme (e.g., 16 QAM, 64 QAM, and 256 QAM).

If the first mapper 131a performs mapping of the symbol, the input data may be mapped to several kinds of symbols according to several symbol mapping schemes. For example, the first mapper 131a classifies the input data into a baseband-frame unit and a baseband-frame sub-unit. Individual classified data may be hybrid-symbol-mapped by at least two QAM schemes (e.g., 16 QAM and 64 QAM). Therefore, data contained in a single service may be mapped to symbols based on different symbol mapping schemes in individual intervals.

The first time interleaver 132a receives a symbol sequence mapped by the first mapper 131a, and is able to perform the interleaving in a time domain. The first mapper 131a maps data, which is contained in the error-corrected frame unit received from the coding and modulation unit 120, into symbols. The first time interleaver 132a receives the symbol sequence mapped by the first mapper 131a, and interleaves the received symbol sequence in units of the error-corrected frame.

In this way, the p-th mapper 131p or the p-th time interleaver 132p receives service data to be transmitted to the p-th PLP, maps the service data into symbols according to the p-th symbol mapping scheme. The mapped symbols can be interleaved in a time domain. It should be noted that this symbol mapping scheme and this interleaving scheme are equal to those of the first time interleaver 132a and the first mapper 131a.

The symbol mapping scheme of the first mapper 131a may be equal to or different from that of the p-th mapper 131p. The first mapper 131a and the p-th mapper 131p are able to map input data to individual symbols using the same or different hybrid symbol mapping schemes.

Data of the time interleavers located at individual paths (i.e., service data interleaved by the first time interleaver 132a and service data to be transmitted to R number of RF channels by the p-th time interleaver 132p) is interleaved, such that the physical channel allows the above data to be interleaved over several RF channels.

In association with streams received in as many paths as the number of PLPs, the TFS frame builder 133 builds the TFS signal frame such as the above-mentioned signal frame, such that the service is time-shifted according to RF channels. The TFS frame builder 133 splits service data received in any one of paths, and outputs the service data split into data of the R number of RF bands according to a signal scheduling scheme.

The TFS frame builder 133 receives the first pilot signal and the second pilot signal from the signaling information unit (denoted by Ref/PL signal) 135, arranges the first and second pilot signals in the signal frame, and inserts the signaling signal (L1 and L2) of the above-mentioned physical layer in the second pilot signal. In this case, the first and second pilot signals are used as the beginning signals of the signal frame contained in each RF channel from among the TFS signal frame received from the signaling information unit (Ref/PL signal) 135. As shown in FIG. 2, the first pilot signal may include a transmission type and basic transmission parameters, and the second pilot signal may include a physical parameter and frame construction information. Also, the second pilot signal includes a L1 (Layer 1) signaling signal and a L2 (Layer 2) signaling signal.

The R number of frequency interleavers (137a, . . . , 137r) interleave service data, to be transmitted to corresponding RF channels of the TFS signal frame, in a frequency domain. The frequency interleavers (137a, . . . , 137r) can interleave the service data at a level of data cells contained in an OFDM symbol.

Therefore, service data to be transmitted to each RF channel in the TFS signal frame is frequency-selective-fading-processed, such that it may not be lost in a specific frequency domain.

FIG. 8 is a view showing a first example of a ratio of symbols when the mappers 131a and 131b perform hybrid symbol mapping. This Figure shows the number of bits transmitted by one sub carrier (cell) if error correction coding is performed by the coding and modulation unit in a normal mode (the length of the error-correction-coded code is 64800 bits) of LDPC error correction coding mode.

For example, if the mappers 131a and 131b perform symbol mapping using 256QAM, 64800 bits are mapped to 8100 symbols. If the mappers 131a and 131b perform hybrid symbol mapping (Hyb 128-QAM) using 256QAM and 64QAM with a ratio of 3:2, the number of symbols mapped by 256QAM is 4860 and the number of symbols mapped by 64QAM is 4320. The number of transmitted bits per sub carrier (cell) is 7.0588.

If a symbol mapping method of 64QAM is used, input data may be mapped to 10800 symbols and six bits per cell may be transmitted. If data is mapped to the symbols by a hybrid symbol mapping method of 64QAM and 16QAM (64QAM: 16QAM=3:2, Hyb32-QAM), five bits may be transmitted by one sub carrier (cell).

If data is mapped to symbols by the 16QAM method, the data is mapped to 16200 symbols, each of which is used to transmit four bits.

Similarly, if data is mapped to symbols by a hybrid symbol mapping method of 16QAM and QPSK (16QAM:QPSK=2: 3, Hyb8-QAM), three bits may be transmitted by one sub carrier (cell).

If data is mapped to symbols by a QPSK method, the data may be mapped to 32400 symbols, each of which is used to transmit two bits.

FIG. 9 shows symbol mapping methods of error-corrected data by LDPC error correction coding method of a short mode (the length of the error-correction-coded code is 16200 bits), which are equal to the symbol mapping methods of FIG. 8, and the numbers of bits per sub carrier according to the symbol mapping methods.

The numbers of bits transmitted by the sub carrier is equal to those of the normal mode (64800 bits) according to the symbol mapping methods such as 256QAM, Hyb 128-QAM, 64-QAM, Hyb 32-QAM, 16QAM, Hyb8-QAM and QPSK, but the total numbers of symbols transmitted are different from those of the normal mode. For example, 16200 bits are transmitted by 2025 symbols in 256QAM, 16200 bits are transmitted by 1215 symbols according to 256QAM and 1080 symbols according to 64QAM (total 2295 symbols) in Hyb 128-QAM.

Accordingly, a data transmission rate per sub carrier (cell) for each PLP may be adjusted according to a hybrid symbol mapping method or a single symbol mapping method.

FIG. 10 is a view showing the number of symbols and bit number per cell word according to a symbol mapping method in an LDPC normal mode. If a TFS signal frame includes at least one RF channel, symbols configuring a specific PLP can be uniformly allocated to RF channels. The locations of the PLP symbols allocated to the RF channels can be more efficiently addressed. Accordingly, when the signal receiving apparatus selects the RF channels, the bits used for addressing the specific PLP can be reduced.

In this drawing, a symbol mapping method represented by 256-QAM indicates a method of mapping bits configuring a single error-correction-coded block to symbols with a ratio of 256QAM:64QAM=8:1. According to this symbol mapping method, the number of the bits in a single error-correction-coded block by the 256-QAM method is 57600, the number of the bits in a single error-correction-coded block by the 256-QAM method is 1200, the number of total symbols in the block is 8400, and the bit number per cell word is 7.714285714.

A symbol mapping method represented by Hyb 128-QAM indicates a method of mapping bits configuring a single error-correction-coded block to symbols with a ratio of 256QAM: 64QAM=8:7. According to the Hyb 128-QAM symbol mapping method, the number of total symbols in a single error-correction-encoding block is 9600, and the bit number per cell word is 6.75.

According to a symbol mapping method represented by 64 QAM, the number of total symbols in a single error-correction-encoding block is 10800 and the bit number per cell word is 6.

A symbol mapping method represented by Hyb 32-QAM indicates a method of mapping bits configuring a single error-correction-coded block to symbols with a ratio of 64QAM: 32QAM=5:4. According to the Hyb 32-QAM symbol mapping method, the number of total symbols in the error-correction-coded block is 13200, and the bit number per cell word is 4.9090909.

A symbol mapping method represented by 16 QAM indicates a method of mapping bits configuring a single error-correction-coded block to symbols with a ratio of 16QAM: QPSK=1:8. According to the 16 QAM symbol mapping method, the number of total symbols in one error-correction-coded block is 15600, and the bit number per cell word is 4.153846154.

A symbol mapping method represented by Hyb 8-QAM indicates a method of mapping bits configuring a single error-correction-coded block to symbols with a ratio of 16QAM: QPSK=2:1. According to the Hyb 8-QAM symbol mapping method, the number of total symbols in one error-correction-coded block is 21600, and the bit number per cell word is 3.

According to a symbol mapping method represented by QPSK, the number of total symbols in one error-correction-coded block is 32400 and the bit number per cell word is 2.

When the symbols configuring the PLP are allocated to the RF channels, the diversity gain of the frequency domain can be maximized when the numbers of the symbols allocated to the respective RF channels are equal. If a maximum of six RF channels is considered, the lowest common multiple of 1 to 6 is 60 and the greatest common divisor of the numbers of symbols mapped to one error correction coded block is 1200. Accordingly, if the integral multiple of 1200/60=20 symbols is allocated to each of the RF channels, the symbols can be uniformly allocated to all the RF channels. At this time, if 20 symbols are considered as one group and the group is addressed, the addressing overhead of log 2(20)4.32 bits can be reduced compared with the case the symbols are addressed one by one.

FIG. 11 is a view showing another example of the number of symbols according to a symbol mapping method in an LDPC normal mode. In the example of this drawing, a 256-QAM method using 256QAM and 64QAM symbols (256QAM:64QAM=4:1), a Hyb 128-QAM method using 256QAM and 64QAM symbol (256QAM:64QAM=8:7), a 64QAM method, a Hyb 32-QAM method using 64QAM and 8QAM symbols (64QAM:8QAM=3:2), a 16 QAM method using 16QAM and QPSK symbols (16QAM:QPSK=1:14), a Hyb 8-QAM method using 16QAM:QPSK=2:1 and a QPSK method were used as the symbol mapping method. The greatest common divisor (GCD) of the numbers of total symbols of an error correction coded block (normal mode) according to the symbol mapping methods is 720. Accordingly, if the integral multiple of 12(=720/60) symbols is allocated to each of the RF channels, the symbols can be uniformly allocated to all the RF channels. At this time, if 12 symbols are considered as one group and the group is addressed, the addressing overhead of log 2(12)3.58 bits can be reduced compared with the case the symbols are addressed one by one. The signal receiving apparatus can collect the allocated PLP symbols by the addressing scheme and obtain a PLP service stream.

FIG. 12 is a view showing another example of the number of symbols according to a symbol mapping method in an LDPC normal mode. In the example of this drawing, a 256-QAM scheme, a Hyb 128-QAM scheme, a 64QAM scheme, a Hyb 32-QAM scheme, a 16 QAM scheme, a Hyb 8-QAM scheme and a QPSK scheme were used as the symbol mapping method. The 256QAM symbol mapping method uses 256QAM and 64QAM symbols (256QAM:64QAM=44:1) and the Hyb 128-QAM symbol mapping method uses 256QAM and 64QAM symbols (256QAM:64QAM=28:17). The Hyb 32-QAM method uses 64QAM and 8QAM symbols (64QAM:8QAM=3:2), the 16QAM symbol mapping method uses 16QAM and QPSK symbols (16QAM:QPSK=1:14), and the Hyb 8-QAM symbol mapping method uses 16QAM and QPSK symbols (16QAM:QPSK=2:1). The GCD of the numbers of total symbols of an error correction coded block (normal mode) according to the symbol mapping methods is 240. Accordingly, if the integral multiple of 240/60=4 symbols is allocated to each of the RF channels, the symbols can be uniformly allocated to all the RF channels. At this time, if four symbols are considered as one group and the group is addressed, the addressing overhead of log 2(4)2 bits can be reduced compared with the case where the symbols are addressed one by one. Accordingly, even when the number of RF channels is any one of 1 to 6 in the signal frame, the PLP symbols can be uniformly allocated to the RF channels.

FIG. 13 is a view showing the number of symbols according to a symbol mapping method in an LDPC short mode. As described above, if symbol mapping is performed according to this example, the PLP symbols can be uniformly allocated to the RF channels and the overhead of the PLP symbol addressing can be reduced. The symbol mapping methods shown in this drawing are equal to those shown in FIG. 10. However, since the bit number of the LDPC short mode is different from that of the normal mode, the GCD of the numbers of total symbols of an error correction coded block (short mode) according to the symbol mapping methods is 300, unlike to FIG. 10. Accordingly, if the integral multiple of 300/60=5 symbols is allocated to each of the RF channels, the symbols can be uniformly allocated to all the RF channels. At this time, if five symbols are considered as one group and the group is addressed, the addressing overhead of log 2(5) bits can be reduced compared with the case where the symbols are addressed one by one. Accordingly, in this embodiment, the addressing bits are saved by log 2(5) bits when the divided PLP symbols are addressed.

FIG. 14 is a view showing an example of the number of symbols according to a symbol mapping method in an LDPC short mode. The symbol mapping methods of this drawing are equal to those shown in FIG. 11. In this example, the GCD of the numbers of total symbols of an error correction coded block (short mode) according to the symbol mapping methods is 180, which may be used for PLP symbol allocation of one RF channel and the addressing of the allocated symbols. In this embodiment, the addressing bits are saved by log 2(3) bits.

Figures 15, 16:
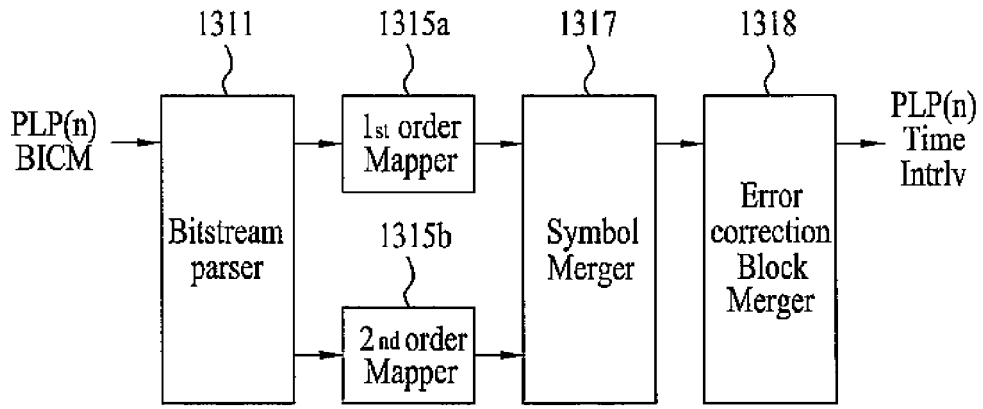
FIG. 15 is a view showing another example of the number of symbols according to a symbol mapping scheme in an LDPC short mode.
FIG. 16 is a view showing an embodiment of each of the symbol mappers 131a and 131b shown in FIG. 7.

FIG. 15 is a view showing another example of the number of symbols according to a symbol mapping method in an LDPC short mode. The symbol mapping methods of this drawing are equal to those shown in FIG. 12. In this example, the GCD of the numbers of total symbols of an error correction coded block (short mode) according to the symbol mapping methods is 60. In this embodiment, the addressing bits are saved by log 2(1) bits (that is, the addressing bit is not saved).

FIG. 16 is a view showing an example of each of the symbol mappers 131a and 131b shown in FIG. 7. Each of the symbol mappers 131a and 131b includes a first order mapper 1315a, a second order mapper 131b, a symbol merger 1317 and an error correction block merger 1318.

The bit stream parser 1311 receives the PLP service stream from the coding and modulation unit and splits the received service stream.

The first order symbol mapper 1315a maps the bits of the service stream split by a higher order symbol mapping method to symbols. The second order symbol mapper 1315b maps the bits of the service stream split by a lower order symbol mapping method to symbols. For example, in the above example, the first order symbol mapper 1315a may map the bit stream to symbols according to 256QAM and the second order symbol mapper 1315b may map the bit stream to symbols according to 64QAM.

The symbol merger 1317 merges the symbols output from the symbol mappers 1315a and 1315b to one symbol stream and outputs the symbol stream. The symbol merger 1317 may output the symbol stream included in one PLP.

The error correction block merger 1318 may output one symbol stream merged by the symbol merger 1317 in the error-correction-coded code block unit. The error correction block merger 1318 may output a symbol block such that the error-correction-coded code blocks are uniformly allocated to at least one RF band of the TFS signal frame. The error correction block merger 1318 may output the symbol block such that the length of the symbol block of the error-correction-coded block of a normal mode is equal to that of the symbol block of the error-correction-coded block of a short mode. For example, four symbol blocks of the error-correction-coded block of the short mode may be merged to one symbol block.

The error correction block merger 1318 may split the symbol stream according to a common multiple of the number of RF bands such that signal frame builder uniformly arranges the symbols to the RF bands. If the maximum number of RF bands in the signal frame is 6, the error correction block merger 1318 outputs the symbol block such that the total number of symbols can be divided by 60 which is a common multiple of 1, 2, 3, 4, 5 and 6.

The symbols included in the output symbol block may be arranged to be uniformly allocated to the six RF bands. Accordingly, although an error correction mode according to a code rate and a symbol mapping method are combined, the symbols configuring the PLP are uniformly allocated to the RF bands.

Figure 17:
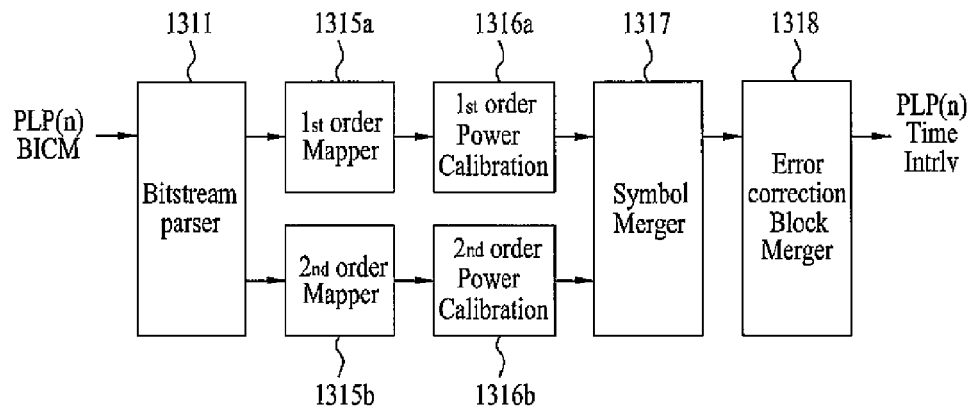
FIG. 17 is a view showing another embodiment of each of the symbol mappers 131a and 131b.

FIG. 17 is a view showing another embodiment of each of the symbol mappers 131a and 131b. The embodiment of this drawing is similar to the embodiment of FIG. 16 except that a first order power calibration unit 1316a and a second order power calibration unit 1316b are further included.

The first order power calibration unit 1316a calibrates the power of the symbols mapped by the first order symbol mapper 1315a according to the size of the constellation and outputs the calibrated symbols. The second order power calibration unit 1316b calibrates the power of the symbols mapped by the second order symbol mapper 1315b according to the size of the constellation and outputs the calibrated symbols. Accordingly, although the symbol mapping method is changed in one PLP or is changed among a plurality of PLPs, if the power of the symbol by the symbol mapping method is adjusted according to the size of the constellation, signal reception performance of a receiver can be improved.

The symbol merger 1317 merges the symbols calibrated by the power calibration units 1316a and 1316b and outputs one symbol stream.

Figure 18:
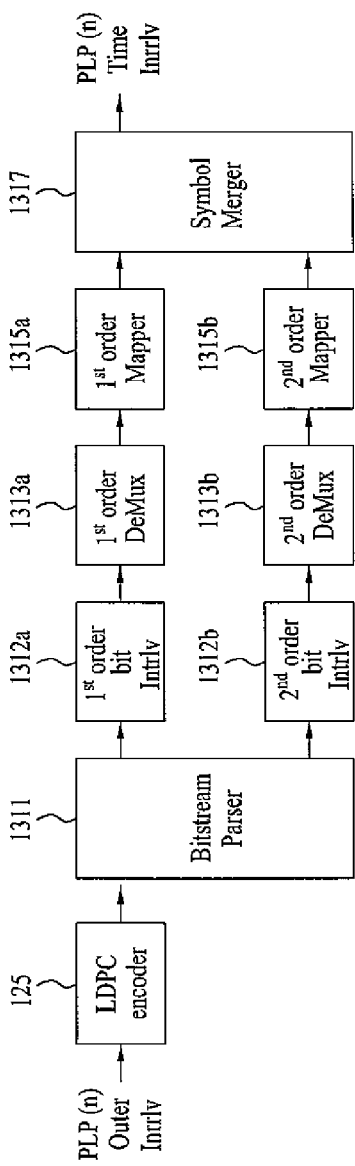
FIG. 18 is a view showing another embodiment of the symbol mapper.

FIG. 18 is a view showing another embodiment of the symbol mapper. In the embodiment of this Figure, the symbol mapper includes the second encoder 125 and the second interleaver 127 included in the coding and modulation unit. That is, if this embodiment is used, the coding and modulation unit may include only the first encoder 121, the first interleaver 123 and the second encoder 125.

The embodiment of the symbol mapper includes a bit stream parser 1311, a first order bit interleaver 1312a, a second order bit interleaver 1312b, a first order demux 1313a, a second order demux 1313b, a first order symbol mapper 1315a, a second order symbol mapper 1315b and a symbol merger 1317.

When the second encoder 125 performs LDPC error correction coding, the length of the error-correction-coded block (e.g., the length of 64800 bits and the length of 16200 bits) may vary according to an LDPC mode. If the bits included in the error-correction-coded block are mapped to the symbols, the error correction capabilities of the bits included in a cell word configuring the symbol may vary according to the locations of the bits. For example, the cell word which is the symbol may be determined according to the code rate of the error correction coding and the symbol mapping method (whether the symbol mapping method is the higher order symbol mapping method or the lower order symbol mapping method). If the error-correction-code is the LDPC, the error correction capabilities of the bits vary according to the locations of the bits in the error-correction-coded block. For example, the reliabilities of the bits coded according to the characteristics of the H-matrix used in the irregular LDPC error correction coding method may vary according to the locations of the bits. Accordingly, the order of the bits configuring the cell word mapped to the symbol is changed such that the error correction capabilities of the bits which are weak against the error correction in the error-correction-coded block are adjusted and the robustness against the error in the bit level can be adjusted.

First, the second encoder 125, for example, performs the error correction coding with respect to the stream included in one PLP by the LDPC error correction coding method.

The bit stream parser 1311 receives the service stream according to the PLP and splits the received service stream.

The first order bit interleaver 1312a interleaves the bits included in a first bit stream of the split service streams. Similarly, the second order bit interleaver 1312b interleaves the bits included in a second bit stream of the split service streams.

The first order bit interleaver 1312a and the second order bit interleaver 1312b may correspond to the second interleaver 127 used as an inner interleaver. The interleaving method of the first order bit interleaver 1312a and the second order bit interleaver 1312b will be described later.

The first order demux 1313a and the second order demux 1313b demultiplex the bits of the bit streams interleaved by the first order bit interleaver 1312a and the second order bit interleaver 1312b. The demuxs 1313a and 1313b divide the input bit stream into sub bit streams which will be mapped to a real axis and an imaginary axis of a constellation and output the sub bit streams. The symbol mappers 1315a and 1315b map the sub bit streams demultiplexed by the demuxs 1313a and 1313b to the corresponding symbols.

The bit interleavers 1312a and 1312b and the demuxs 1313a and 1313b may combine the characteristics of the LDPC codeword and the characteristics of the constellation reliability of the symbol mapping according to the constellation. The detailed embodiment of the first order demuxs 1313a and 1313b will be described later.

The first order symbol mapper 1315a performs first order symbol mapping, for example, higher order symbol mapping, and the second order symbol mapper 1315b performs second order symbol mapping, for example, lower order symbol mapping. The first order symbol mapper 1315a maps the sub bit streams output from the first order demux 1313 to the symbols and the second order symbol mapper 1315b maps the sub bit streams output from the second order demux 1313b to the symbols.

The symbol merger 1317 merges the symbols mapped by the first order symbol mapper 1315a and the second order symbol mapper 1315b to one symbol stream and outputs the symbol stream.

As described above, in the LDPC, the error correction capabilities of the bits may be changed according to the locations of the bits in the error-correction-coded block. Accordingly, if the bit interleaver and the demux are controlled according to the characteristics of the LDPC encoder 125 so as to change the order of the bits configuring the cell word, the error correction capability in the bit level can be maximized.

Figure 19:
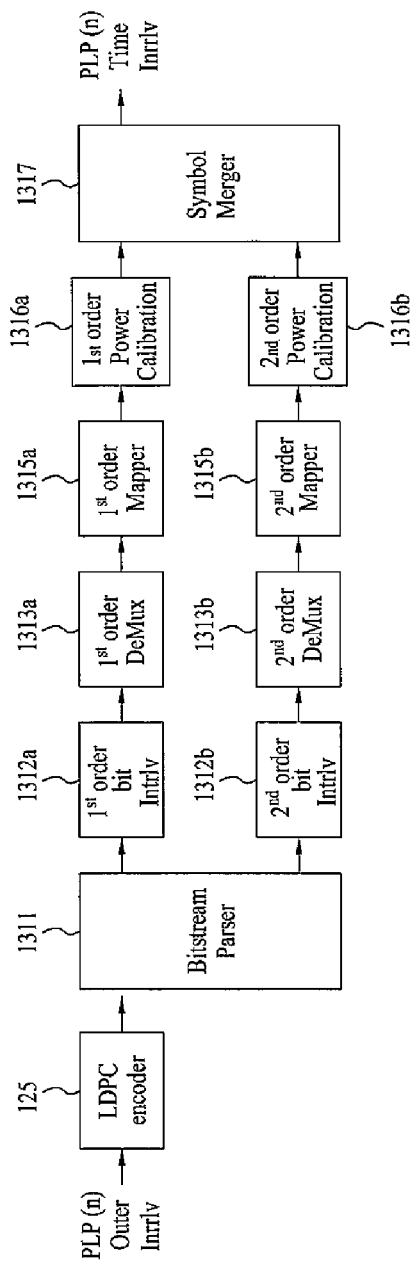
FIG. 19 is a view showing another embodiment of each of the symbol mappers 131a and 131b.

FIG. 19 is a view showing another embodiment of each of the symbol mappers 131a and 131b. The embodiment of this drawing is similar to the embodiment of FIG. 18 except that a first order power calibration unit 1316a and a second order power calibration unit 1316b are further included.

The first order power calibration unit 1316a calibrates the power of the symbols mapped by the first order symbol mapper 1315a according to the size of the constellation and outputs the calibrated symbols. The second order power calibration unit 1316b calibrates the power of the symbols mapped by the second order symbol mapper 1315b according to the size of the constellation and outputs the calibrated symbols. Accordingly, although the symbol mapping scheme is changed in one PLP or is changed among a plurality of PLPs, if the power of the symbol is adjusted according to the size of the constellation, signal reception performance can be improved.

The symbol merger 1317 merges the symbols calibrated by the power calibration units 1316a and 1316b and outputs one symbol stream.

FIG. 20 is a view showing the concept of interleaving of bits by the bit interleavers 1312a and 1312b of FIGS. 18 and 19.

For example, input bits are stored in and read from a matrix-formed memory having a predetermined number of rows and columns. When the input bits are stored, first, the bits are stored in a first column in row direction, and, if the first column is filled up, the bits are stored in another column in row direction. When the stored bits are read, the bits are read in column direction and, if all the bits stored in a first row are read, the bits in another row are read in column direction. In other word, when the bits are stored, the bits are stored row-wise such that the columns are filled up serially. And when the stored bits are read, the stored bits are read column-wise from the first row to last row serially. In this Figure, MSB means a most significant bit and LSB means a least significant bit.

In order to map the LDPC-error-correction-coded bits to the symbols in the same length of error correction block unit at various code rates, the bit interleavers 1312a and 1312b may change the number of rows and columns of the memory according to the types of the symbol mappers 1315a and 1315b.

FIG. 21 is a view showing an example of the number of rows and columns of memories of the bit interleavers 1312a and 1312b according to the types of symbol mappers 1315a and 1315b, if the LDPC mode is the normal mode.

For example, if the symbol mapper 1315a maps the bits to 256QAM symbols, the first order interleaver 1312a interleaves the bits by a memory having 8100 rows and 8 columns. If the symbols are mapped by 64QAM, the first order interleaver 1312a interleaves the bits by a memory having 10800 rows and 6 columns. If the symbols are mapped by 16QAM, the first order interleaver 1312a interleaves the bits by a memory having 16200 rows and 4 columns.

For example, if the symbol mappers 1315a and 1315b map the bits to Hyb128-QAM symbols, the first order interleaver 1312a interleaves the bits using a memory having 4860 rows and 8 columns, and the second order interleaver 1312b interleaves the bits using a memory having 4320 rows and 6 columns.

Similarly, if the symbol mappers 1315a and 1315b map the symbols by Hyb32-QAM, the first order interleaver 1312a interleaves the bits using a memory having 6480 rows and 6 columns, and the second order interleaver 1312b interleaves the bits using a memory having 6480 rows and 4 columns.

FIG. 22 is a view showing an example of the number of rows and columns of the memories of the bit interleavers 1312a and 1312b according to the types of the symbol mappers 1315a and 1315b, if the LDPC mode is the short mode.

For example, if the symbol mapper 1315a maps the bits to 256QAM symbols, the first order interleaver 1312a interleaves the bits by a memory having 2025 rows and 8 columns. If the symbol mappers 1315a and 1315b map the symbols by Hyb128-QAM, the first order interleaver 1312a interleaves the bits using a memory having 1215 rows and 8 columns, and the second order interleaver 1312b interleaves the bits using a memory having 1080 rows and 6 columns.

If the bit interleaving is performed with respect to the error-correction-coded block, the locations of the bits in the error-correction-coded block may be changed.

FIG. 23 is a diagram showing the concept of another embodiment of interleaving of a bit interleaver. In the embodiment shown in this drawing, when bits are written in a memory, the bits are written in a column direction. When the written bits are read, the bits of the circularly shifted locations are read in a row direction. In each row, the bits written in each row is circularly shifted. If the bits are written or read by a circular shift method with respect to the row or the column of the memory, this is called twisted bit interleaving. This embodiment relates to the twisted bit interleaving method using a method of reading the bits after the bits are shifted by one column in row direction. Instead of shifting the written bits in the memory, the point for reading bits in the memory or the point for writing bits in the memory can be shifted.

In this embodiment, N denotes the length of the error correction coded block and C denotes the length of the column. When the bits are written, the bits are written in a first column (represented by a shadow) in order of 1, 2, 3, 4, ..., and C and the bits are written in a second column in order of C+1, C+2, C+3, ....

The written bits are twisted in the row direction one column by one column.

If the written bits are read, the twisted bits are read in the row direction. For example, in this embodiment, the bits are read in a first row in order of 1, C+1, ... and the bits are read in a second row in order of X1, 2, C+2, ... (X1 is a bit in the first column of the second row). The bits are read by row by row and the circularly shifted bits are read. Of course, instead of shifting the written bits in the memory, the point for reading bits written in the memory can be shifted.

FIG. 24 is a view showing another embodiment of bit interleaving. In this embodiment, N denotes the length of the error correction coded block and C denotes the length of the column. When the bits are written, the bits are written in a first column in order of 1, 2, 3, 4, ..., C−1, and C and the bits are written in a second column in order of C+1, C+2, C+3, ....

The written bits are double-twisted in the row direction two columns by two columns. If the written bits are read, the bits circularly shifted by two columns are read in the column direction in every row. This method may be called a double twisted bit interleaving method.

Figure 25:
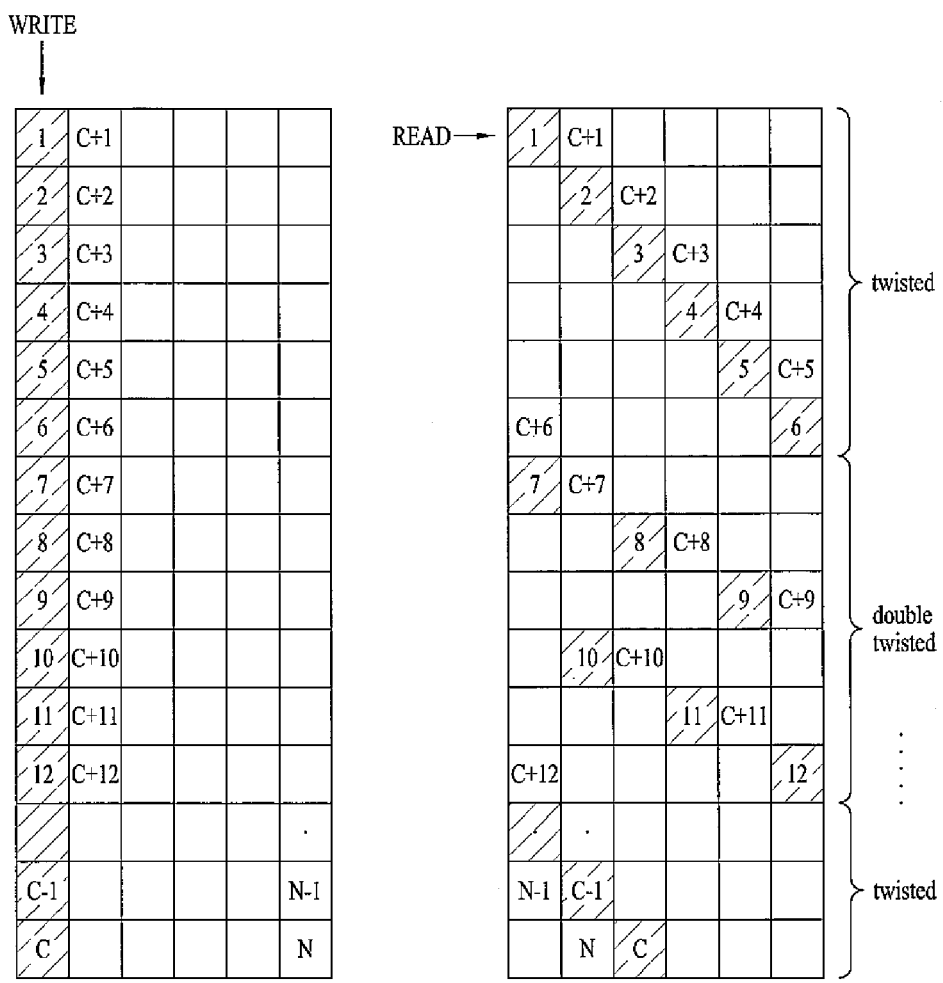
FIG. 25 is a view showing another embodiment of bit interleaving.

FIG. 25 is a view showing another embodiment of bit interleaving. In this embodiment, N denotes the length of the error correction coded block and C denotes the length of the column. The bits are written in a first column in order of 1, 2, 3, 4, ..., C−1, and C and the bits are written in a second column in order of C+1, C+2, C+3, ....

When the written bits are read, in a first region of the rows, the bits may be read by the twisted bit interleaving method.

In a second region of the rows, the bits may be read by the double twisted interleaving method.

In a third region of the rows, the bits may be read by the twisted bit interleaving method.

If the bits are interleaved by at least one of the twisted bit interleaving method and the double twisted interleaving method, the bits in the error correction coded block can be more randomly mixed.

Figure 26:
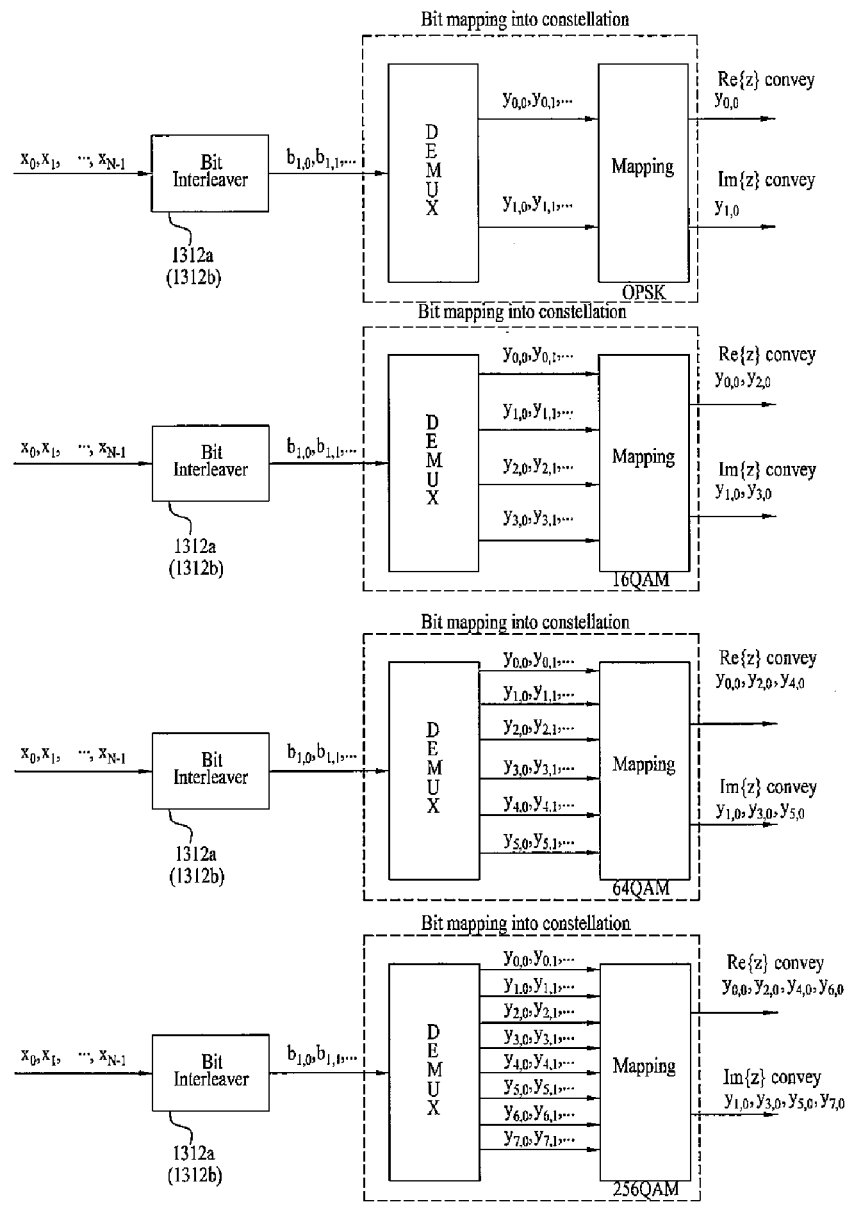
FIG. 26 is a view showing the concept of demultiplexing of input bits of demuxs 1313a and 1313b.

FIG. 26 is a view showing the concept of multiplexing of input bits of the demuxs 1313a and 1313b.

The bit interleavers 1312a and 1312b interleave the input bits x0, x1, ..., and xn-1 and output the interleaved bits. The interleaving method is already described above.

The demuxs 1313a and 1313b demultiplex the interleaved bit streams. The demultiplexing method may vary according to the code rate of the error correction coding method and the symbol mapping method of the symbol mapper. If the symbol method of the symbol mapper is QPSK, the input bits, for example, are interleaved to two sub streams and the symbol mapper maps the two sub streams to the symbols so as to correspond to the real axis and the imaginary axis of the constellation. For example, a first bit y0 of the demultiplexed first sub stream corresponds to the real axis and a first bit y1 of the demultiplexed second sub stream corresponds to the imaginary axis.

If the symbol method of the symbol mapper is 16QAM, the input bits, for example, are demultiplexed to four sub frames. The symbol mapper selects the bits included in the four sub streams and maps the selected bits to the symbols so as to correspond to the real axis and the imaginary axis of the constellation.

For example, the bits y0 and y2 of the demultiplexed first and third sub streams correspond to the real axis and the bits y1 and y3 of the demultiplexed second and fourth sub streams correspond to the imaginary axis.

Similarly, if the symbol method of the symbol mapper is 64QAM, the input bits may be demultiplexed to six bit streams. The symbol mapper maps the six sub streams to the symbols so as to correspond to the real axis and the imaginary axis of the constellation. For example, the demultiplexed first, third and fifth sub stream bits y0, y2 and y4 correspond to the real axis and the demultiplexed second, fourth and sixth sub stream bits y1, y3 and y6 correspond to the imaginary axis.

Similarly, if the symbol method of the symbol mapper is 256QAM, the input bits may be demultiplexed to eight bit streams. The symbol mapper maps the eight sub streams to the symbols so as to correspond to the real axis and the imaginary axis of the constellation. For example, first, the demultiplexed first, third fifth and seventh sub stream bits y0, y2, y4 and y6 correspond to the real axis and the demultiplexed second, fourth, sixth and eighth sub stream bits y1, y3, y6 and y7 correspond to the imaginary axis.

If the symbol mapper maps the symbols, the sub streams demultiplexed by the demux may be mapped to the bit streams of the real axis and the imaginary axis of the constellation.

The above-described bit interleaving method, demultiplexing method and symbol mapping method are exemplary and various methods may be used as the method of selecting the bits in the sub streams such that the sub streams demultiplexed by the demux may correspond to the real axis and the imaginary axis of the constellation.

The cell word mapped to the symbols may vary according to any one of the error-corrected bit streams according to the code rate, the method of interleaving the bit streams, the demultiplexing method and the symbol mapping method. The MSB of the cell word is higher than the LSB of the cell word in the reliability of the error correction decoding. Although the reliability of the bit of a specific location of the error-correction-coded block is low, the reliability of the bit can be improved by the symbol demapping process if the bit of the cell word is arranged on the MSB or close to the MSB.

Accordingly, although the reliability of the bit coded according to the characteristics of the H-matrix used in the irregular LDPC error correction coding method is changed, the bit can be robustly transmitted/received by the symbol mapping and demapping process and the system performance can be adjusted.

FIG. 27 is a view showing an embodiment of demultiplexing an input stream by the demux.

If the symbol mapping method is QPSK, two bits are mapped to one symbol and the two bits of one symbol unit are demultiplexed in order of the bit indexes (indexes 0 and 1 of b).

If the symbol mapping method is 16QAM, 4 bits are mapped to one symbol and the four bits of one symbol unit are demultiplexed according to the calculating result of the modulo-4 of bit indexes (indexes 0, 1, 2 and 3 of b).

If the symbol mapping method is 64QAM, 6 bits are mapped to one symbol and the six bits of one symbol unit are demultiplexed according to the calculating result of the modulo-6 of bit indexes (indexes 0, 1, 2, 3, 4 and 5 of b).

If the symbol mapping method is 256QAM, 8 bits are mapped to one symbol and the eight bits of one symbol unit are demultiplexed according to the calculating result of the modulo-8 of bit indexes (indexes 0, 1, 2, 3, 4, 5, 6 and 7 of b).

The demultiplexing order of the sub streams is exemplary and may be modified.

FIG. 28 is a view showing an example of a demultiplexing type according to a symbol mapping method. The symbol mapping method includes QPSK, 16QAM, 64QAM and 256QAM, and the demultiplexing type includes a first type to a sixth type.

The first type is an example in which the input bits sequentially correspond to even-numbered indexes (0, 2, 4, 8, . . . ) (or the real axis of the constellation) and sequentially correspond to odd-numbered indexes (1, 3, 5, 7, . . . ) (or the imaginary axis of the constellation). Hereinafter, the bit demultiplexing of the first type may be represented by a demultiplexing identifier 10 (a binary number of 1010; the location of 1 is the location of the MSB corresponding to the real axis and the imaginary axis of the constellation).

The second type is an example in which the demultiplexing is performed in reverse order of the first type, that is, the LSB of the input bits sequentially correspond to even-numbered indexes (6, 4, 2, 0) (or the real axis of the constellation) and odd-numbered indexes (1, 3, 5, 7, . . . ) (or the imaginary axis of the constellation). Hereinafter, the bit demultiplexing of the second type may be represented by a demultiplexing identifier 5 (a binary number of 0101).

The third type is an example in which the input bits are arranged such that the bits of the both ends of the codeword become the MSB. The input bits are rearranged so as to fill the code word from the both ends of the code word. Hereinafter, the bit demultiplexing of the third type may be represented by a demultiplexing identifier 9 (a binary number of 1001).

The fourth type is an example in which the input bits are arranged such that a middle bit of the code word becomes the MSB. A bit of the input bits is first filled in the middle location of the code word and the remaining bits are then rearranged toward the both ends of the code word in order of the input bits. Hereinafter, the bit demultiplexing of the fourth type may be represented by a demultiplexing identifier 6 (a binary number of 0110).

The fifth type is an example in which the bits are demultiplexed such that a last bit of the code word becomes the MSB and a first bit thereof becomes the LSB, and the sixth type is an example in which the bits are rearranged such that the first bit of the code word becomes the MSB and the last bit thereof becomes the LSB. Hereinafter, the bit demultiplexing of the fifth type may be represented by a demultiplexing identifier 3 (a binary number of 0011), and the bit demultiplexing of the sixth type may be represented by a demultiplexing identifier 12 (a binary number of 1100).

As described above, the demultiplexing type may vary according to the symbol mapping method or the code rate of the error correction coding method. That is, a different demultiplexing type may be used if the symbol mapping method or the code rate is changed.

Figure 29:
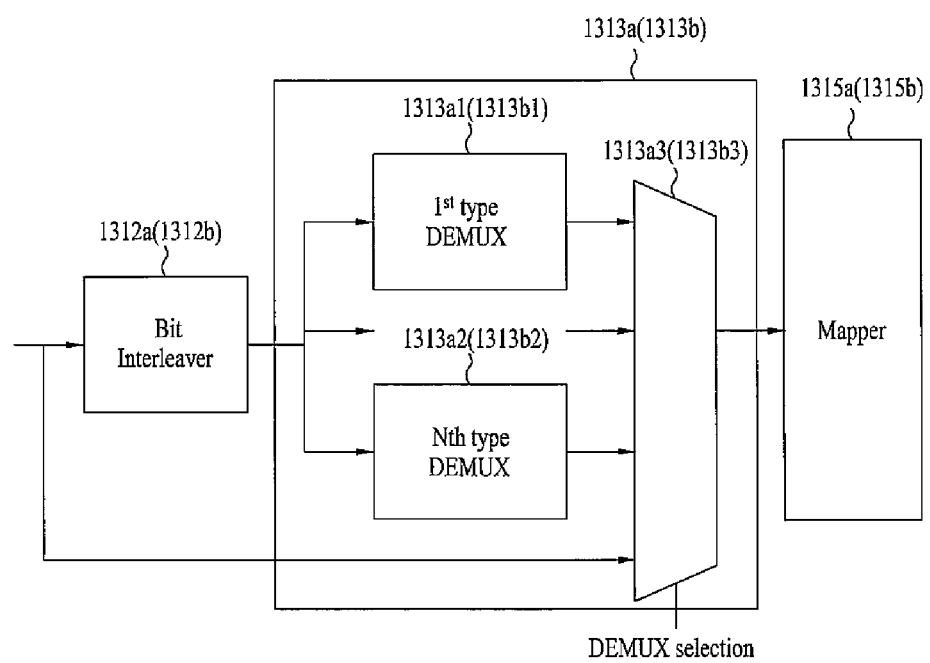
FIG. 29 is a view showing an embodiment of demultiplexing an input bit stream according to a demultiplexing type.

FIG. 29 is a view showing an embodiment of demultiplexing an input bit stream according to a demultiplexing type. This embodiment may include bit interleavers 1312*a* and 1312*b*, demuxs 1313*a* and 1313*b* and mappers 1315*a* and 1315*b*.

The bit interleavers 1312*a* and 1312*b* interleave the error-correction-coded PLP service streams. For example, the bit interleavers 1312*a* and 1312*b* may perform the bit interleaving in the error correction coding units according to the error correction coding mode. The bit interleaving method is already described above.

The demuxs 1313*a* and 1313*b* may include first type demuxs 1313*a*1 and 1313*b*1, . . . , and nth type demuxs 1313*a*2 and 1313*b*2. Here, n is an integer. The methods of demultiplexing the bits by the n types of demuxs follow the types shown in FIG. 17. For example, the first type demuxs may correspond to the first type bit demultiplexing (1100) and the second type demux (not shown) may correspond to the second type bit demultiplexing (0011). The nth type demux 1313*b* demultiplexes the input bit stream according to the nth type bit multiplexing (e.g., the demultiplexing identifier 1100) and outputs the demultiplexed bit stream. Selectors 1313*a*3 and 1313*b*3 receive a demux selection signal of the demultiplexing type suitable for the input bits and output the demultiplexed bit stream according to any one of the first type to the nth type and the demux selection signal. The demux selection signal may vary according to the code rate of the error correction coding and the symbol mapping method of the constellation. Accordingly, the demultiplexing type may be determined according to the code rate of the error correction coding method or/and the symbol mapping method of the constellation. The detailed example according to the symbols mapped to the constellation or/and the code rate of the error correction coding according to the demux selection signal will be described later.

The mappers 1315a and 1315b may map the demultiplexed sub bit streams to the symbols according to the demux selection signal and output the mapped symbols.

FIG. 30 is a view showing a demultiplexing type which is determined according to a code rate of the error correction coding and the symbol mapping method.

In the 4QAM symbol mapping method, even when the code rate cr of the LDPC error correction coding method is any one of ¼, ⅓, ⅖, ½, ⅗, ⅔, ¾, ⅘, ⅚, ⅚ and ⁹⁄₁₀, the bit stream can be demultiplexed according to all the demultiplexing types (denoted by all).

In the 16QAM symbol mapping method, if the code rate of the LDPC error correction coding method is ¼, ⅓, ⅖ and ½, the symbols can be mapped without performing the bit interleaving and the bit demultiplexing (denoted by No-Int and No-Demux). If the code rate of the error correction coding is ⅗, the bit can be demultiplexed according to any one of the demultiplexing identifiers 9, 10 and 12. If the code rate of the error correction coding is ⅔, ¾, ⅘, ⅚, ⅚ and ⁹⁄₁₀, the input bit stream can be demultiplexed according to the demultiplexing identifier 6.

In the 64QAM symbol mapping method, if the code rate of the LDPC error correction coding is ¼, ⅓, ⅖ and ½, the symbols can be mapped without performing the bit interleaving and the bit demultiplexing. If the code rate is ⅗, the bits can be demultiplexed according to any one of the demultiplexing identifiers 9 and 10. If the code rate is ⅔, ¾, ⅘, ⅚, ⅚ and ⁹⁄₁₀, the bits can be demultiplexed according to the demultiplexing identifier 6.

In the 256QAM symbol mapping method, if the code rate of the LDPC error correction coding is ¼, ⅓, ⅖ and ½, the symbols can be mapped without performing the bit interleaving and the bit demultiplexing. If the code rate is ⅗, the bits can be demultiplexed according to the demultiplexing identifier 9. If the code rate is ⅔, ¾, ⅘, ⅚, ⅚ and ⁹⁄₁₀, the bits can be demultiplexed according to the demultiplexing identifier 6.

As described above, the bit demultiplexing type may vary according to the code rate used for the error correction coding and the symbol mapping method. Accordingly, the error correction capability of a bit located on a specific location of the error-correction-coded block may be adjusted by mapping the demultiplexed sub streams to the symbols. Accordingly it is possible to optimize the robustness in the bit level.

FIG. 31 is a view showing an example of expressing the demultiplexing method by an equation. For example, if the symbol mapping method is QPSK, the input bits (xi, xN/2+i) correspond to the demultiplexed bits y0 and y1. If the symbol mapping method is 16QAM, the input bits $$\left(x_{\frac{2N}{4}+i}, x_{\frac{3N}{4}+i}, x_i, x_{\frac{n}{4}+i}\right)$$

correspond to the demultiplexed bits y0, y1, y2 and y3.
If the symbol mapping method is 64QAM, the input bits $$\left(x_{\frac{4N}{6}+i}, x_{\frac{5N}{6}+i}, x_{\frac{2N}{6}+i}, x_{\frac{3N}{6}+i}, x_i, x_{\frac{N}{6}+i}\right)$$

correspond to the demultiplexed bits y0, y1, y2, y3, y4 and y5.
If the symbol mapping method is 256QAM, the input bits $$\left(x_{\frac{6N}{8}+i}, x_{\frac{7N}{8}+i}, x_{\frac{4N}{8}+i}, x_{\frac{5N}{8}+i}, x_{\frac{2N}{8}+i}, x_{\frac{3N}{8}+i}, x_i, x_{\frac{N}{8}+i}\right)$$

correspond to the demultiplexed bits y0, y1, y2, y3, y4, y5, y6 and y7.

Here, N denotes the number of bits mapped to the symbols with respect to the input of the bit interleaver.

Figure 32:
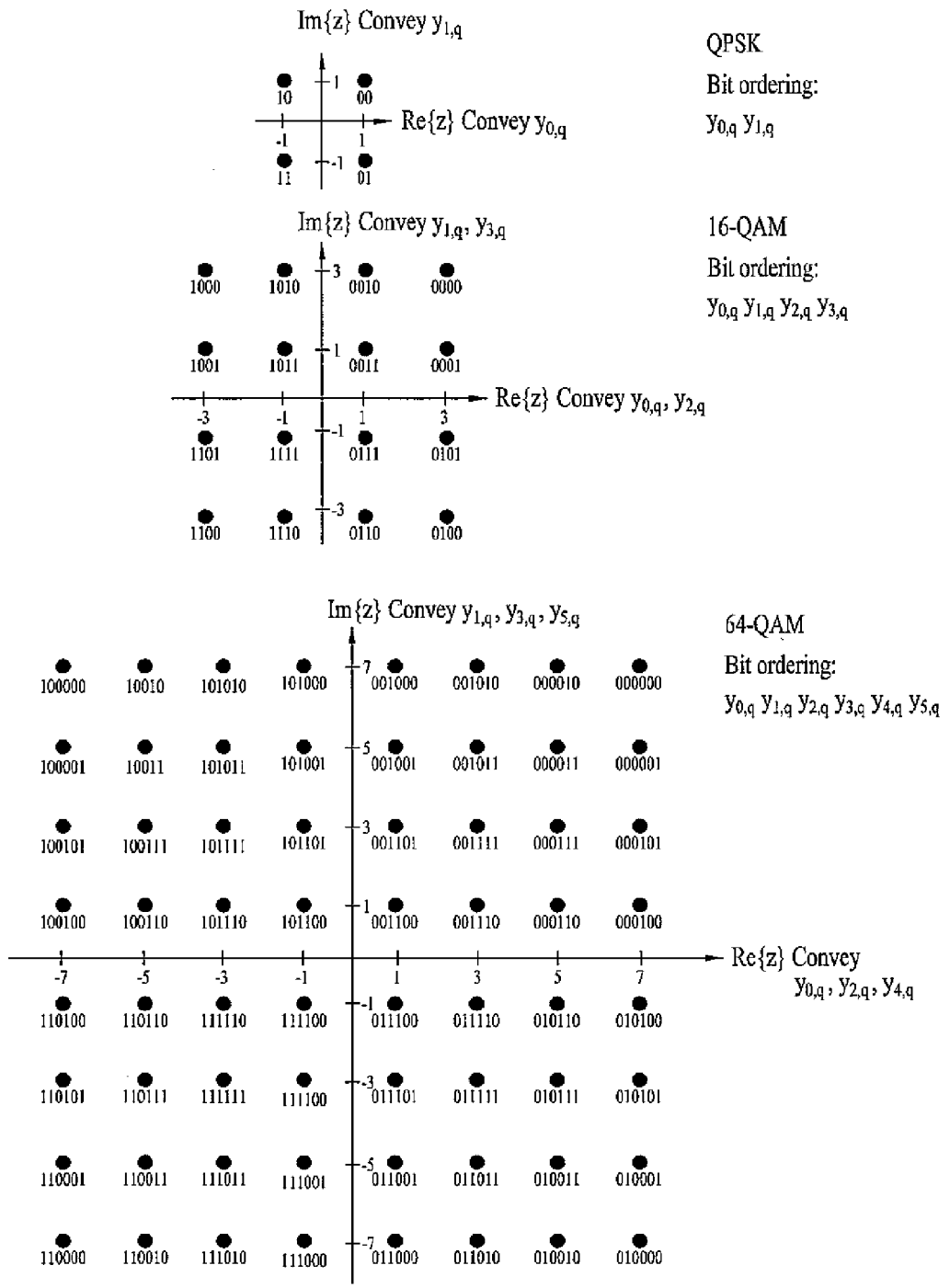
FIG. 32 is a view showing an example of mapping a symbol by a symbol mapper.

FIG. 32 is a view showing an example of mapping a symbol by a symbol mapper. For example, in the QPSK symbol mapping method, the symbols on the constellation correspond to the value of the bit y0 of the demultiplexed first sub stream and the value of the bit y1 of the demultiplexed second sub stream.

In the 16QAM, the real axis of the symbols on the constellation corresponds to the bits of the demultiplexed first and third sub streams (bits separated from the location of the MSB by 0 and 2) and the imaginary axis thereof corresponds to the bits of the demultiplexed second and fourth sub streams (bits separated from the location of the MSB by 1 and 3).

In the 64QAM, the real axis of the symbols on the constellation corresponds to the bits of the demultiplexed first, third, and fifth sub streams (bits separated from the location of the MSB by 0, 2 and 4) and the imaginary axis thereof corresponds to the bits of the demultiplexed second, fourth and sixth sub streams (bits separated from the location of the MSB by 1, 3 and 5).

Accordingly, the bits configuring the symbol may be mapped to the cell word in the demultiplexing order. If the bits configuring the cell word are demultiplexed, the MSB and the LSB of the cell word are changed and the robustness of the bits can be adjusted although the reliabilities of the LDPC error-correction-coded bits vary according to the locations.

Figure 33:
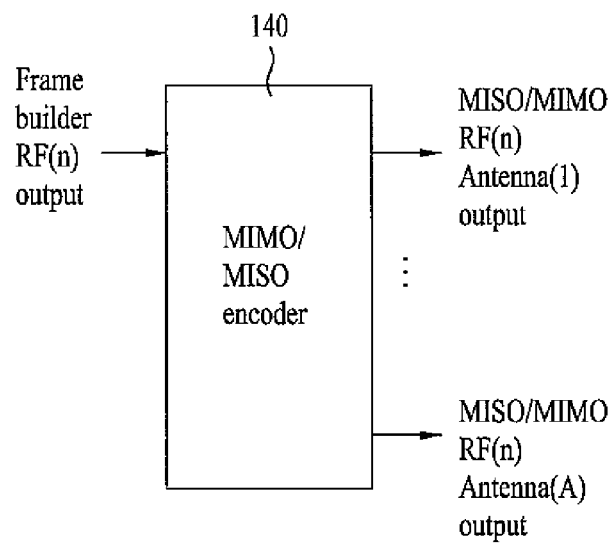
FIG. 33 is a view showing an example of a multi-path signal coder.

FIG. 33 is a block diagram illustrating a MIMO/MISO encoder according to an embodiment of the present invention. The MIMO/MISO encoder encodes the input data using the MIMO/MISO encoding scheme, and outputs the encoded data to several paths. If a signal reception end receives the signal transmitted to the several paths from one or more paths, it is able to acquire a gain (also called a diversity gain, a payload gain, or a multiplexing gain).

The MIMO/MISO encoder 140 encodes service data of each path generated from the frame builder 130, and outputs the encoded data to the A number of paths corresponding to the number of output antennas.

Figure 34:
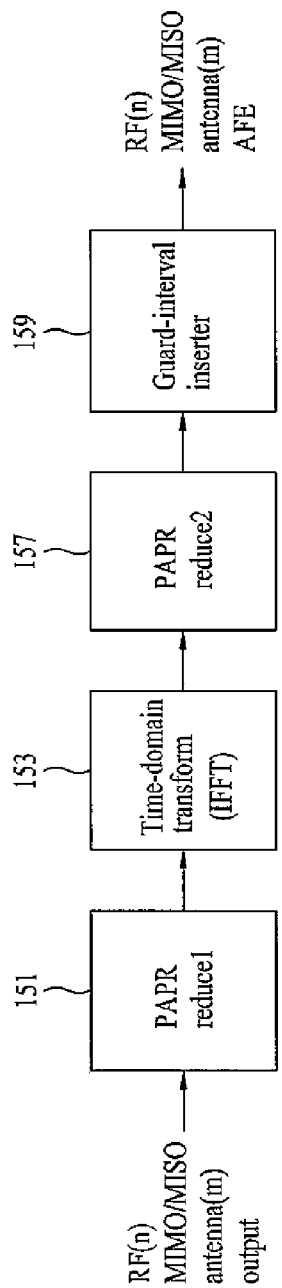
FIG. 34 is a view showing an embodiment of a modulator.

FIG. 34 is a block diagram illustrating a modulator according to an embodiment of the present invention. The modulator includes a first power controller (PAPR Reduce1) 151, a time-domain transform unit (IFFT) 153, a second power controller (PAPR Reduce2) 157, and a guard-interval inserter 159.

The first power controller 151 reduces a PAPR (Peak-to-Average Power Ratio) of data transmitted to the R number of signal paths in the frequency domain.

The time-domain transform (IFFT) unit 153 converts the received frequency-domain signals into time-domain signals. For example, the frequency-domain signals may be converted into the time-domain signals according to the IFFT algorithm. Therefore, the frequency-domain data may be modulated according to the OFDM scheme.

The second power controller (PAPR Reduce2) 157 reduces a PAPR (Peak-to-Average Power Ratio) of channel data transmitted to the R number of signal paths in the time domain. In this case, a tone reservation scheme, and an active constellation extension (ACE) scheme for extending symbol constellation can be used.

The guard-interval inserter 159 inserts the guard interval into the output OFDM symbol, and outputs the inserted result. As described above, the above-mentioned embodiment can be carried out in each signal of the R number of paths.

Figure 35:
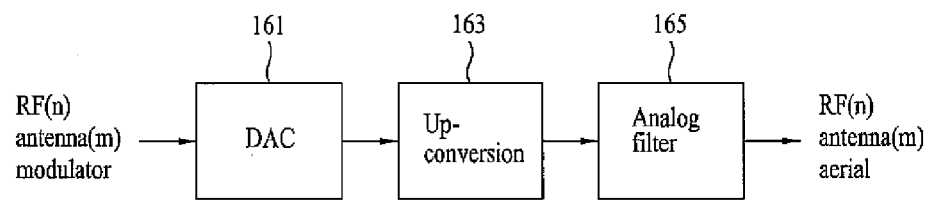
FIG. 35 is a view showing an embodiment of an analog processor 160.

FIG. 35 is a block diagram illustrating an analog processor 160 according to an embodiment of the present invention. The analog processor 160 includes a digital-to-analog converter (DAC) 161, an up-conversion unit 163, and an analog filter 165.

The DAC 161 converts the input data into an analog signal, and outputs the analog signal. The up-conversion unit 163 converts a frequency domain of the analog signal into an RF area. The analog filter 165 filters the RF-area signal, and outputs the filtered RF signal.

Figure 36:
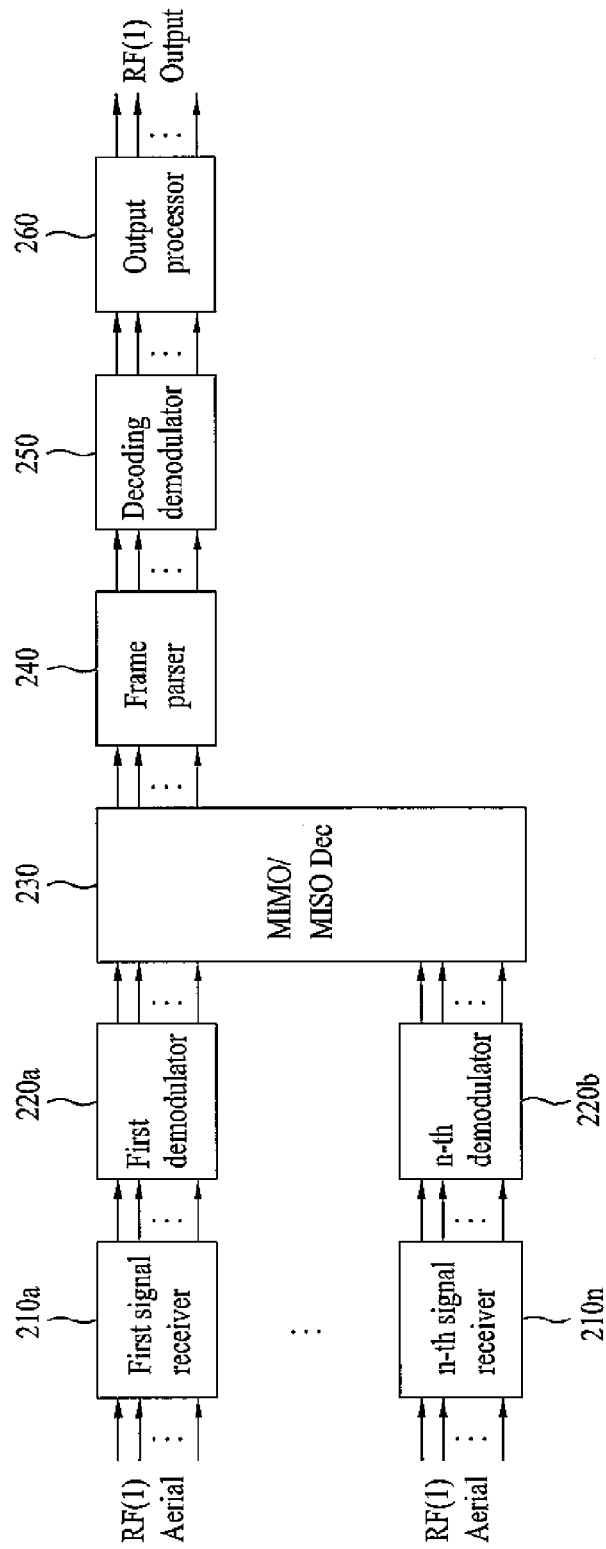
FIG. 36 is a view showing an embodiment of a signal receiving apparatus capable of receiving a signal frame.

FIG. 36 is a block diagram illustrating an apparatus for receiving a signal according to an embodiment of the present invention. The signal reception apparatus includes a first signal receiver 210a, an n-th signal receiver 210n, a first demodulator 220a, an n-th demodulator 220n, a MIMO/MISO decoder 230, a frame parser 240, and a decoding demodulator 250, and an output processor 260.

In the case of a reception signal according to the TFS signal frame structure, several services are multiplexed to R channels, and are then time-shifted, such that the time-shifted result is transmitted.

The receiver may include at least one signal receiver for receiving a service transmitted over at least one RF channel. The TFS signal frame transmitted to the R (where R is a natural number) number of RF channels can be transmitted to a multi-path via the A number of antennas. The A antennas have been used for the R RF channels, such that a total number of antennas is R×A.

The first signal receiver 210a is able to receive service data transmitted via at least one path from among overall service data transmitted via several RF channels. For example, the first signal receiver 210a can receive the transmission signal processed by the MIMO/MISO scheme via several paths.

The first signal receiver 210a and the n-th signal receiver 210n can receive several service data units transmitted over n number of RF channels from among several RF channels, as a single PLP. Namely, this embodiment shows the signal reception apparatus capable of simultaneously receiving data of the R number of RF channels. Therefore, if this embodiment receives a single RF channel, only the first receiver 210a is needed.

The first demodulator 220a and the n-th demodulator 220n demodulate signals received in the first and n-th signal receivers 210a and 210n according to the OFDM scheme, and output the demodulated signals.

The MIMO/MISO decoder 230 decodes service data received via several transmission paths according to the MIMO/MISO decoding scheme, and outputs the decoded service data to a single transmission path. If the number R of services transmitted over several transmission paths are received, the MIMO/MISO decoder 230 can output single PLP service data contained in each of R services corresponding to the number of R channels. If P number of services are transmitted via the R number of RF channels, and signals of individual RF channels are received via the A number of antennas, the receiver decodes the P number of services using a total of (R×A) reception antennas.

The frame parser 240 parses the TFS signal frame including several services, and outputs the parsed service data.

The decoding demodulator 250 performs the error correction decoding on the service data contained in the parsed frame, demaps the decoded symbol data into bit data, and outputs the demapping-processed result.

The output processor 260 decodes a stream including the demapped bit data, and outputs the decoded stream.

In the above-mentioned description, each of the frame parser 240, and the decoding demodulator 250, and the output processor 260 receives several service data units as many as the number of PLPs, and performs signal processing on the received service data.

Figure 37:
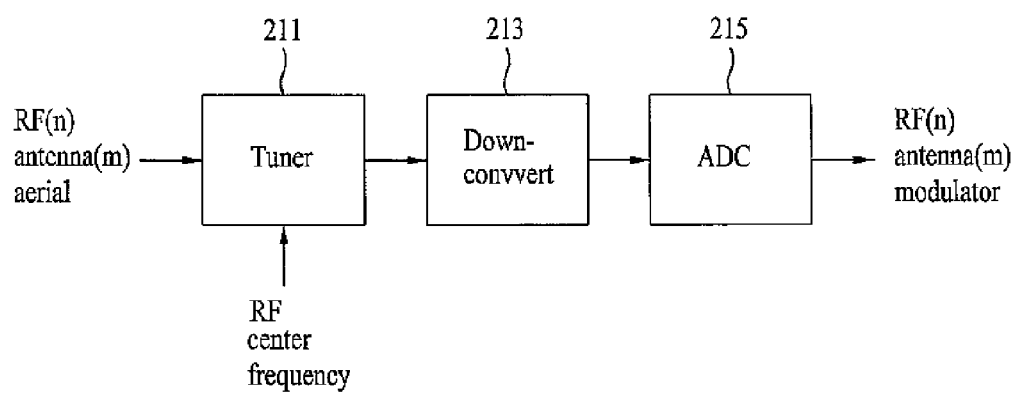
FIG. 37 is a view showing an embodiment of a signal receiver.

FIG. 37 is a block diagram illustrating a signal receiver according to an embodiment of the present invention. The signal receiver may include a tuner 211, a down-converter 213, and an analog-to-digital converter (ADC) 215.

The tuner 211 performs hopping of some RF channels capable of transmitting user-selected services in all RF channels when the PLP is included in several RF channels, and outputs the hopping result. The tuner 211 performs hopping of RF channels contained in the TFS signal frame according to input RF center frequencies, and at the same time tunes corresponding frequency signals, such that it outputs the tuned signals. If a signal is transmitted to A number of multi-paths, the tuner 211 performs the tuning to a corresponding RF channel, and receives reception signals via the A number of antennas.

The down converter 213 performs down conversion of the RF frequency of the signal tuned by the tuner 211, and outputs the down-conversion result. The ADC 215 converts an analog signal into a digital signal.

Figure 38:
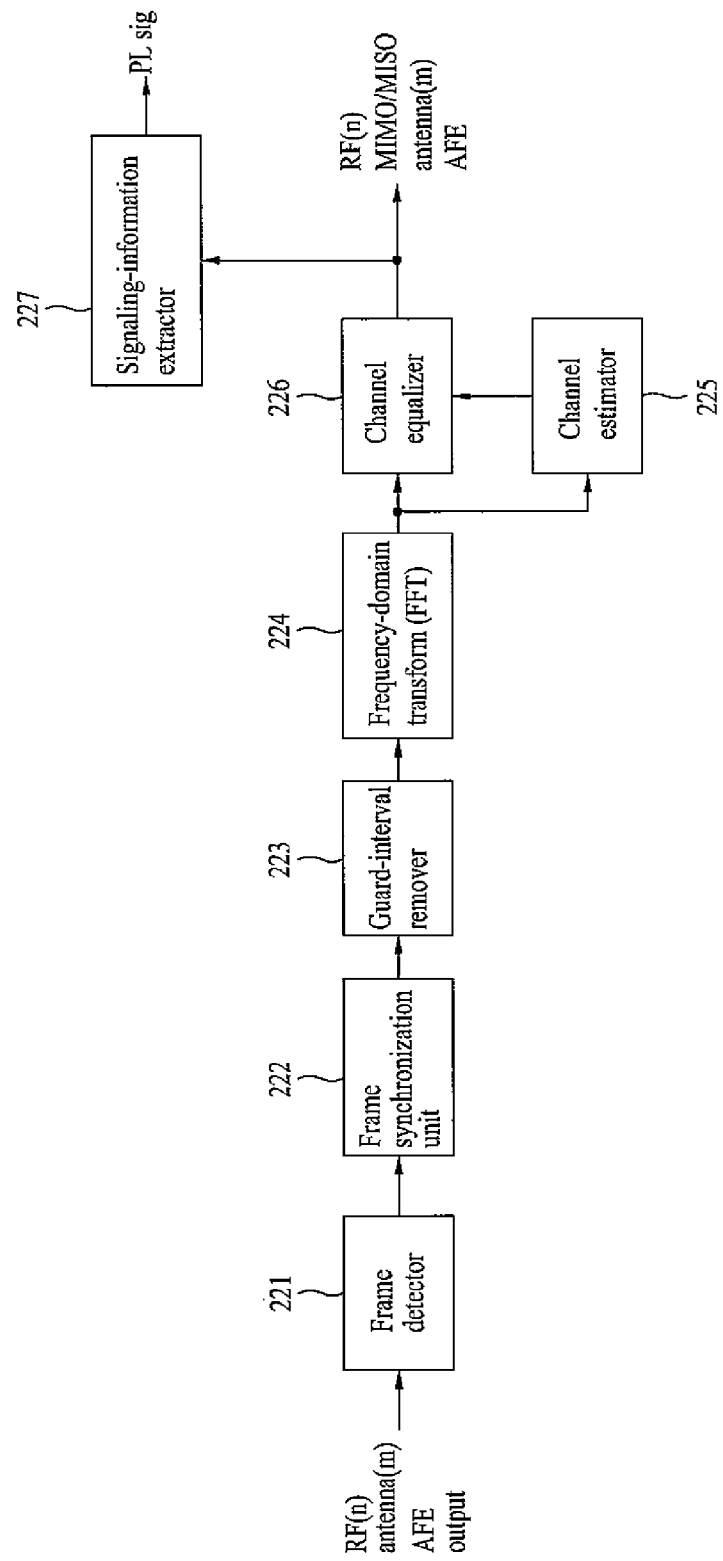
FIG. 38 is a view showing an embodiment of a demodulator.

FIG. 38 is a block diagram illustrating a demodulator according to an embodiment of the present invention. The demodulator includes a frame detector 221, a frame synchronization unit 222, a guard-interval remover 223, a frequency-domain transform unit (FFT) 224, a channel estimator 225, a channel equalizer 226, and a signaling-information extractor 227.

If the demodulator acquires service data transmitted to a single PLP stream, the following signal demodulation will be carried out. A detailed description thereof will hereinafter be described.

The frame detector 221 identifies a delivery system of a reception signal. For example, the frame detector 221 determines whether the reception signal is a DVB-TS signal or not. And, the frame detector 221 may also determine whether a reception signal is a TFS signal frame or not. The frame synchronization unit 222 acquires time- and frequency-domain synchronization of the TFS signal frame.

The guide interval controller 223 removes a guard interval located between OFDM symbols from the time domain. The frequency-domain converter (FFT) 224 converts a reception signal into a frequency-domain signal using the FFT algorithm, such that it acquires frequency-domain symbol data.

The channel estimator 225 performs channel estimation of a reception channel using a pilot symbol contained in symbol data of the frequency domain. The channel equalizer 226 performs channel equalization of reception data using channel information estimated by the channel estimator 225.

The signaling information extractor 227 can extract the signaling information of a physical layer established in the first and second pilot signals contained in channel-equalized reception data.

Figure 39:
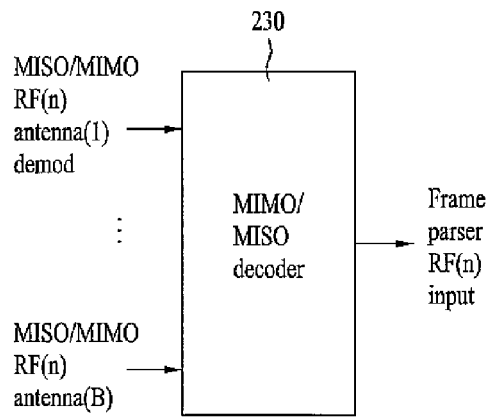
FIG. 39 is a view showing a multi-path signal decoder.

FIG. 39 is a block diagram illustrating a MIMO/MISO decoder according to an embodiment of the present invention. The signal receiver and the demodulator are designed to process a signal received in a single path. If the signal receiver and the demodulator receive PLP service data providing a single service via several paths of several antennas, and demodulate the PLP service data, the MIMO/MIMO decoder 230 outputs the signal received in several paths as service data transmitted to a single PLP. Therefore, the MIMO/MISO decoder 230 can acquire a diversity gain and a multiplexing gain from service data received in a corresponding PLP.

The MIMO/MISO decoder 230 receives a multi-path transmission signal from several antennas, and is able to decode a signal using a MIMO scheme capable of recovering each reception signal in the form of a single signal. Otherwise, the MIMO/MISO decoder 230 is able to recover a signal using a MIMO scheme which receives the multi-path transmission signal from a single antenna and recovers the received multi-path transmission signal.

Therefore, if the signal is transmitted via the R number of RF channels (where R is a natural number), the MIMO/MISO decoder 230 can decode signals received via the A number of antennas of individual RF channels. If the A value is equal to "1", the signals can be decoded by the MISO scheme. If the A value is higher than "1", the signals can be decoded by the MIMO scheme.

Figure 40:
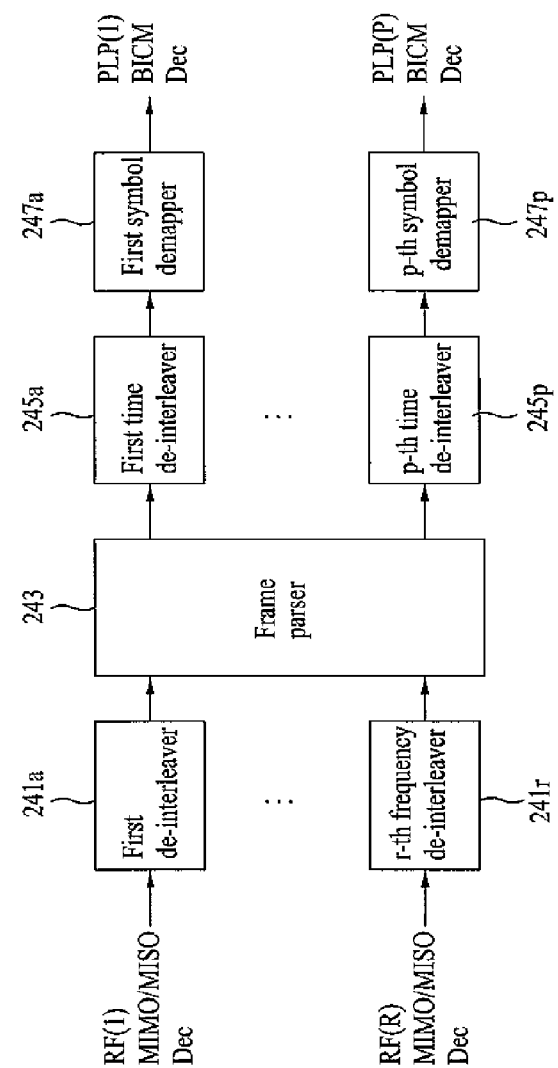
FIG. 40 is a view showing an embodiment of a frame parser.

FIG. 40 is a block diagram illustrating a frame parser according to an embodiment of the present invention. The frame parser includes a first frequency de-interleaver 241a, a r-th frequency de-interleaver 241r, a frame parser 243, a first time de-interleaver 245a, a p-th time de-interleaver 245p, a first symbol demapper 247a, and a p-th symbol demapper. The value of "r" can be decided by the number of RF channels, and the value of "p" can be decided by the number of streams transmitting PLP service data generated from the frame parser 243.

Therefore, if p number of services are transmitted to p number of PLP streams over R number of RF channels, the frame parser includes the r number of frequency de-interleavers, the p number of time de-interleavers, and the p number of symbol demappers.

In association with a first RF channel, the first frequency interleaver 241a performs de-interleaving of frequency-domain input data, and outputs the de-interleaving result.

The frame parser 243 parses the TFS signal frame transmitted to several RF channels using scheduling information of the TFS signal frame, and parses PLP service data contained in the slot of a specific RF channel including a desired service. The frame parser 243 parses the TFS signal frame to receive specific service data distributed to several RF channels according to the TFS signal frame structure, and outputs first-path PLP service data.

The first time de-interleaver 245a performs de-interleaving of the parsed first-path PLP service data in the time domain. The first symbol demapper 247a determines service data mapped to the symbol to be bit data, such that it can output a PLP stream associated with the first-path PLP service data.

Provided that symbol data is converted into bit data, and each symbol data includes symbols based on the hybrid symbol-mapping scheme, the p number of symbol demappers, each of which includes the first symbol demapper, can determine the symbol data to be bit data using different symbol-demapping schemes in individual intervals of the input symbol data.

Figure 41:
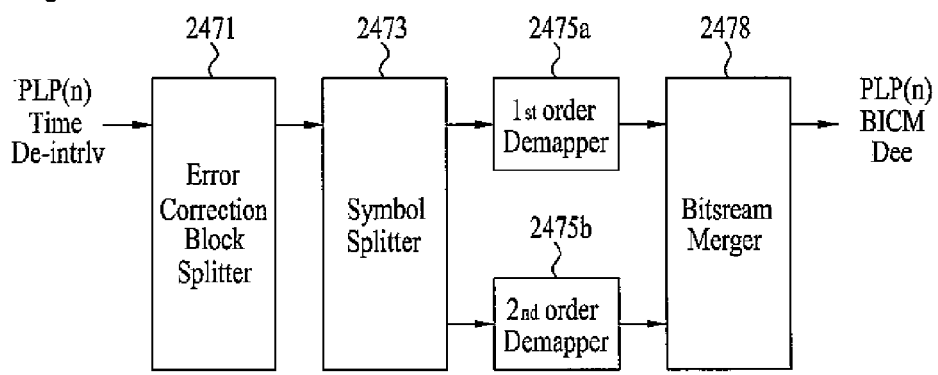
FIG. 41 is a view showing an embodiment of each of symbol demappers 247a and 247p.

FIG. 41 is a view showing an embodiment of each of symbol demappers 247a and 247p. The symbol demappers receive the streams corresponding to the PLPs from the time interleavers 245a and 245p respectively corresponding to the symbol demappers.

Each of the symbol demappers 247a and 247p may include an error correction block splitter 2471, a symbol splitter 2473, a first order demapper 2475a, a second order demapper 2475b and a bit stream merger 2478.

The error correction block splitter 2471 may split the PLP stream received from the corresponding one of the time interleavers 245a and 245p in the error correction block units. The error correction block splitter 2471 may split the service stream in the normal mode LDPC block unit. In this case, the service stream may be split in a state in which four blocks according to the short mode (the block having the length of 16200 bits) are treated as the error correction block of one block according to the normal mode (the block having the length of 64800 bits).

The symbol splitter 2473 may split the symbol stream in the split error correction block according to the symbol mapping method of the symbol stream.

For example, the first order demapper 2475a converts the symbols according to the higher order symbol mapping method into the bits. The second order demapper 2475b converts the symbols according to the lower order symbol mapping method into the bits.

The bit stream merger 2478 may receive the converted bits and output one bit stream.

Figure 42:
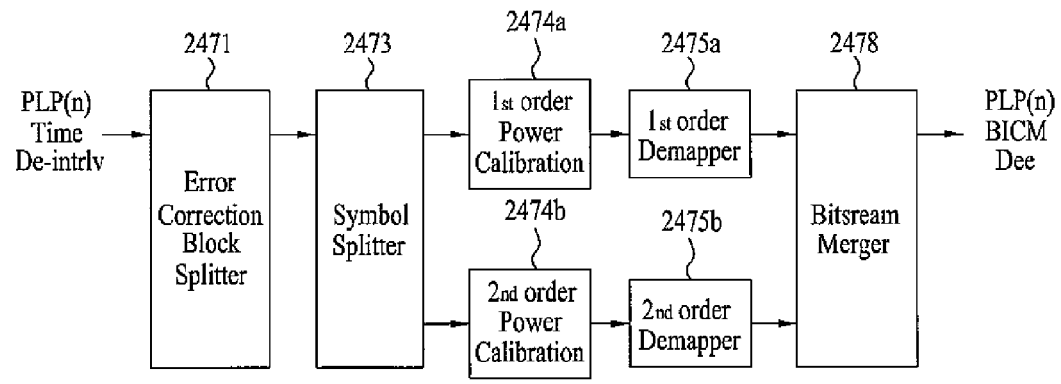
FIG. 42 is a view showing another embodiment of each of the symbol demappers 247a and 247p.

FIG. 42 is a view showing another embodiment of each of the symbol demappers 247a and 247p. The embodiment of this drawing is similar to the embodiment of FIG. 41 except that a first order power calibration unit 2474a and a second order power calibration unit 2474b are further included.

The first order power calibration unit 2474a receives the symbols split by the symbol splitter 2473, calibrates the power of the received symbols according to the symbol mapping schemes, and outputs the calibrated symbols. The power of the received symbols may have the power calibrated according to the size of the constellation based on the symbol mapping methods. The first order power calibration unit 2474a converts the power calibrated in accordance with the into the original symbol power of the constellation. The first order demapper 2475a may demap the symbols, of which the power is calibrated by the first order power calibration unit, to the bits.

Similarly, the second order power calibration unit 2474b receives the symbols split by the symbol splitter 2473, modified the calibrated power of the received symbols to the original power according to the size of the constellation, and outputs the modified symbols.

Figure 43:
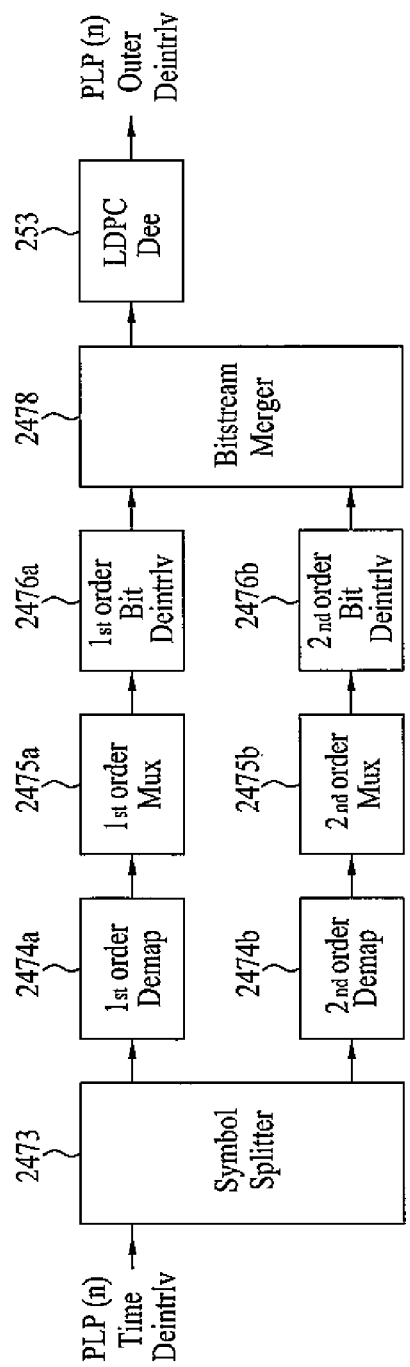
FIG. 43 is a view showing another embodiment of each of the symbol demappers 247a and 247p.

FIG. 43 is a view showing another embodiment of each of the symbol demappers 247a and 247p. Each of the symbol demappers 247a and 247p may include a symbol splitter 2473, a first order demapper 2474a, a second order demapper 2474b, a first order mux 2475a, a second order mux 2475b, a first order bit deinterleaver 2476a, a second order bit deinterleaver 2476b and a bit stream merger 2478. By this embodiment, the embodiment of the decoding and demodulation unit of FIG. 33 includes a first decoder 253, a first deinterleaver 255 and a second decoder 257.

The symbol splitter 2473 may split the symbol stream of the PLP according to the method corresponding to the symbol mapping method.

The first order demapper 2474a and the second order demapper 2474b convert the split symbol streams into bits. For example, the first order demapper 2474a performs the symbol demapping of the higher order QAM and the second order demapper 2474b performs the symbol demapping of the lower order QAM. For example, the first order demapper 2474a may perform the symbol demapping of 256QAM and the second order demapper 2474b may perform the symbol demapping of 64QAM.

The first order mux 2475a and the second order mux 2475b multiplex the symbol-mapped bits. The multiplexing methods may correspond to the demultiplexing methods described with reference to FIGS. 15 to 18. Accordingly, the demultiplexed sub streams may be converted into one bit stream.

The first order bit deinterleaver 2476a deinterleaves the bit streams multiplexed by the first order mux 2475a. The second order bit deinterleaver 2476b deinterleaves the bits multiplexed by the first order mux 2475a. The deinterleaving method corresponds to the bit interleaving method. The bit interleaving method is shown in FIG. 12.

The bit stream merger 2478 may merge the bit streams deinterleaved by the bit interleavers 2476a and 2476b to one bit stream.

The first decoder 253 of the decoding and demodulation unit may error correction decode the output bit stream according to the normal mode or the short mode and the code rate according to the modes.

Figure 44:
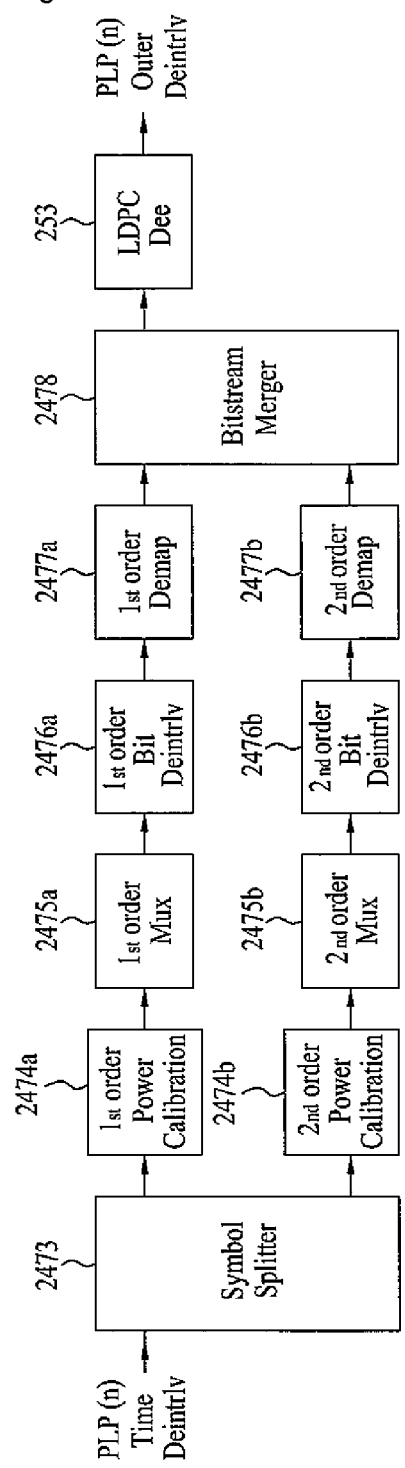
FIG. 44 is a view showing another embodiment of each of the symbol demappers 247a and 247p.

FIG. 44 is a view showing another embodiment of each of the symbol demappers 247a and 247p. The embodiment of this drawing is similar to the embodiment of FIG. 43 except that a first order power calibration unit 2474a and a second order power calibration unit 2474b are further included. The first order power calibration unit 2474a and the second order power calibration unit 2474b modify the calibrated powers of the symbols according to the symbol mapping methods and output the modified symbols to the symbol demappers 2475a and 2475b.

Figure 45:
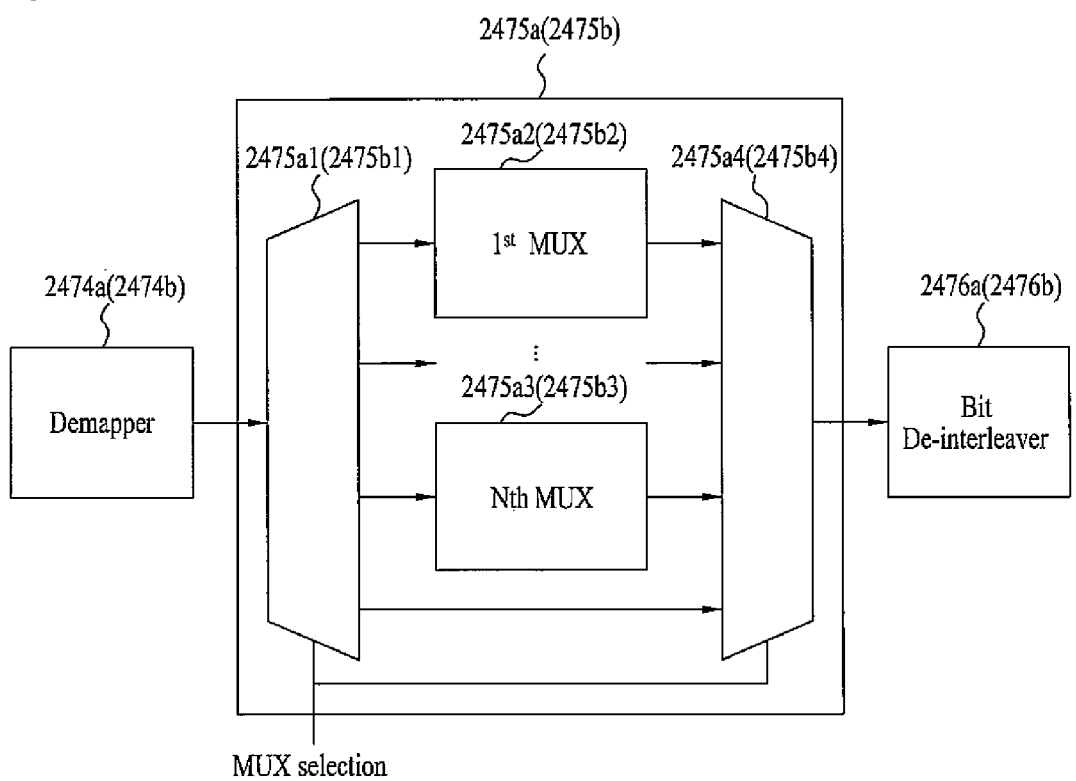
FIG. 45 is a view showing an embodiment of multiplexing a demultiplexed sub stream.

FIG. 45 is a view showing an embodiment of multiplexing the demultiplexed sub stream. In this embodiment, the demappers 2474a and 2474b decide the cell words including the bits. The muxs 2475a and 2475b multiplex the decided cell words according to the mux selection signal. The demultiplexed cell words are input to any one of first muxs 2475a2 and 2475b2 to nth muxs 2475a3 and 2475b3.

The first muxs 2475a2 and 2475b2 to the nth muxs 2475a3 and 2475b3 change the order of the bits in the cell words input according to the mux selection signal. The mux selection signal may be changed according to the code rate of the error correction coding or the symbol mapping method. In order to generate one stream and the bit streams delivered to the muxs, the order of selecting the sub stream may be changed according to the mux selection signal.

The first demuxs 2475a1 and 2475b1 output the symbol-demapped bit streams to any one of the first muxs 2475a2 and 2475b2 to the nth muxs 2475a3 and 2475b3 according to the mux selection signal. The first sub muxs 2475a1 and 2475b1 may receive the sub streams multiplexed by the first muxs 2475a2 and 2475b2 to the nth muxs 2475a3 and 2475b3 and output one stream, according to the mux selection signal.

The cell words including the changed bits are input to the bit interleavers 2476a and 2476b, and the bit deinterleavers 2476a and 2476b deinterleave the input bits and output the deinterleaved bits.

Figure 46:
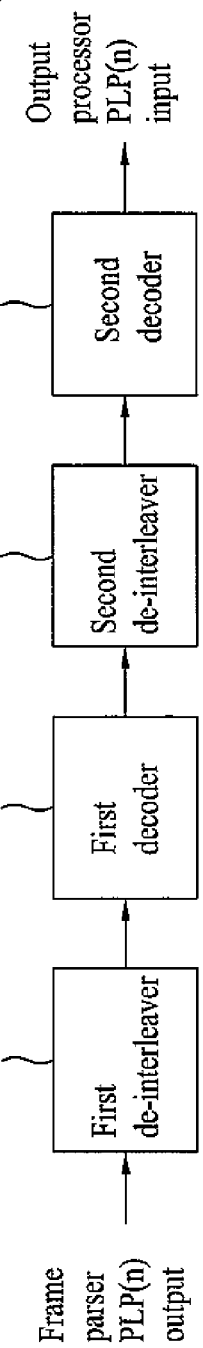
FIG. 46 is a view showing an example of a decoding and demodulation unit.

FIG. 46 is a block diagram illustrating a decoding demodulator according to an embodiment of the present invention. The decoding demodulator may include several function blocks corresponding to the coding and modulation unit. In this embodiment, the decoding demodulator of FIG. 16 may include a first de-interleaver 251, a first decoder 253, a second de-interleaver 255, and a second decoder 257. The second de-interleaver 255 can be selectively contained in the decoding demodulator.

The first de-interleaver 251 acts as an inner de-interleaver, and is able to perform de-interleaving of the p-th PLP stream generated from the frame parser.

The first decoder 253 acts as an inner decoder, can perform error correction of the de-interleaved data, and can use an error correction decoding algorithm based on the LDPC scheme.

The second de-interleaver 255 acts as an outer interleaver, and can perform de-interleaving of the error-correction-decoded data.

The second decoder 257 acts as an outer decoder. Data de-interleaved by the second de-interleaver 255 or error-corrected by the first decoder 253 is error-corrected again, such that the second decoder 257 outputs the re-error-corrected data. The second decoder 257 decodes data using the error correction decoding algorithm based on the BCH scheme, such that it outputs the decoded data.

The first de-interleaver 251 and the second de-interleaver 255 are able to convert the burst error generated in data contained in the PLP stream into a random error. The first decoder 253 and the second decoder 257 can correct errors contained in data.

The decoding demodulator shows operation processes associated with a single PLP stream. If the p number of streams exist, the p number of decoding demodulators are needed, or the decoding demodulator may repeatedly decode input data p times.

Figure 47:
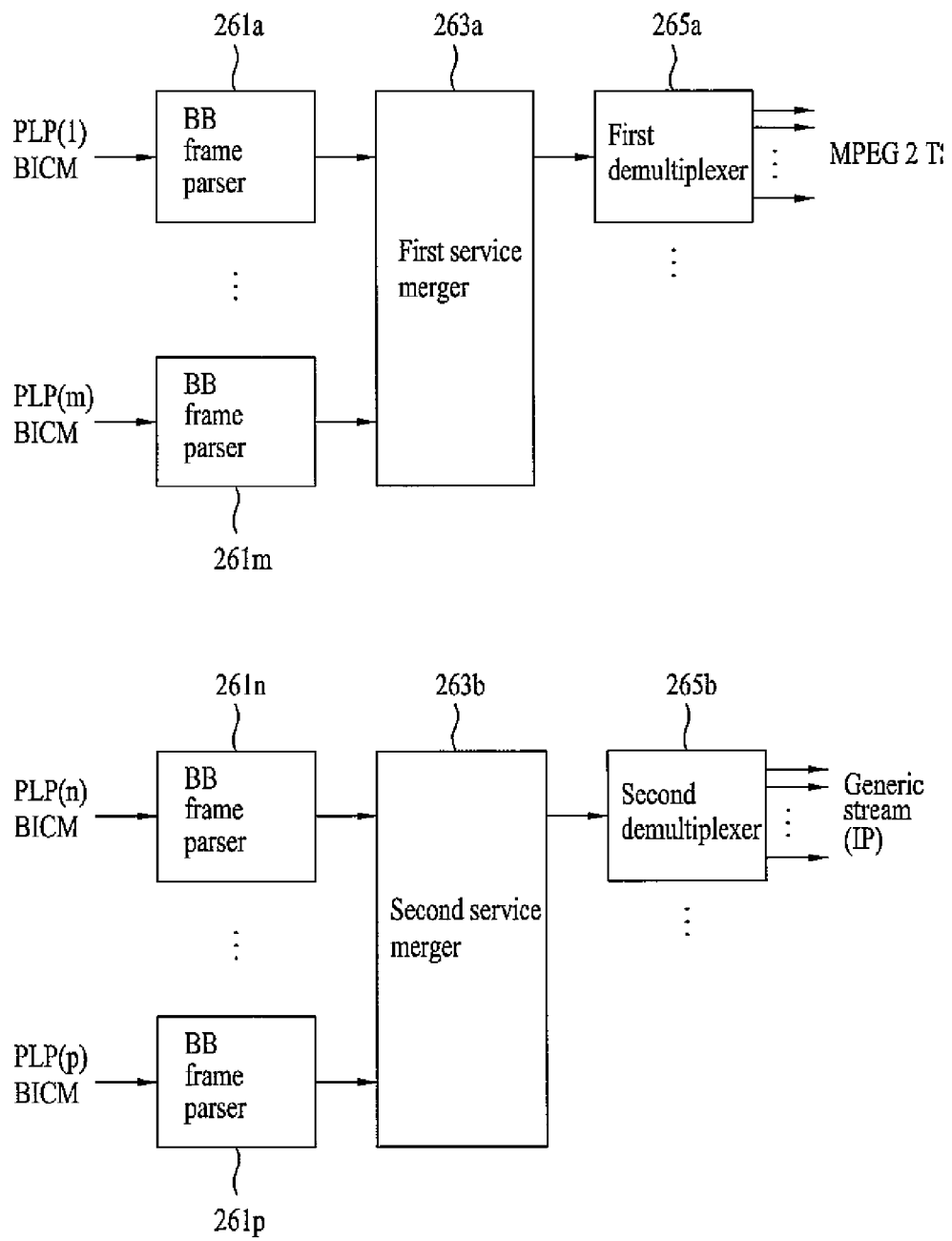
FIG. 47 is a view showing an embodiment of an output processor.

FIG. 47 is a block diagram illustrating an output processor according to an embodiment of the present invention. The output processor may include p number of baseband (BB) frame parsers (251a, . . . , 261p), a first service merger 263a, a second service merger 263b, a first demultiplexer 265a, and a second demultiplexer 265b.

The BB frame parsers (261a, . . . , 261p) remove BB frame headers from the first to p-th PLP streams according to the received PLP paths, and output the removed result. This embodiment shows that service data is transmitted to at least two streams. A first stream is an MPEG-2 TS stream, and a second stream is a GS stream.

The first service merger 263a calculates the sum of service data contained in payload of at least one BB frame, such that it outputs the sum of service data as a single service stream. The first demultiplexer 255a may demultiplex the service stream, and output the demultiplexed result.

In this way, the second service merger 263b calculates the sum of service data contained in payload of at least one BB frame, such that it can output another service stream. The second demultiplexer 255b may demultiplex the GS-format service stream, and output the demultiplexed service stream.

Figure 48:
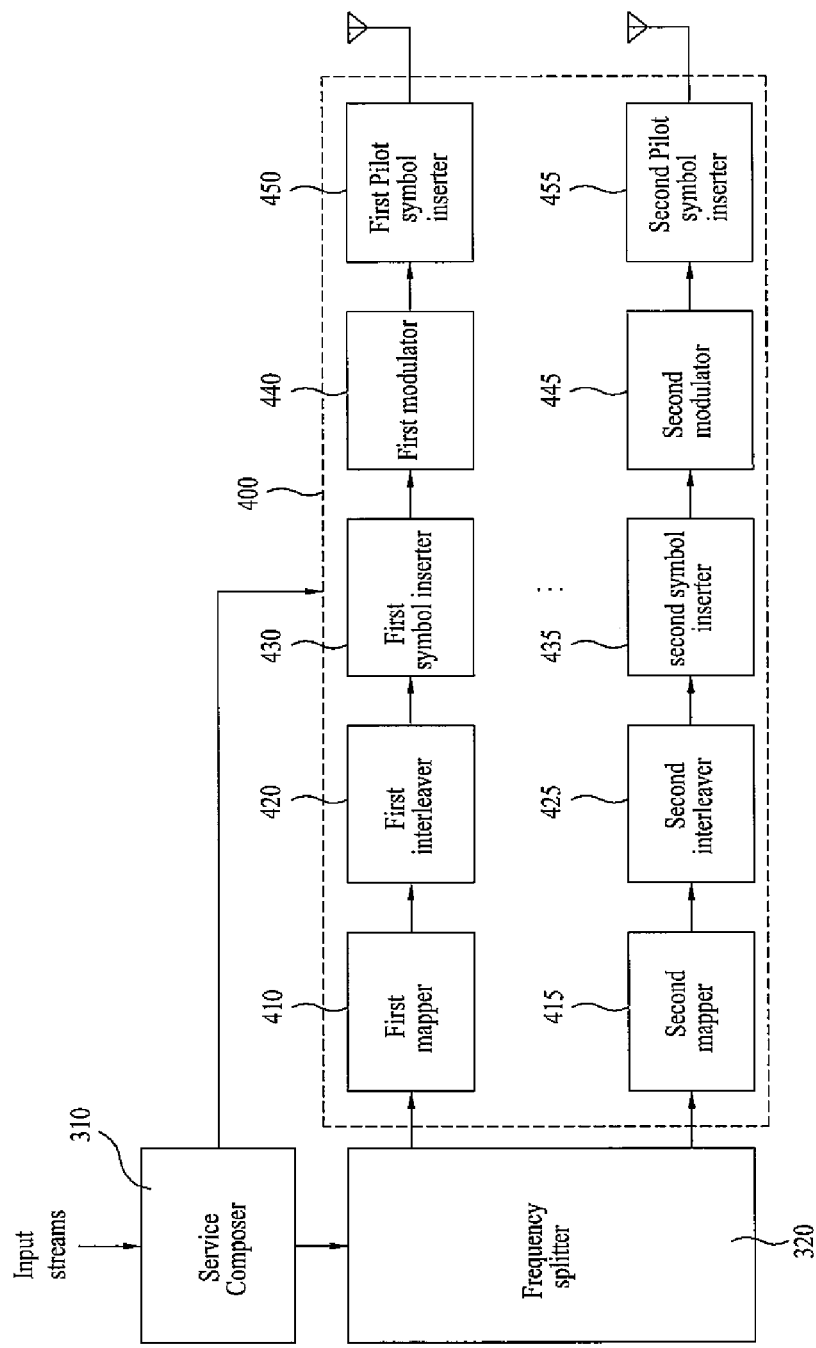
FIG. 48 is a view showing another embodiment of a signal transmitting apparatus for transmitting a signal frame.

FIG. 48 is a block diagram illustrating an apparatus for transmitting a signal according to an embodiment of another embodiment of an embodiment of by the present invention. The signal transmission apparatus includes a service composer 310, a frequency splitter 320, and a transmitter 400. The transmitter 400 encodes or modulates a signal including a service stream to be transmitted to each RF band.

The service composer 310 receives several service streams, multiplexes several service streams to be transmitted to individual RF channels, and outputs the multiplexed service streams. The service composer 310 outputs scheduling information, such that it controls the transmitter 400 using the scheduling information, when the transmitter 400 transmits the PLP via several RF channels. By this scheduling information, the service composer 310 modulates several service frames to be transmitted to the several RF channels by the transmitter 400, and transmits the modulated service frames.

The frequency splitter 320 receives a service stream to be transmitted to each RF band, and splits each service stream into several sub-streams, such that the individual RF frequency bands can be allocated to the sub-streams.

The transmitter 400 processes the service streams to be transmitted to individual frequency bands, and outputs the processed resultant streams. For example, in association with a specific service stream to be transmitted to the first RF channel, the first mapper 410 maps the input service stream data into symbols. The first interleaver 420 interleaves the mapped symbols to prevent the burst error.

The first symbol inserter 430 can insert a signal frame equipped with a pilot signal (e.g., a scatter pilot signal or a continual pilot signal) into the modulated signal.

The first modulator 440 modulates the data interleaved by the signal modulation scheme. For example, the first modulator 440 can modulate signals using the OFDM scheme.

The first pilot symbol inserter 450 inserts the first pilot signal and the second pilot signal in the signal frame, and is able to transmit the TFS signal frame.

Service stream data transmitted to the second RF channel is transmitted to the TFS signal frame via several blocks 415, 425, 435, 445, and 455 of different paths shown in the transmitter of FIG. 18.

The number of signal processing paths transmitted from the transmitter 400 may be equal to the number of RF channels contained in the TFS signal frame.

The first mapper 410 and the second mapper may respectively include the demultiplexers 1313a and 1313b, and allow the locations of the MSB and the LSB to be changed in the symbol-mapped cell word.

Figure 49:
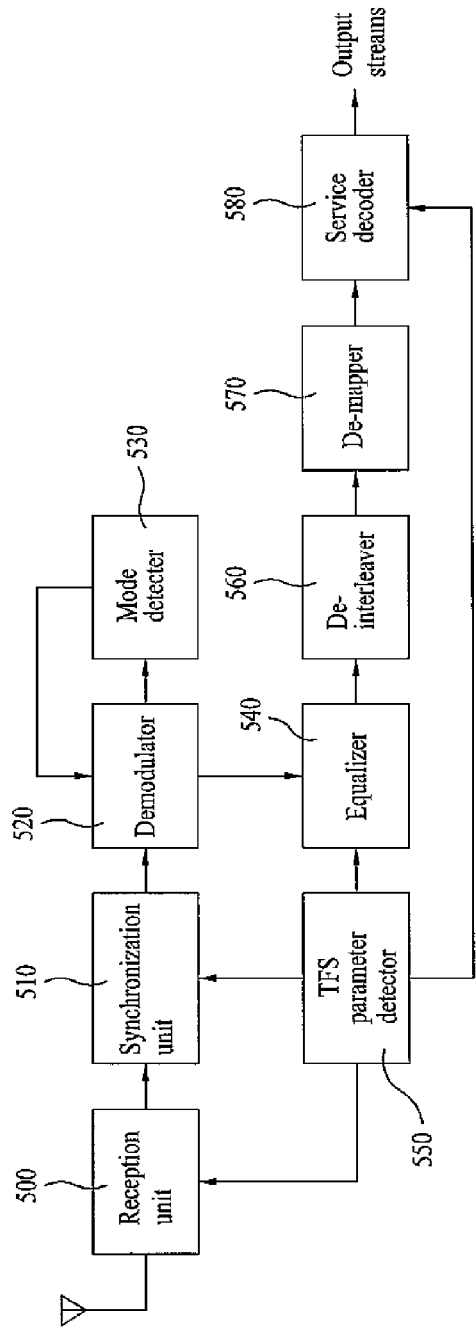
FIG. 49 is a view showing another embodiment of a signal receiving apparatus for receiving a signal frame.

FIG. 49 is a block diagram illustrating an apparatus for receiving a signal according to another embodiment of the present invention. The signal reception apparatus may include a reception unit 510, a synchronization unit 520, a mode detector 530, an equalizer 540, a parameter detector 550, a de-interleaver 560, a demapper 570, and a service decoder 580.

The reception unit 500 is able to receive signals of a first RF channel selected by a user from among the signal frame. If the signal frame includes several RF channels, the reception unit 500 performs hopping of the several RF channels, and at the same time can receive a signal including the selected service frame.

The synchronization unit 510 acquires synchronization of a reception signal, and outputs the synchronized reception signal. The demodulator 520 is able to demodulate the synchronization-acquired signal. The mode detector 530 can acquire a FFT mode (e.g., 2 k, 4 k, 8 k FFT operation length) of the second pilot signal using the first pilot signal of the signal frame.

The demodulator 520 demodulates the reception signal under the FFT mode of the second pilot signal. The equalizer 540 performs channel estimation of the reception signal, and outputs the channel-estimation resultant signal. The de-interleaver 560 deinterleaves the channel-equalized reception signal. The demapper 570 demaps the interleaved symbol using the symbol demapping scheme corresponding to the transmission-signal symbol mapping scheme (e.g., QAM).

The parameter detector 550 acquires physical parameter information (e.g., Layer-1 (L1) information) contained in the second pilot signal from the output signal of the equalizer 540, and transmits the acquired physical parameter information to the reception unit 500 and the synchronization unit 510. The reception unit 500 is able to change the RF channel to another channel using network information detected by the parameter detector 550.

The parameter detector 550 outputs service-associated information, service decider 580 decodes service data of the reception signal according to the service-associated information from the parameter detector 550, and outputs the decoded service data.

The demapper 570 may include the muxs 2475a and 2475b and output the bit stream obtained by restoring the order of the bits of which the locations of the MSB and the LSB are changed according to the code rate of the error correction coding and the symbol mapping method.

Hereinafter, a method for modulating a first pilot signal of a signal frame having at least one RF band and a method and apparatus for receiving the modulated first pilot signal will be described.

The time-interleaved PLP symbols are transmitted via regions, which are temporally divided in the signal frame. The time-interleaved PLP symbols may be transmitted via regions, which are divided in the frequency domain, if a plurality of RF bands exists. Accordingly, if the PLP is transmitted or received, a diversity gain can be obtained. An error correction mode and a symbol mapping method may be changed according to services corresponding to transport streams or may be changed in the service.

A first pilot signal and a second pilot signal are arranged at the start location of the signal frame having such characteristics, as a preamble signal.

As described above, the first pilot signal included in the signal frame may include an identifier for identifying the signal frame having the above-described structure. The first pilot signal may include information about the transmission structure indicating whether or not the signal frame is transmitted via multiple paths and information about an FFT mode of a signal following the first pilot signal. The receiver can detect the signal frame from the first pilot signal and obtain the information about the integral carrier frequency offset estimation and information about the FFT mode of the data symbol.

Figure 50:
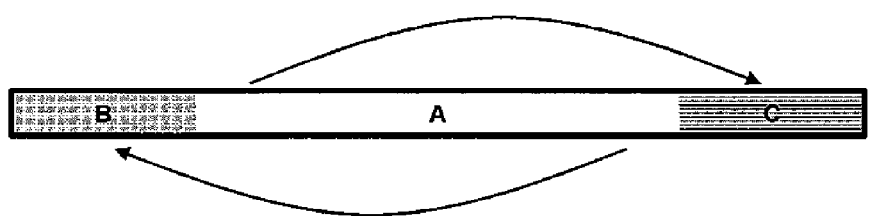
FIG. 50 is a view showing an embodiment of the structure of a first pilot signal.

FIG. 50 is a view showing an embodiment of the structure of a first pilot signal. A portion denoted by A is a useful portion of the first pilot signal. B denotes the same cyclic prefix as a first portion of the portion A in the time domain and C denotes the same cyclic suffix as a second portion of the portion A in the time region. The first portion may be duplicated from the second half of the portion A and the second portion may be duplicated from the first half of the portion A.

B and C can be respectively obtained by duplicating the first portion and the second portion and frequency shifting the duplicated portions. A relationship between B or C and A is as follows.

$$B = \text{onepart}(A) + e^{j2\pi fSHf}$$

$$C = \text{anotherpart}(A) + e^{j2\pi fSHf} \qquad \text{[Equation 1]}$$

In the above equation, SH denotes a shift unit of the frequency shift. Accordingly, the frequency shift values of the portions B and C may be inversely proportional to the lengths of the portions B and C.

If the first pilot signal is configured by frequency shifting the cyclic prefix (B) and the cyclic suffix (C), the probability that the data symbol is erroneously detected to the preamble is low and the probability that the preamble is erroneously detected is reduced, although the data symbols configuring the PLP and the symbols configuring the preamble are modulated in the same FFT mode.

If continuous wave (CW) interference is included like an analog TV signal, the probability that the preamble is erroneously detected due to a noise DC component generated in a correlation process, is reduced. In addition, if the size of the FFT applied to the data symbols configuring the PLP is larger than that of the FFT applied to the preamble, preamble detection performance can be improved even in a delay spread channel having a length equal to or greater than that of the useful symbol portion A of the preamble. Since both the cyclic prefix (B) and the cyclic suffix (C) are used in the preamble, the fractional carrier frequency offset can be estimated by the correlation process.

Figure 51:
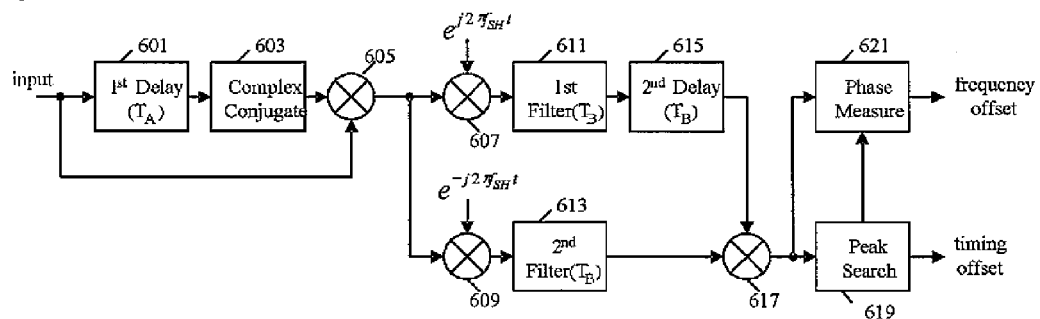
FIG. 51 is a view showing an embodiment of detecting a preamble signal shown in FIG. 50 and estimating a timing offset and a frequency offset.

FIG. 51 is a view showing an embodiment of detecting a preamble signal shown in FIG. 50 and estimating a timing offset and a frequency offset. This embodiment may be included in the frame detector 221 or the frame synchronization unit 222.

This embodiment may include a first delay unit 601, a complex conjugate calculation unit 603, a first multiplier 605, a second multiplier 607, a first filter 611, a second delay unit 615, a third multiplier 609, a second filter 613, a fourth multiplier 617, a peak search unit 619, and a phase measurement unit 621.

The first delay unit 601 may delay a received signal. For example, the first delay unit 601 may delay the received signal by the length of the useful symbol portion (A) of the first pilot signal.

The complex conjugate calculation unit 603 may calculate the complex conjugate of the delayed first pilot signal and output the calculated signal.

The first multiplier 605 may multiply the signal output from the complex conjugate calculation unit 603 by the received signal and output the multiplied signal.

Since the first pilot signal includes the portions B and C obtained by frequency-shifting the useful portion A, the respective correlation values are obtained by shifting the received signals by the respective frequency shift amounts. In the first pilot signal, the portion B is a portion which is frequency-shifted up or frequency-shifted down from the portion A, and C is a portion which is frequency-shifted up or frequency-shifted down from the portion A.

For example, if the output of the complex conjugate calculation unit 603 is used, the output of the first multiplier 605 may include the correlation result of B (or the complex conjugate of B) and A (or the complex conjugate of A).

The second multiplier 607 may multiply the signal output from the first multiplier 605 by the frequency shift amount (denoted by $e^{jf_{SH}t}$) applied to the portion B and output the multiplied signal.

The first filter 611 performs a moving average during a predetermined period with respect to the signal output from the second multiplier 607. The moving average portion may be the length of the cyclic prefix (B) or the length of the cyclic suffix (C). In this embodiment, the first filter 611 may calculate an average of the signal included in the length of the portion B. Then, in the result output from the first filter 611, the correlation value of the portions A and C included in the portion, of which the average is calculated, substantially becomes zero and the correlation result of the portions B and A remains. Since the signal of the portion B is multiplied by the frequency shift value by the second multiplier 607, it is equal to the signal obtained by duplicating the second half of the portion A.

The third multiplier 609 may multiply the signal output from the first multiplier 605 by the frequency shift amount (denoted by $-e^{jf_{SH}t}$) applied to the portion C and output the multiplied signal.

The second filter 613 performs a moving average during a predetermined period with respect to the signal output from the third multiplier 609. The moving average portion may be the length of the cyclic prefix (B) or the length of the cyclic suffix (C). In this embodiment, the second filter 613 may calculate the average of the signal included in the length of the portion C. Then, in the result output from the second filter 613, the correlation value of the portions A and B included in the portion, of which the average is calculated, substantially becomes zero and the correlation result of the portions C and A remains. Since the signal of the portion C is multiplied by the frequency shift value by the third multiplier 609, it is equal to the signal obtained by duplicating the first half of the portion A.

The length TB of the portion of which the moving average is performed by the first filter 611 and the second filter 613 is expressed as follows.

$$T_B = k/f_{SH} \quad \text{[Equation 2]}$$

where, k denotes an integer. In other words, the unit fSH of the frequency shift used in the portions B and C may be decided by k/TB.

The second delay unit 615 may delay the signal output from the first filter 611. For example, the second delay unit 615 delays the signal filtered by the first filter 611 by the length of the portion B and outputs the delayed signal.

The fourth multiplier 617 multiplies the signal delayed by the second delay unit 615 by the signal filtered by the second filter 613 and outputs the multiplied signal.

The peak search unit 619 searches for the location where a peak value is generated from the multiplied signal output from the fourth multiplier 617 and outputs the searched location to the phase measurement unit 621. The peak value and the location may be used for the timing offset estimation.

The phase measurement unit 621 may measure the changed phase using the peak value and the location output from the peak search unit 619 and output the measured phase. The phase value may be used for the fractional carrier frequency offset estimation.

Meanwhile, an oscillator for generating the frequency used for performing the frequency shift by the second multiplier 607 and the third multiplier 609 may generate any phase error.

Even in this case, the fourth multiplier 617 can eliminate the phase error of the oscillator. The results output from the first filter 611 and the second filter 613 and the result output from the fourth multiplier 617 may be expressed by the following equation.

$$y_{MAF1} = \|a_1(H)\|^2 \cdot e^{j2\pi\Delta f + \theta}$$

$$y_{MAF2} = \|a_2(H)\|^2 \cdot e^{j2\pi\Delta f - \theta}$$

$$y_{prod} = \|a_1(H)\|^2 \cdot \|a_2(H)\|^2 \cdot e^{j2\pi \cdot 2\Delta f} \quad \text{[Equation 3]}$$

where, $y_{MAF1}$ and $y_{MAF2}$ respectively denote the outputs of the first filter 611 and the second filter 613, and yProd denotes the output of the fourth multiplier 617. In addition, a1 and a2 respectively denote the levels of the correlation results and f and respectively denote the frequency offset and the phase error of the oscillator.

Accordingly, $y_{MAF1}$ and $y_{MAF2}$ may include the phase errors of the oscillator having different signs, but the phase error of the oscillator is eliminated in the result of the fourth multiplier 617. Accordingly, the frequency offset f can be estimated regardless of the phase error of the oscillator of the signal receiving apparatus.

The estimated frequency offset may be expressed by the following equation.

$$f_B = \angle y_{prod}/4\pi \quad \text{[Equation 4]}$$

where, the estimated frequency offset f is 0<=f<0.5.

Figure 52:
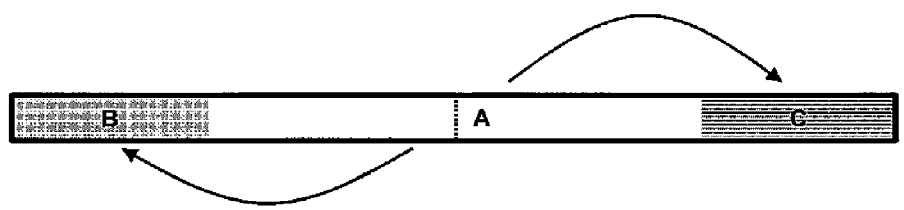
FIG. 52 is a view showing another embodiment of the structure of the first pilot signal.

FIG. 52 is a view showing another embodiment of the structure of the first pilot signal. In the first pilot signal, the frequency shift of the first half of the useful portion A is the cyclic prefix (B) and the frequency shift of the second shift of the useful portion A is the cyclic suffix (C). The lengths of the useful portion A for generating the portions B and C may be, for example, ½ of the length of the portion A, and the lengths of B and C may be different.

Figure 53:
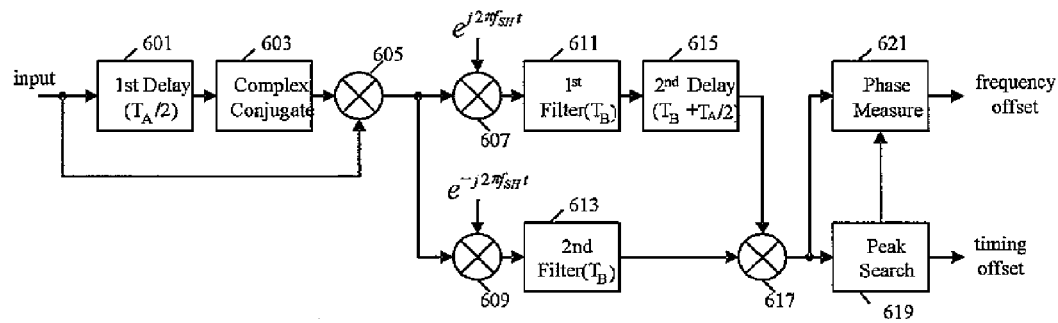
FIG. 53 is a view showing an embodiment of detecting the first pilot signal shown in FIG. 52 and measuring a timing offset and a frequency offset.

FIG. 53 is a view showing an embodiment of detecting the first pilot signal shown in FIG. 52 and measuring a timing offset and a frequency offset using the detected result. In this embodiment, for convenience of description, B and C respectively denote the cyclic prefix and the cyclic suffix obtained by frequency-shifting ½ of the length of the portion A.

This embodiment includes a first delay unit 601, a complex conjugate calculation unit 603, a first multiplier 605, a second multiplier 607, a first filter 611, a second delay unit 615, a third multiplier 609, a second filter 613, a fourth multiplier 617, a peak search unit 619, and a phase measurement unit 621. That is, this embodiment is equal to the embodiment of FIG. 51, but the features of the components may be changed according to the length of the portion A by which the portions B and C are generated. B denotes a portion frequency-shifted down from the portion A, and C denotes a portion frequency-shifted up from the portion A.

The first delay unit 601 may delay a received signal. For example, the first delay unit 601 may delay the received signal by ½ of the length of the useful symbol portion A of the first pilot signal.

The complex conjugate calculation unit 603 may calculate the complex conjugate of the delayed first pilot signal and output the calculated signal.

The first multiplier 605 may multiply the signal output from the complex conjugate calculation unit 603 by the received signal and output the multiplied signal.

The second multiplier 607 may multiply the signal output from the first multiplier 605 by the frequency shift amount (denoted by ejfSHt) applied to the portion B and output the multiplied signal.

The first filter 611 performs a moving average during a predetermined period with respect to the signal output from the second multiplier 607. The moving average portion may be the length of the cyclic prefix (B). In this embodiment, the first filter 611 may calculate the average of the signal included in the length of the portion B. Then, in the result output from the first filter 611, the correlation value of the portions A and C included in the portion, of which the average is calculated, substantially becomes zero and the correlation result of the portions B and A remains. Since the signal of the portion B is multiplied by the frequency shift value by the second multiplier 607, it is equal to the signal obtained by duplicating the second half of the portion A.

The third multiplier 609 may multiply the signal output from the first multiplier 605 by the frequency shift amount (denoted by −ejfSHt) applied to the portion C and output the multiplied signal.

The second filter 613 performs a moving average during a predetermined period with respect to the signal output from the third multiplier 609. The moving average portion may be the length of the cyclic suffix (C). In this embodiment, the second filter 613 may calculate the average of the signal included in the length of the portion C. Then, in the result output from the second filter 613, the correlation value of A and B included in the portion, of which the average is calculated, substantially becomes zero and the correlation result of the portions C and A remains. Since the signal of the portion C is multiplied by the frequency shift value by the third multiplier 609, it is equal to the signal obtained by duplicating the first half of the portion A.

The second delay unit 615 may delay the signal output from the first filter 611. For example, the second delay unit 615 delays the signal filtered by the first filter 611 by the length of the portion B+½A and outputs the delayed signal.

The fourth multiplier 617 multiplies the signal delayed by the second delay unit 615 by the signal filtered by the second filter 613 and outputs the multiplied signal.

The peak search unit 619 searches for the location where a peak value is generated from the multiplied signal output from the fourth multiplier 617 and outputs the searched location to the phase measurement unit 621. The peak value and the location may be used for the timing offset estimation.

The phase measurement unit 621 may measure the changed phase using the peak value and the location output from the peak search unit 619 and output the measured phase. The phase value may be used for the fractional carrier frequency offset estimation.

As described above, an oscillator for generating the frequency used for performing the frequency shift by the second multiplier 607 and the third multiplier 609 may generate any phase error. However, even in this embodiment, the fourth multiplier 617 can eliminate the phase error of the oscillator.

The results output from the first filter 611 and the second filter 613 and the result output from the fourth multiplier 617 may be expressed by the following equation.

$$y_{MAF1} = \|a_1(H)\|^2 \cdot e^{j2\pi\Delta f + \theta}$$

$$y_{MAF2} = \|a_2(H)\|^2 \cdot e^{j2\pi\Delta f - \theta}$$

$$y_{prod} = \|a_1(H)\|^2 \cdot \|a_2(H)\|^2 \cdot e^{j2\pi \cdot 2\Delta f} \quad \text{[Equation 5]}$$

where, $y_{MAF1}$ and $y_{MAF2}$ respectively denote the outputs of the first filter 611 and the second filter 613, and $y_{Prod}$ denotes the output of the fourth multiplier 617. In addition, a1 and a2 respectively denote the levels of the correlation results and f and respectively denote the frequency offset and the phase error of the oscillator.

Accordingly, yMAF1 and yMAF2 may include the phase errors of the oscillator having different signs, but the phase error of the oscillator is eliminated in the result of the fourth multiplier 617. Accordingly, the frequency offset f can be estimated regardless of the phase error of the oscillator of the signal receiving apparatus.

The estimated frequency offset may be expressed by the following equation.

$$f_B = \angle y_{prod} / 2\pi \quad \text{[Equation 6]}$$

where, the estimated frequency offset f is $0 <= f < 1$.

That is, phase aliasing may be generated in a range of $0.5 <= f < 1$ in the frequency offset estimated in [Equation 4], but phase aliasing is not generated in the frequency offset estimated in [Equation 6]. Accordingly, the frequency offset can be more accurately measured. The structure of the first pilot signal may be used in the data symbol and the second frequency signal. If such a structure is used, offset estimation performance such as CW interference can be improved and the reception performance of the receiver can be improved.

Figure 54:
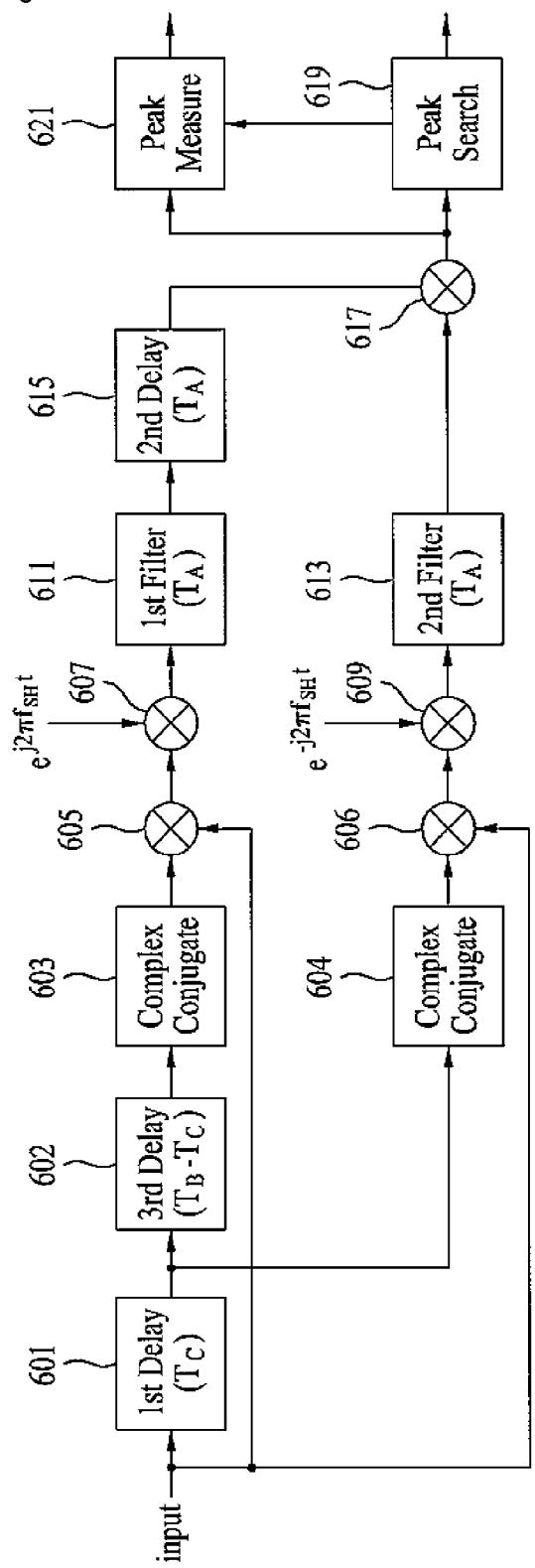
FIG. 54 is a view showing an embodiment of detecting the first pilot signal and measuring a timing offset and a frequency offset using the detected result.

FIG. 54 is a view showing an embodiment of detecting the first pilot signal and measuring a timing offset and a frequency offset using the detected result.

This embodiment includes a first delay unit 601, a third delay unit 602, a first complex conjugate calculation unit 603, a second complex conjugate calculation unit 604, a first multiplier 605, a fifth multiplier 606, a second multiplier 607, a first filter 611, a second delay unit 615, a third multiplier 609, a second filter 613, a fourth multiplier 617, a peak search unit 619, and a phase measurement unit 621.

In this embodiment, the first delay unit 601 may delay a received signal. For example, the first delay unit 601 may delay the received signal by the length of the cyclic suffix.

The third delay unit 602 may delay the signal delayed by the first delay unit 601. For example, the third delay unit 602 further delays the signal by a difference between the length of the cyclic prefix and the length of the cyclic suffix.

The first complex conjugate calculation unit 603 may calculate the complex conjugate of the signal delayed by the third delay unit 602 and output the calculated signal. The second complex conjugate calculation unit 604 may calculate the complex conjugate of the signal delayed by the first delay unit 601 and output the calculated signal.

The first multiplier 605 may multiply the signal output from the first complex conjugate calculation unit 603 by the received signal and output the multiplied signal. The fifth multiplier 606 may multiply the complex conjugate calculated by the second complex conjugate calculation unit 604 by the received signal and output the multiplied signal.

The second multiplier 607 may multiply the signal output from the first multiplier 605 by the frequency shift amount (denoted by $e^{jfSHt}$) applied to the portion B and output the multiplied signal.

The first filter 611 performs a moving average during a predetermined period with respect to the signal output from the second multiplier 607. The moving average portion may be the length of the useful portion (A) of the first pilot signal.

The third multiplier 609 may multiply the signal output from the second multiplier 604 by the frequency shift amount (denoted by $-e^{jfSHt}$) applied to the portion C and output the multiplied signal.

The second filter 613 performs a moving average during a predetermined period with respect to the signal output from the third multiplier 609. The moving average portion may be the length of the useful portion A of the first pilot signal.

The second delay unit 615 may delay the signal output from the first filter 611. For example, the second delay unit 615 delays the signal filtered by the first filter 611 by the length of the useful portion (A) of the first pilot signal and outputs the delayed signal.

The fourth multiplier 617 multiplies the signal delayed by the second delay unit 615 by the signal filtered by the second filter 613 and outputs the multiplied signal. The fourth multiplier 617 may eliminate the phase error of the oscillator.

The operations of the peak search unit 619 and the phase measurement unit 621 are equal to those of the above-described embodiment. The peak search unit 619 searches for the location where a peak value is generated from the multiplied signal output from the fourth multiplier 617 and outputs the searched location to the phase measurement unit 621. The peak value and the location may be used for the timing offset estimation.

Figure 55:
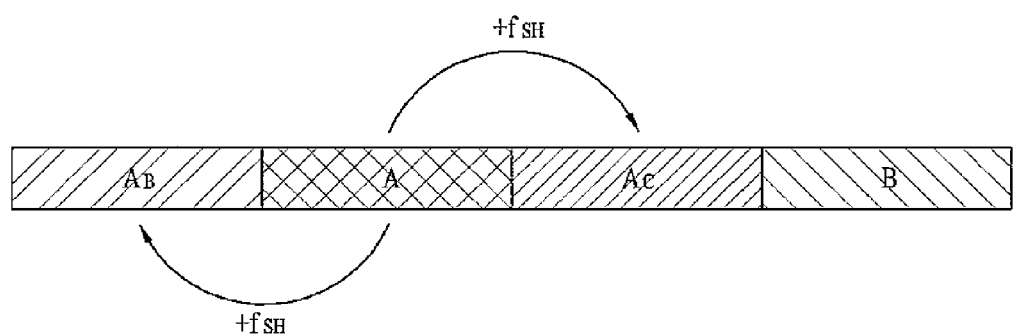
FIG. 55 is a view showing another embodiment of the structure of the first pilot signal.

FIG. 55 is a view showing another embodiment of the structure of the first pilot signal.

The first pilot signal has a structure of Complementary Set of Sequence (CSS). The signal of CSS structure has a good performance for auto-correlation and is highly efficient in detecting the preamble of the signal frame using two sequences A and B of this figure.

The $A_B$ interval and the $A_C$ interval are intervals frequency-shifted from the A interval by the same frequency shift amount, respectively. This structure of signal makes it possible to estimate full range of carrier frequency offset.

Figure 56:
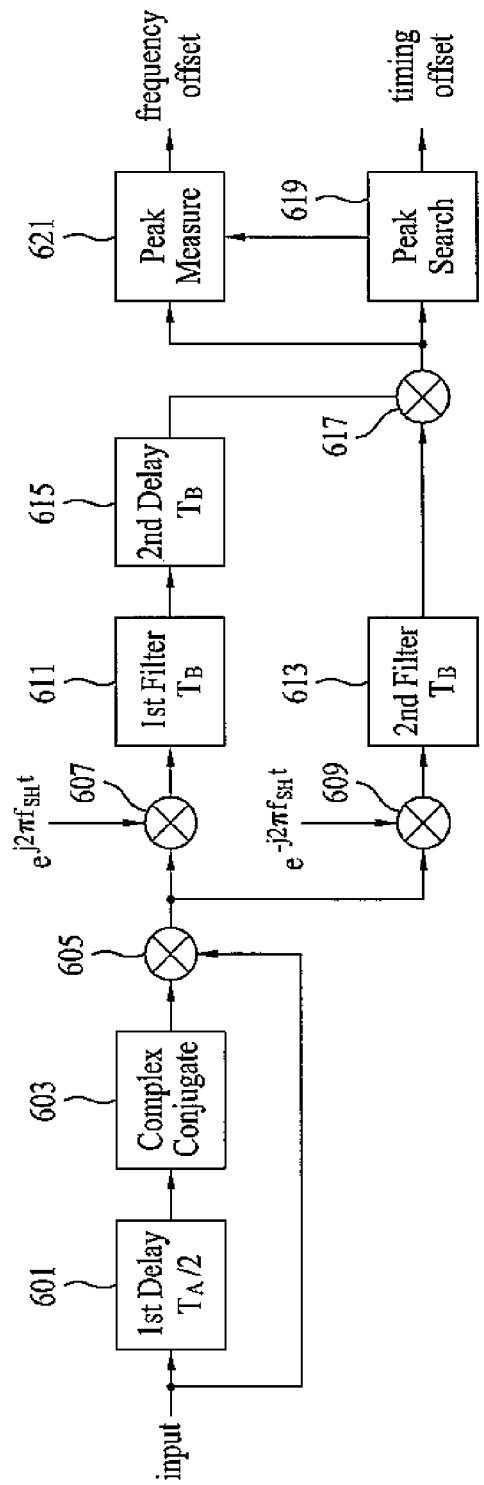
FIG. 56 is a view showing another embodiment of detecting the first pilot signal.

FIG. 56 is a view showing another embodiment of the structure of the first pilot signal illustrated in FIG. 55. The operation of the embodiment in this figure is the same as that of the embodiment of FIG. 51. However, the first delay unit 601 delays half as much as the length of the A interval.

In the case that echo signals which have difference of half length of $T_A$ are received via two-path channels, the $A_B$ interval and the $A_C$ interval of the signals are overlapped in a receiver. If a phase of a first echo signal is opposite to a phase of a second echo signal of the signals, the signals are vanished by offsetting each other. Accordingly, the receiver can not detect the two echo signals. The following drawing discloses an example of the first pilot signal which can solve this problem.

Figure 57:
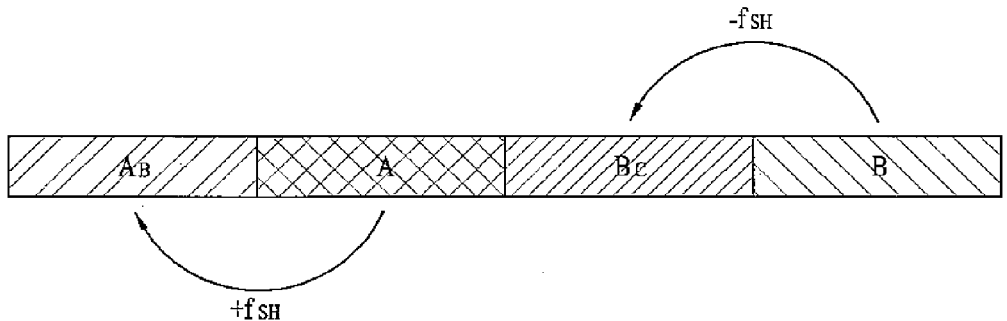
FIG. 57 is a view showing another embodiment of the structure of the first pilot signal.

FIG. 57 is a view showing another embodiment of the structure of the first pilot signal. In this embodiment, the AC interval is frequency-shifted from the B interval, not the A interval, and the frequency shift direction from B to $B_C$ is the opposite to the frequency shift direction from A to $A_B$. Then, the direction of the frequency shift between BC and B is the same as the direction of the frequency shift between A and $A_C$ of the signal in FIG. 56 so that the first pilot signal can be detected.

And although a receiver receives the two echo signals via two paths, of which echoes have difference as much as a length of $T_A$, one signal of the two signals can be detected because $A_B$ interval and $B_C$ of the received signals are different.

Figure 58:
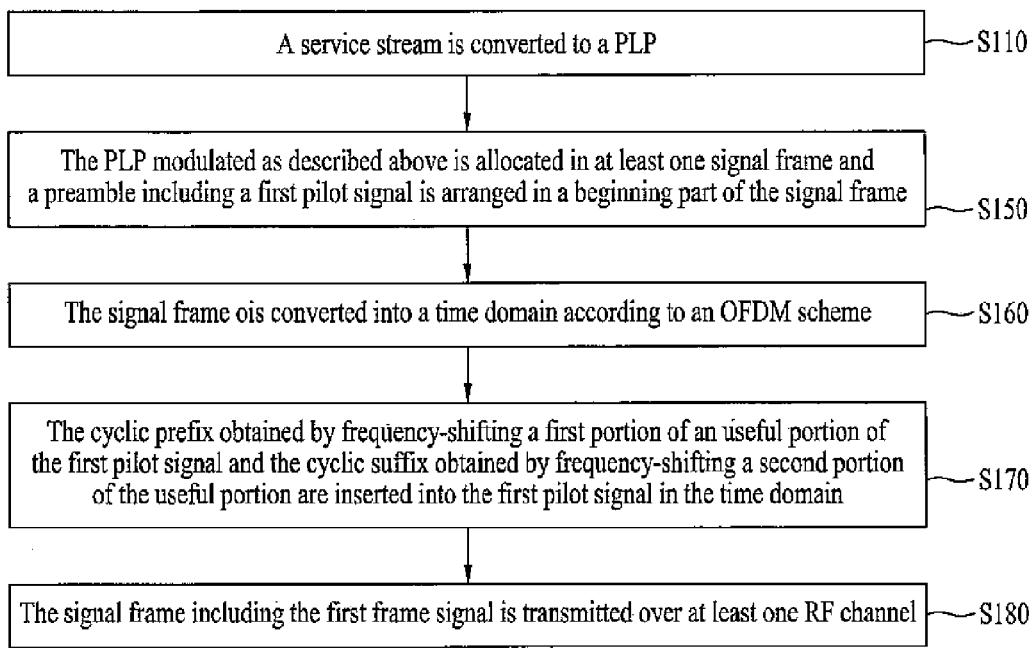
FIG. 58 is a view showing an embodiment of a method of transmitting a signal.

FIG. 58 is a view showing an embodiment of a method of transmitting a signal.

A service stream is modulated to a PLP (S110). The PLP can be generated by modulating a service stream such as a transport stream and a GSE packet, in which error correction encoding and symbol mapping are performed on the service stream. The modulated service stream can be distributed in at least one signal frame and can be transmitted over at least one physical channel as a PLP. For example, a process of modulating a service stream to a PLP can be performed by following steps S110a to S110d.

A service stream such as a transport stream and a GSE packet transferring service is error-correction-coded (S110a). An error correction coding scheme may be changed according to the service streams.

An LDPC error correction coding scheme may be used as the error correction coding scheme and the error correction coding may be performed at various code rates. The bits which are error-correction-coded according to a specific error correction code rate may be included in an error correction coded block according to the error correction coding mode. If the error correction coding scheme is the LDPC, a normal mode (64800 bits) and a short mode (16200 bits) may be used.

The error-correction-coded service stream is interleaved (S110b). The interleaving may be performed by differentiating the directions for writing and reading the bits included in the error correction coded block in and from a memory. The number of rows and the number of columns of the memory may be changed according to the error correction coding mode. The interleaving may be performed in the unit of the error correction coded blocks.

The interleaved bits of the service stream are mapped to symbols (S110c). A symbol mapping method may be changed according to service streams or in the service stream. For example, as the symbol mapping method, a higher order symbol mapping method and a lower order symbol mapping method may be used. When the symbols are mapped, the interleaved bits of the service stream may be demultiplexed according to the symbol mapping method or the code rate of the error correction code, and the symbols may be mapped using the bits included in the demultiplexed sub streams. Then, the sequence of the bits in the cell word mapped to the symbols may be changed.

The mapped symbols are interleaved (S110d). The mapped symbols may be interleaved in the unit of error correction coded blocks. Time interleavers 132a and 132b may interleave the symbols in the unit of error correction coded blocks. That is, the service stream is interleaved again in the symbol level.

The PLP modulated as described above is allocated in at least one signal frame and a preamble including a first pilot signal is arranged in a beginning part of the signal frame (S150). The allocation of the PLP may be described as follow.

The interleaved symbols of the service stream are split, the split symbols are allocated to a signal frame having at least one frequency band and including slots which are temporally split in the frequency bands, and a preamble including a first pilot signal is arranged in a start portion of the signal frame. The interleaved symbols of the service stream may configure the PLP with respect to the service stream for providing the service. The symbols configuring the PLP may be split and allocated to the signal frame. The PLP may be allocated to at least one signal frame having at least one frequency band. If a plurality of frequency bands are arranged, the symbols configuring the PLP may be arranged in the slots shifted between the frequency bands. The bits included in the service stream may be arranged in the signal frame in the unit of interleaved error correction coded blocks.

The signal frame is converted into a time domain according to an OFDM scheme (S160).

The cyclic prefix obtained by frequency-shifting a first portion of an useful portion of the first pilot signal and the cyclic suffix obtained by frequency-shifting a second portion of the useful portion are inserted into the first pilot signal in the time domain (S170). If the preamble is not inserted in the frequency domain, the preamble including the first pilot signal and the second pilot signal may be inserted in the time domain. The first pilot signal of the time domain may include the useful portion, the cyclic prefix of the first portion of the useful portion and the cyclic suffix of the second portion of the useful portion. The first portion may be a backmost portion or the foremost portion of the useful portion. The second portion may be the foremost portion or the backmost portion of the useful portion.

The signal frame including the first frame signal is transmitted over at least one RF channel (S180).

Since the useful portion of the first pilot signal includes the frequency-shifted cyclic prefix and cyclic suffix, the signal frame can be clearly identified as the structure of the first pilot signal. The timing offset or the frequency offset may be estimated and compensated for using the structure of the first pilot signal.

Figure 59:
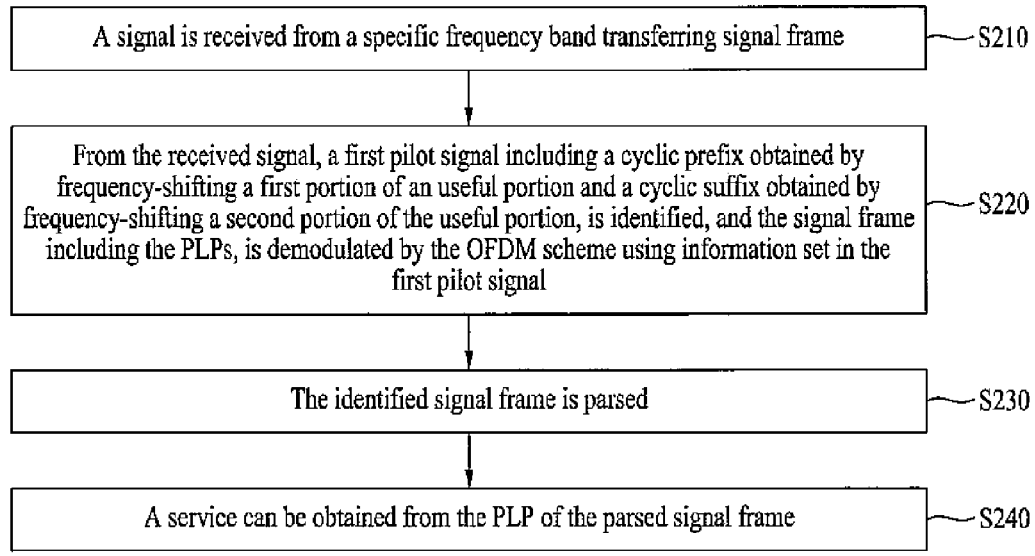
FIG. 59 is a view showing an embodiment of a method of receiving a signal.

FIG. 59 is a view showing an embodiment of a method of receiving a signal.

A signal is received from a specific frequency band transferring signal frames (S210). The signal frame may be transmitted over at least one frequency band. The signal may be received from a specific frequency band From the received signal, a first pilot signal including a cyclic prefix obtained by frequency-shifting a first portion of an useful portion and a cyclic suffix obtained by frequency-shifting a second portion of the useful portion is identified, and the signal frame including the PLPs is demodulated by the OFDM scheme using the first pilot signal (S220). The demodulating process using the first pilot signal will be described in detail later.

The identified signal frame is parsed (S230). The signal frame may include at least one frequency band. In the signal frame, a first PLP including the error correction coded blocks of the symbols, to which the service stream is mapped, may be allocated to OFDM symbols together with a second PLP including the error correction coded blocks of another service stream. If the signal frame includes a plurality of frequency bands, the error correction coded blocks of the PLP may be allocated to the OFDM symbols which are temporally shifted in the plurality of frequency bands.

A service can be obtained from the PLP of the parsed signal frame (S240), in which this process is described in steps S240a to S240c.

The symbols, to which the service stream is mapped, are deinterleaved from the parsed signal frame (S240a). The deinterleaving may be performed in the symbol level which the service stream is mapped to. For example, the time deinterleavers 245a and 245b may deinterleave the error correction coded blocks including the symbols, to which the service stream is mapped.

Then, the deinterleaved symbols are demapped so as to obtain the service stream (S240b). When the symbols are demapped, a plurality of sub streams obtained by demapping the symbols may be output, the output sub streams may be multiplexed, and the error-correction-coded service stream may be output. The multiplexing scheme may be changed according to the symbol mapping method and the error correction code rate. The symbol demapping method may be changed in one service stream or according to service streams.

The service stream is deinterleaved and the deinterleaved service stream is error-correction-coded (240c).

According to an apparatus for transmitting and receiving a signal and a method of transmitting and receiving a signal of the present invention, it is possible to readily detect and restore a transmitted signal. In addition, it is possible to improve the signal transmission/reception performance of the transmitting/receiving system.

Figure 60:
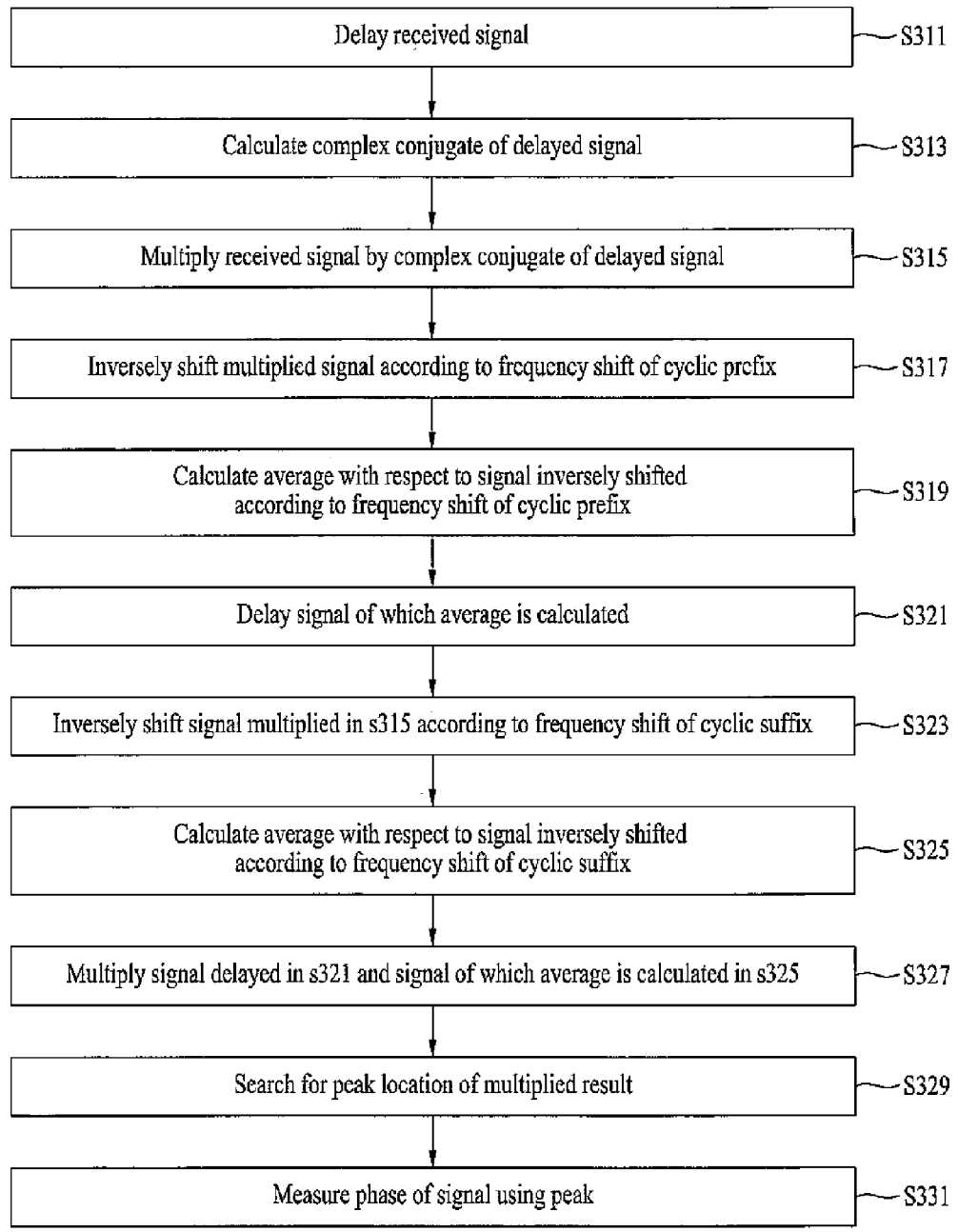
FIG. 60 is a flowchart illustrating an embodiment of identifying a first pilot signal and estimating an offset in a demodulating process.

FIG. 60 is a flowchart illustrating an embodiment of identifying a first pilot signal and estimating an offset in a demodulating process.

The first pilot signal includes the cyclic prefix obtained by frequency-shifting the first portion of the useful portion thereof and the cyclic suffix obtained by frequency-shifting the second portion of the useful portion thereof. The timing offset and the frequency offset may be calculated using the first pilot signal as follows.

The received signal is delayed (S311). For example, the delay portion may be the useful portion of the first pilot signal or ½ of the useful portion. Alternatively, the delay portion may be the length of the cyclic prefix or the length of the cyclic suffix.

The complex conjugate of the delayed signal is calculated (S313).

The complex conjugate of the received signal and the delayed signal are multiplied (S315). The delayed signal multiplied by the complex conjugate may be the signal having the above-described length. If the delay signal is the length of the cyclic prefix or the cyclic suffix, the complex conjugate of the delayed signal may be calculated.

The signal multiplied by the complex conjugate is inversely shifted according to the frequency shift of the cyclic prefix (S317). That is, the signal multiplied by the complex conjugate is shifted by the inverse shift amount of the frequency shift amount of the cyclic prefix signal. That is, a signal which is frequency shifted up is frequency shifted down (or the signal which is frequency shifted down is frequency shifted up).

Then, an average is calculated with respect to the signal which is inversely shifted according to the frequency shift of the cyclic prefix (S319). The portion of which the average is calculated may become the length of the cyclic prefix or the length of the useful portion A of the first pilot signal according to the embodiments. Since the average is calculated with respect to the signal having the same length along with the received signal, the moving average value may be output along with the received signal.

The signal of which the average is calculated is delayed (S321). The delay portion may become the sum of the length of the cyclic prefix and the length of ½ of the useful period, the length of the cyclic prefix, or the length of the useful portion A of the first pilot signal, according to the embodiment.

The signal multiplied in the step 5315 is inversely shifted according to the frequency shift of the cyclic suffix (S323). The signal multiplied by the complex conjugate is shifted by the inverse shift amount of the frequency shift amount of the cyclic suffix signal. That is, a signal which is frequency shifted up is frequency shifted down (or the signal which is frequency shifted down is frequency shifted up).

An average is calculated with respect to the signal which is inversely shifted according to the frequency shift of the cyclic suffix (S325). The moving average is performed with respect to the signal corresponding to the length of the calculated cyclic suffix or the length of the useful portion of the first pilot signal according to the embodiments.

The signal delayed in the step 5321 and the signal of which the average is calculated in the step S325 are multiplied (S327).

A peak location of the multiplied result is searched for (S329) and the phase of the signal is measured using the peak (S331). The searched peak may be used for estimating the timing offset and the measured phase may be used for estimating the frequency offset.

In this flowchart, the length of the cyclic suffix, the length of the cyclic prefix and the frequency inverse shift amount may be changed.

According to the apparatus for transmitting and receiving the signal and the method of transmitting and receiving the signal of the invention, if the data symbol configuring the PLP and the symbols configuring the preamble are modulated in the same FFT mode, the probability that the data symbol is detected by the preamble is low and the probability that the preamble is erroneously detected is reduced. If continuous wave (CW) interference is included like the analog TV signal, the probability that the preamble is erroneously detected by a noise DC component generated at the time of correlation is reduced.

According to the apparatus for transmitting and receiving the signal and the method of transmitting and receiving the signal of the invention, if the size of the FFT applied to the data symbol configuring the PLP is larger than that of the FFT applied to the preamble, the preamble detecting performance may be improved even in a delay spread channel having a length equal to or greater than that of the useful symbol portion A of the preamble. Since both the cyclic prefix (B) and the cyclic suffix (C) are used in the preamble, the fractional carrier frequency offset can be estimated.

Hereinafter, an embodiment of scheduling a PLP arranged in a signal frame using layer-1 information included in a first pilot signal will be described. In order to facilitate the description of the embodiment of scheduling the PLP, the structure of the above-described signal frame will be described in more detail. The PLP may be a PLP for delivering a transport stream of a broadcast service or a guard period (GP)-PLP. The GP-PLP indicates a PLP which is located at the edge of each signal frame and delivers a specific service such as a supplementary service during a time when the signal receiving apparatus changes an RF band or a service.

Figure 61:
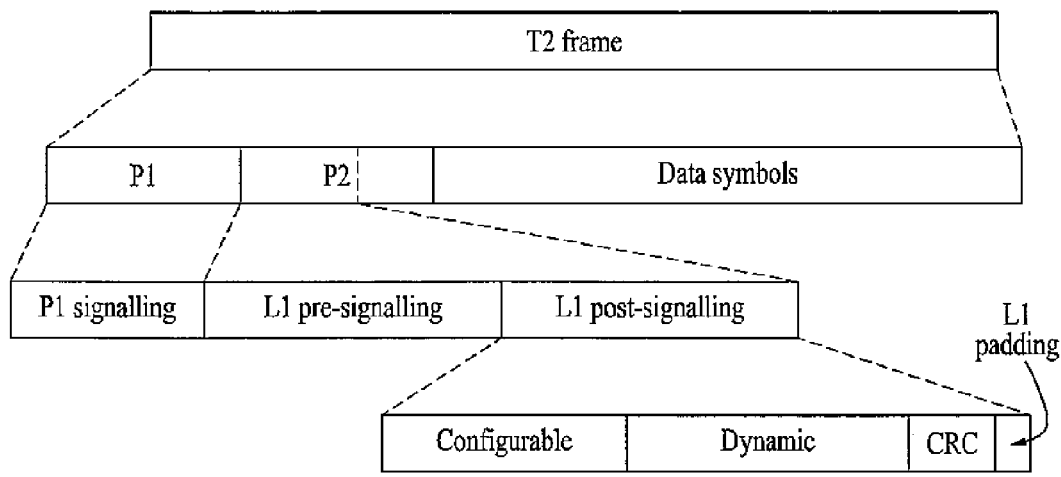
FIG. 61 is a view showing the structure of a signal frame.

First, FIG. 61 is a view showing the structure of a signal frame. In this drawing, in a preamble of the signal frame, a first pilot signal P1 and a second pilot signal P2 are located. The signal frame may include data symbols including at least one PLP. The structure of the first pilot signal was described above. The second pilot signal may include layer-1 information. The layer-1 information may include an L1 pre-signaling signal and an L1 post-signaling signal. The L1 pre-signaling signal may include information by which a receiver can receive and decode the L1 post-signaling signal. Information about PLP scheduling may be included in the L1 post-signaling signal. The L1 post-signaling signal may include a configurable part including information which may be changed in the unit of one super frame range and a dynamic part including information which may be changed in the unit of a single signal frame included in a super frame. That is, the configurable part is defined with respect to one super frame and the dynamic part is defined with respect to one signal frame. The L1 post-signaling signal may further include CRC data and padding data.

In order to explain the scheduling information of the PLP for delivering the service stream such as the transport stream, two modes of the signal frame will be described.

Figure 62:
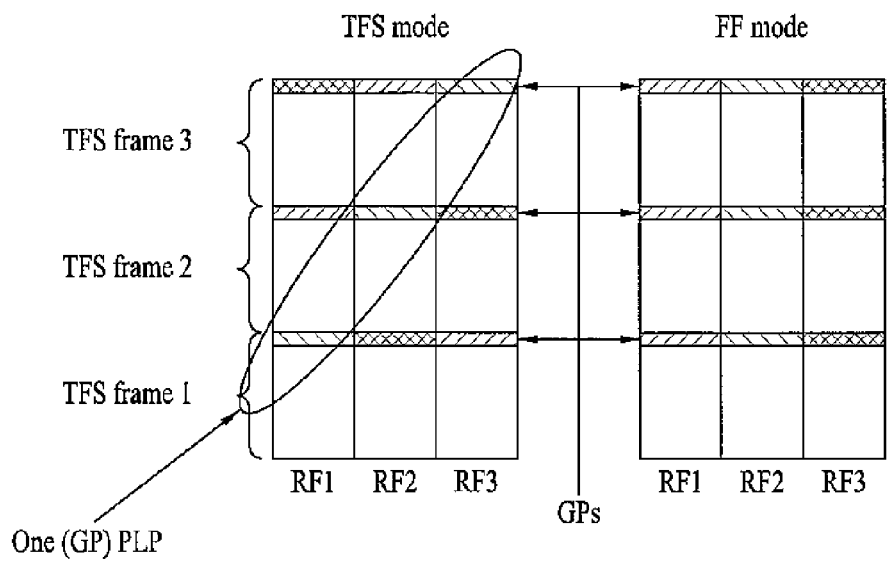
FIG. 62 is a view showing two modes of a signal frame.

FIG. 62 is a view showing two modes of a signal frame. In a TFS mode shown at the left side of this drawing, the PLP is transmitted over a plurality of RF channels. The TFS mode is advantageous in frequency diversity and time diversity, but is disadvantageous in that a zapping time which is generated when the RF bands are changed is increased.

The super frame includes three signal frames 1, 2 and 3. For example, a first PLP may be transmitted via (RF1, frame 2), (RF2, frame 3) and (RF3, frame 1) and a second PLP may be transmitted via (RF1, frame 1), (RF2, frame 2) and (RF3, frame 3). A third PLP may be transmitted via (RF1, frame 3), (RF2, frame 1) and (RF3, frame 2). The GP-PLP may include a service which will be provided at a time consumed when the RF band or the service is changed, and the length of time-interleaving for the GP-PLP may be increased according to the number of RFs used in the TFS mode may be equal to the number of sub-PLPs of a specific GP-PLP.

In an FF mode, each PLP is transmitted via a fixed RF band. In the FF mode shown at the right side of this drawing, a first PLP may be transmitted via (RF1, frame 1), (RF1, frame 2) and (RF3, frame 3), a second PLP may be transmitted via (RF2, frame 1), (RF2, frame 2) and (RF2, frame 3), a third PLP may be transmitted via (RF3, frame 1), (RF3, frame 2) and (RF3, frame 3). In the FF mode, the effect of the frequency diversity cannot be obtained, but the zapping time can be decreased. In the GP-PLP, the zapping time can be adjusted according to the size of the GP-PLP. In the case of the GP-PLP the zapping time can be adjusted according to the length of time-interleaving for the GP-PLP.

Hereinafter, an embodiment of scheduling the PLPs in order to efficiently receive the PLPs included in the signal frame will be described.

FIG. 63 is a view showing an example of scheduling the PLPs in the unit of signal frames. For example, the layer-1 information of the signal frame may include information shown in this drawing.

The layer-1 information includes a static parameter, a configurable parameter and a dynamic parameter as shown in this embodiment.

The static parameter of the layer-1 information is as follows.

A CELL_ID (16 bits) indicates an identifier of a cell in which the signal frame is transmitted. A NETWORK_ID (16 bits) indicates an identifier of a network for transmitting the signal frame, and an NUM_RF (16 bits) indicates the number of RF channels which the signal frame includes. In addition, a FREQUENCY (32 bits) indicates a central frequency of each of the RF channels. A PILOT_PATTERN (3 bits) indicates the pattern of a scattered pilot included in an OFDM symbol included in the signal frame. A FRAME_LENGTH (10 bits) indicates the length of the signal frame.

The configurable parameter of the layer-1 information is as follows.

An NUM_PLP (8 bits) indicates the number of PLPs included in the signal frame. An RF_SHIFT (8 bits) indicates the number of OFDM cells which should be shifted in the neighboring RF channel of a current RF channel in order to obtain sub-PLPs belonging to the same PLP as sub-PLPs received via the current RF channel.

A PLP_ID (8 bits) indicates an identifier of each of the PLPs included in the signal frame. A PLP_CR (3 bits) indicates the value of a code rate of error correction coding of the PLP.

A PLP_MOD (4 bits) indicates a symbol mapping method used in symbol mapping of the PLP. A PLP_FEC_BLOCK (1 bit) indicates whether the error correction coding of the PLP is a normal mode or a short mode.

Among the PLPs included in the signal frame, there may be a PLP which carries Layer-2 (L2) information (or L2 signaling) which are common to several PLPs in the signal frame. This PLP is called a common PLP or a PLP0. A PLP0_CR (3 bits) indicates a code rate used in an error correction coding method of the PLP0. A PLP0_MOD (4 bits) indicates a symbol mapping method used in symbol mapping of the PLP0. A PLP0_FEC_BLOCK (1 bit) indicates whether the error correction coding of the PLP0 is a normal mode or a short mode.

The dynamic parameter of the layer-1 information is as follows.

A FRAME_IDX (8 bits) indicates the index of the signal frame in the super frame. A NOTIFICATION (1 bit) indicates whether or not the signal frame includes a NOTIFICATION message indicating an emergency or service change. An L2_SIZE (18 bits) indicates the size of layer-2 information included in the signal frame. A NOTIF_SIZE (18 bits) indicates the size of the NOTIFICATION message.

With respect to the PLPs included in the signal frame, a PLP_NUM_BLOCKS (8 bits) indicates the number of error correction coded blocks included in each of the PLPs. A PLP_START (20 bits) indicates the number of a start slot, in which each of the PLPs is started, of the slots of the time domain in a frequency band.

In order to schedule the PLPs or GP-PLPs, the following information may be included in the dynamic parameter with respect to the PLPs or GP-PLPs.

A SUPER_FRAME_LENGTH (3 bits) indicates the length of the super frame including a plurality of signal frames. Alternatively, a PLP_LENGTH indicating the length of a time interleaving block of the PLP may be included.

The time interleaving block indicates a unit in which a plurality of error correction coded blocks are interleaved when one PLP includes the plurality of error correction coded blocks. In the embodiment of the signal transmitting apparatus, the time interleaver may output a time-interleaved time interleaving block.

A PLP_MODE (1 bit) indicates whether the signal frame is in the TFS mode or the FF mode.

An RF_ID (3 bits) indicates an identifier of an RF including the current sub-PLP among sub-PLPs included in the PLPs (or the GP-PLPs), or a current RF index, which indicates an identifier of the current RF channel, within the TFS signal frame.

A PLP_IDX (3 bits) indicates an index of the sub-PLP which is currently being received. A GP_PLP_NUM_BLOCKS (8 bits) indicates the number of error correction coded blocks of the GP-PLP with respect to the GP-PLP.

The illustrated layer-1 information may become scheduling information of the PLPs or the GP-PLPs in the signal frame.

Figure 64:
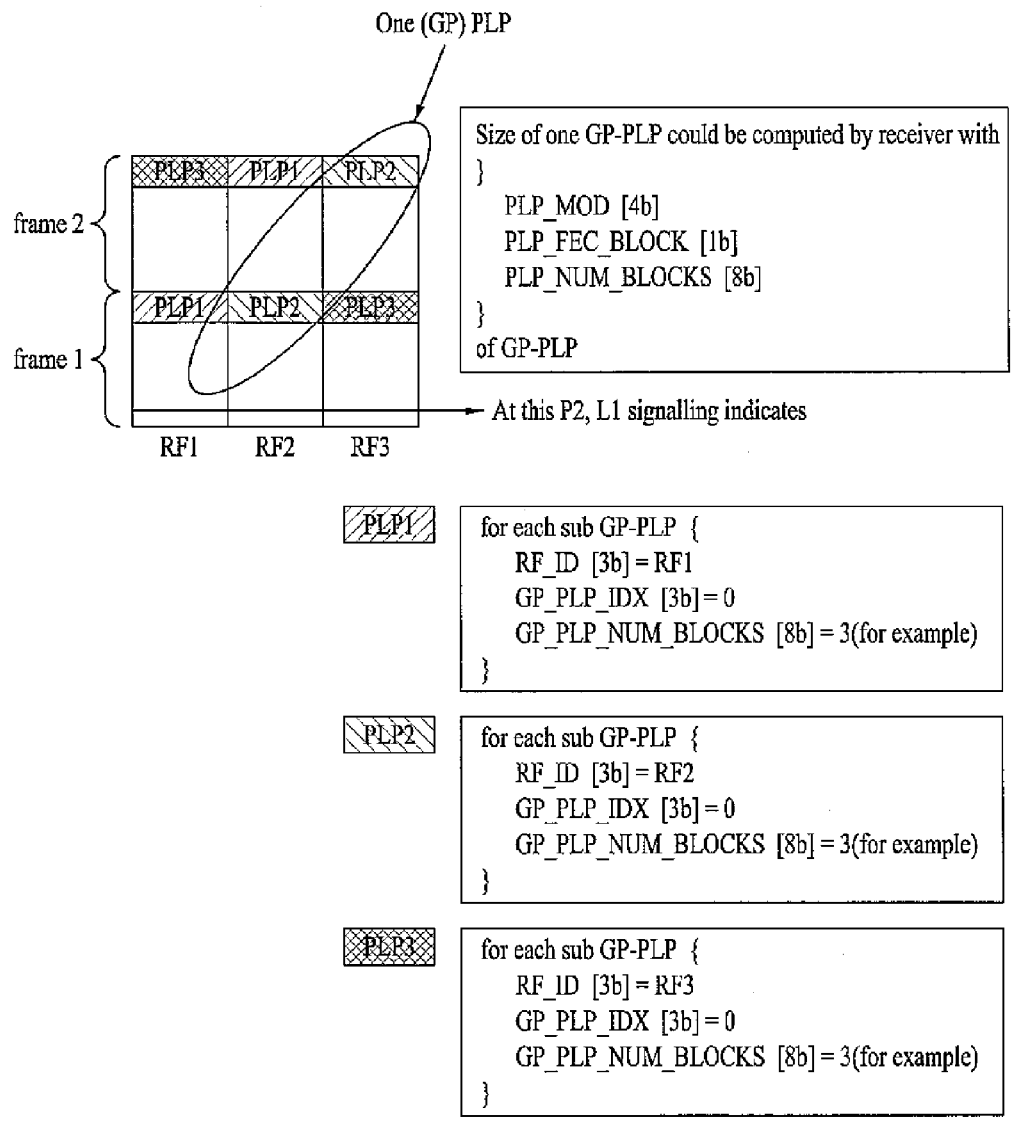
FIG. 64 is a view showing the structure of a signal frame using scheduling information.

FIG. 64 is a view showing the structure of a signal frame using scheduling information.

In this example, the super frame includes a signal frame 1 and a signal frame 2. Each of the signal frames may be transmitted to three RF channels RF1, RF2 and RF3 (i.e. each of the signal frames is transmitted over three RF channels RF1, RF2 and RF3). The three PLPs included in the frames are denoted by PLP1, PLP2 and PLP3. The three PLPs are respectively allocated to the three RF channels according to the TFS mode.

The size of one PLP may be computed by the PLP_MOD (4 bits), the PLP_FEC_BLOCK (1 bit) and the PLP_NUM_BLOCKS (8 bits) (or the GP_PLP_NUM_BLOCKS (8 bits) in the case of the GP-PLP, which is the same in the following description) in the layer-1 information.

For example, the PLP_FEC_BLOCK may indicate whether the length of the error correction coded block of the PLP is 16200 bits or 64800 bits, the PLP_MOD may indicate the symbol mapping method of the data included in the error correction coded block. Accordingly, it can be calculated to how many symbols each of the error correction coded blocks is mapped. The PLP_NUM_BLOCKS (8 bits) indicates the number of error correction coded blocks mapped to the symbols. Then, the size of each of the PLPs may be computed.

The PLP1 shown in this drawing is transmitted over the RF1 and RF2. If the PLP1 is obtained by the frame 1, the current RF identifier (RF_ID) of the PLP1 is RF1 which is the RF index, and the index (PLP_IDX) of the sub-PLP1 is 0. In this example, the PLP_NUM_BLOCKS (8 bits) is 3, which is arbitrarily set.

The PLP2 shown in this drawing is transmitted over the RF2 and RF3. If the PLP2 is obtained by the frame 1, the current RF identifier (RF_ID) of the PLP2 is RF2 which is the RF index, and the index (PLP_IDX) of the sub-PLP1 is 0. For example, the PLP_NUM_BLOCKS (8 bits) may be 3.

The PLP3 shown in this drawing is transmitted over the RF3 and RF3. If the PLP3 is obtained by the frame 1, the current RF identifier (RF_ID) of the PLP3 is RF3 which is the RF index, and the index (PLP_IDX) of the sub-PLP3 is 0. For example, the PLP_NUM_BLOCKS (8 bits) may be 3.

The bit size of the above-described information may be changed. According to the above example, if the current RF identifier (RF_ID) in the TFS frame of the layer-1 information is used, it can be determined at which RF channels the PLPs (or the sub-PLPs) are located and the PLPs can be efficiently scheduled and received.

Another embodiment of scheduling the PLPs in order to efficiently receive the PLPs included in the signal frame will be described.

FIG. 65 is a view showing scheduling information included in layer 1 information. The static parameter, the configurable parameter and the dynamic parameter in the layer-1 information are equal to those described in the above-described embodiment.

The CELL_ID (16 bits), the NETWOK_ID NUM_RF (16 bits), PILOT_PATTERN (3 bits) and FRAME_LENGTH(10 bits) in the static parameter of the layer-1 information are equal to those described above.

In addition, the NUM_PLP (8 bits), the RF_SHIFT (8 bits), the PLP_ID (8 bits), the PLP_CR (3 bits), the PLP_MOD (4 bits), the PLP_FEC_BLOCK(1 bit), the PLP0_CR(3 bits), the PLP0_MOD (4 bits) and the PLP0_FEC_BLOCK(1 bit)

in the configurable parameter of the layer-1 information are equal to those described above.

In this embodiment, each GP-PLP of the configurable parameter may include the following information.

A GP_PLP_ID (8 bits) indicates an identifier of each GP-PLP.

A GP_PLP_CR (3 bits) indicates a code rate of error correction coding of each GP-PLP.

A GP_PLP_MOD (4 bits) indicates a symbol mapping method of each GP-PLP.

A GP_PLP_FEC_BLOCK (1 bit) indicates an error correction coding mode of each GP-PLP and may indicate a normal mode or a short mode if the error correction code is, for example, an LDPC.

A PLP_RF_INDICATOR (6 bits) indicates RF channels to which the PLP (GP-PLP) is transmitted. The detailed value of the PLP_RF_INDICATOR (6 bits) will be described in detail later.

A PLP_START_RF_ID (3 bits) indicates an identifier of an RF channel including a first sub-PLP of sub-PLPs included in the PLP (or the GP-PLP) in a super frame of TFS structure. Because the PLP can be transmitted to a plurality of signal frames in a super frame, the PLP_START_RF_ID (3 bits) may represent an identifier of an RF channel in the signal frame at which the PLP is first located in the super frame of TFS structure.

A_GP_PLP_NUM_BLOCKS (8 bits) indicates the number of error correction coded blocks included in the PLP (or the GP-PLP).

The FRAME_IDX (8 bits), the NOTIFICATION (1 bit), the L2_SIZE (18 bits), the NOTIF_SIZE (18 bits), the PLP_NUM_BLOCKS (8 bits) and the PLP_START (20 bits) in the dynamic parameter of the layer-1 information are equal to those described above.

The dynamic parameter may include the following information.

A PLP_IDX (3 bits) indicates an index of a current sub-PLP of the PLPs.

Accordingly, if the configurable parameter of the layer-1 information includes the identifier of the RF channel including the first sub-PLP of the sub-PLPs included in the PLP (or the GP-PLP) (the identifier of the RF channel of the signal frame at which the PLP is first located in the super frame of TFS structure), it can be checked at which RF channel the PLP is located. Accordingly, it is possible to readily obtain the PLP.

Figure 66:
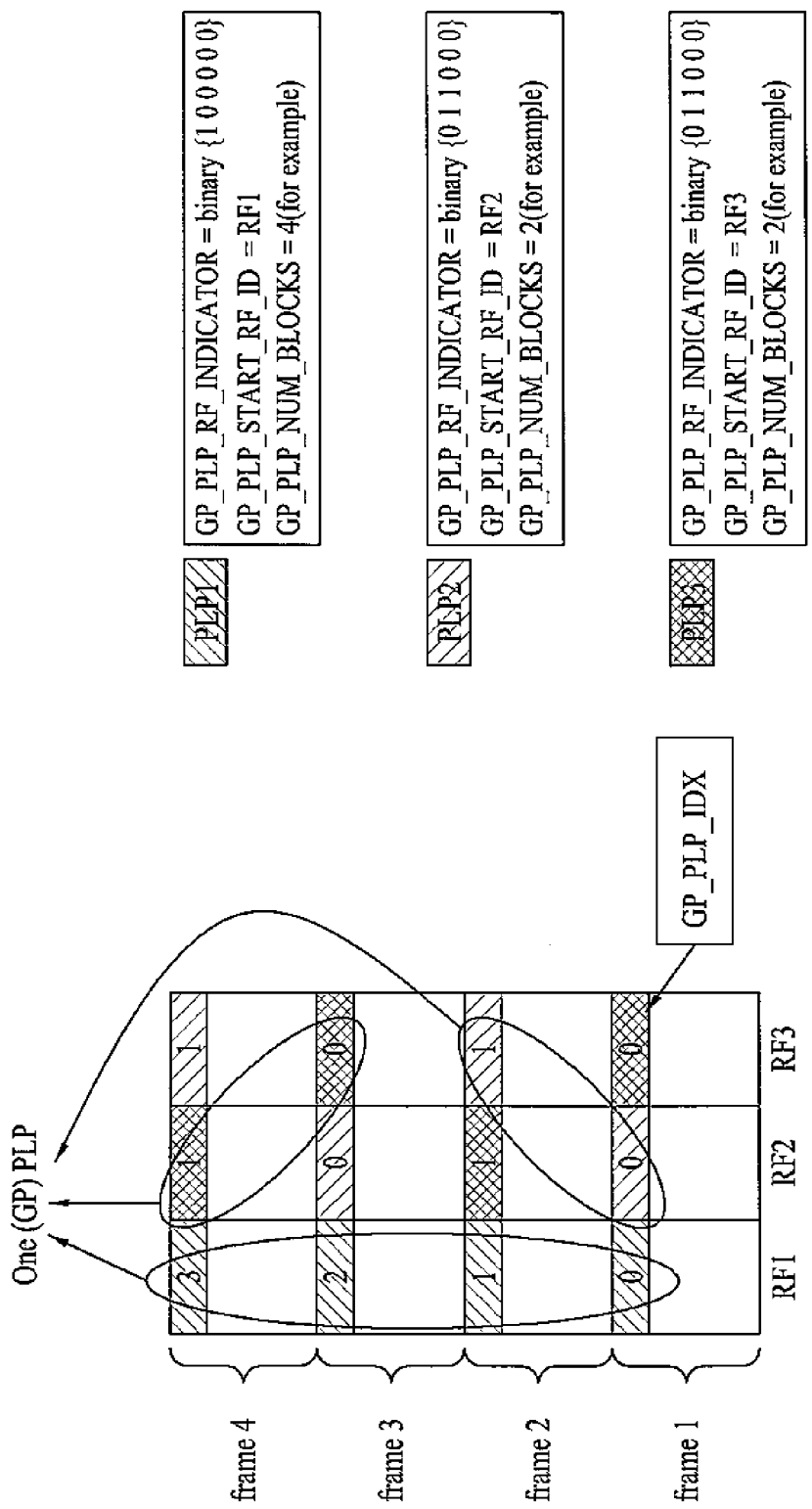
FIG. 66 is a view showing a super frame including a plurality of PLPs using scheduling information shown in FIG. 65.

FIG. 66 is a view showing a super frame including a plurality of PLPs using scheduling information shown in FIG. 65.

In this example, the super frame includes a signal frame 1, a signal frame 2, a signal frame 3 and a signal frame 4. Each of the signal frames transmits a plurality of PLPs over three RF channels RF1, RF2 and RF3 of six possible RF channels. As described above, the PLP_IDX indicates the identifier of each of the sub-PLPs included in each of the PLPs.

In this example, the PLP1 includes sub-PLPs having PLP_IDXs of 0, 1, 2 and 3 in RF 1. With respect to the PLP1, a PLP_RF_INDICATOR is a binary {1 0 0 0 0 0}. The six binaries included in the PLP_RF_INDICATOR indicate the RF channels used by the PLP if the signal frame includes six RF channels. The binaries of the PLP_RF_INDICATOR respectively indicate {RF1, RF2, RF3, RF4, RF5, RF6} and the identifier of the RF channel corresponding to the location of the binary 1 is the RF channel at which the sub-PLP is located.

This embodiment includes three RF channels. If the three RF channels are a portion of the six RF channels, since the sub-PLP of the PLP1 is located at only the RF1, the PLP_RF_INDICATOR becomes {1 0 0 0 0 0}. It may be considered that the PLP1 is transmitted to the signal frame of the RF1 channel in the FF mode.

A PLP_START_RF_ID of the PLP1 indicates the identifier of the RF of the first sub-PLP of the sub-PLPs of the PLP1 in a super frame of TFS structure, that is, the identifier of the RF channel of the signal frame at which the PLP1 is first located.

Since the PLP1 is started at the RF1, the PLP_START_RF_ID of the PLP1 becomes the identifier of the RF1. Although the PLP_NUM_BLOCKS of the PLP1 indicating the number of error correction coded blocks included in the PLP1 is 4, it may be changed according to the embodiments.

The PLP2 includes a sub-PLP having a PLP_IDX of 0 in RF2 and a sub-PLP having a PLP_IDX of 1 in the RF3. The PLP_RF_INDICATOR of the PLP2 is a binary {0 1 1 0 0 0}. Since the PLP2 is transmitted over at least two RF channels, it may be considered that the PLP2 is transmitted in the TFS mode.

A PLP_START_RF_ID of the PLP2 is RF2 which is the identifier of the RF of the frame, at which the starting sub-PLP of the PLP2 is located, of the sub-PLPs included in the PLP2 in the super frame of the TFS structure. The PLP_START_RF_ID indicates the identifier of the RF channel of the signal frame at which the PLP2 is first located. Accordingly, the PLP_START_RF_ID is RF2. Although the PLP_NUM_BLOCKS of the PLP2 is 2, it may be changed according to the embodiments.

The PLP3 includes a sub-PLP having a PLP_IDX of 0 in RF3 and a sub-PLP having a PLP_IDX of 1 in the RF2. The PLP_RF_INDICATOR of the PLP3 is a binary {0 1 1 0 0 0}. Since the PLP3 is transmitted over at least two RF channels, it may be considered that the PLP3 is transmitted in the TFS mode.

A PLP_START_RF_ID of the PLP3 is RF3 which is the identifier of the RF of the frame, at which the starting sub-PLP of the PLP3 is located, of the sub-PLPs included in the PLP3 in the super frame of the TFS structure. The PLP_START_RF_ID indicates the identifier of the RF channel of the signal frame at which the PLP3 is first located. Although the PLP_NUM_BLOCKS of the PLP3 is 2, it may be changed according to the embodiments.

The time interleaver of the signal transmitting apparatus may interleave the error correction coded blocks of the PLPs and output the plurality of interleaved error correction coded blocks to at least one time interleaving block. The size of the time interleaving block included in the PLP or the size of the PLP (or the GP-PLP) may be computed by the values of the PLP_MOD (or the GP_PLP_MOD), the PLP_FEC_BLOCK (or GP_PLP_FEC_BLOCK) and the PLP_NUM_BLOCKS (or the GP_PLP_NUM_BLOCKS).

If the RF channel identifier (PLP_START_RF_ID) of the signal frame in which the PLP is first included in the super frame of the TFS mode is used in a region in which the configurable parameter of the layer-1 information is set like this embodiment, the signal receiving apparatus can efficiently and readily obtain the PLPs. If the RF_SHIFT and the PLP_START are used according to the sizes of the PLPs, the locations to which the PLPs are allocated can be continuously searched for from the signal frame.

If the RF channel is changed in the TFS mode, the change direction of the RF channel may be one direction as it is used in the PLP_RF_INDICATOR.

Hereinafter, another embodiment of efficiently receiving the PLPs included in the signal frame will be described.

FIG. 67 is a view showing scheduling information included in a layer 1 information. The static parameter, the configurable parameter and the dynamic parameter in the layer-1 information are equal to those described in the above-described embodiment.

In more detail, the CELL_ID (16 bits), the NETWORK_ID (16 bits), the NUM_RF (16 bits), the PILOT_PATTERN (3 bits) and the FRAME_LENGTH (10 bits) in the static parameter of the layer-1 information are equal to those described above.

The NUM_PLP (8 bits), the RF_SHIFT (8 bits), the PLP_ID (8 bits), the PLP_CR (3 bits), the PLP_MOD (4 bits), the PLP_FEC_BLOCK(1 bit), the PLP0_CR(3 bits), the PLP0_MOD (4 bits) and the PLP0_FEC_BLOCK(1 bit) in the configurable parameter of the layer-1 information are equal to those described above.

Each PLP (or each GP-PLP) of the configurable parameter may include the following information.

A GP_PLP_ID (8 bits) indicates an identifier of each GP-PLP.

A GP_PLP_CR (3 bits) indicates a code rate of error correction coding of each GP-PLP.

A GP_PLP_MOD (4 bits) indicates a symbol mapping scheme of each GP-PLP.

A GP_PLP_FEC_BLOCK (1 bit) indicates an error correction coding mode of each GP-PLP and may indicate a normal mode or a short mode if the error correction code is, for example, an LDPC.

A PLP_RF_INDICATOR (6 bits) indicates RF channels to which the PLP (GP-PLP) is transmitted.

A GP_PLP_NUM_BLOCKS (8 bits) indicates the number of error correction coded blocks included in the PLP (or the GP-PLP).

The FRAME_IDX (8 bits), the NOTIFICATION (1 bit), the L2_SIZE (18 bits), the NOTIF_SIZE (18 bits), the PLP_NUM_BLOCKS(8 bits) and the PLP_START (20 bits) in the dynamic parameter of the layer-1 information are equal to those described above.

The dynamic parameter may include the following information.

A PLP_START_RF_ID (3 bits) indicates an identifier of a starting RF channel in the TFS signal frame with respect to the PLP. That is, the PLP_START_RF_ID (3 bits) indicates an identifier of the RF channel including a first sub PLP of the sub PLPs included in the PLP (or the GP_PLP) in the TFS signal frame.

A PLP_IDX (3 bits) indicates an index of a current sub-PLP and may describe a start point of the sub PLP in the super frame of the PLP.

Figure 68:
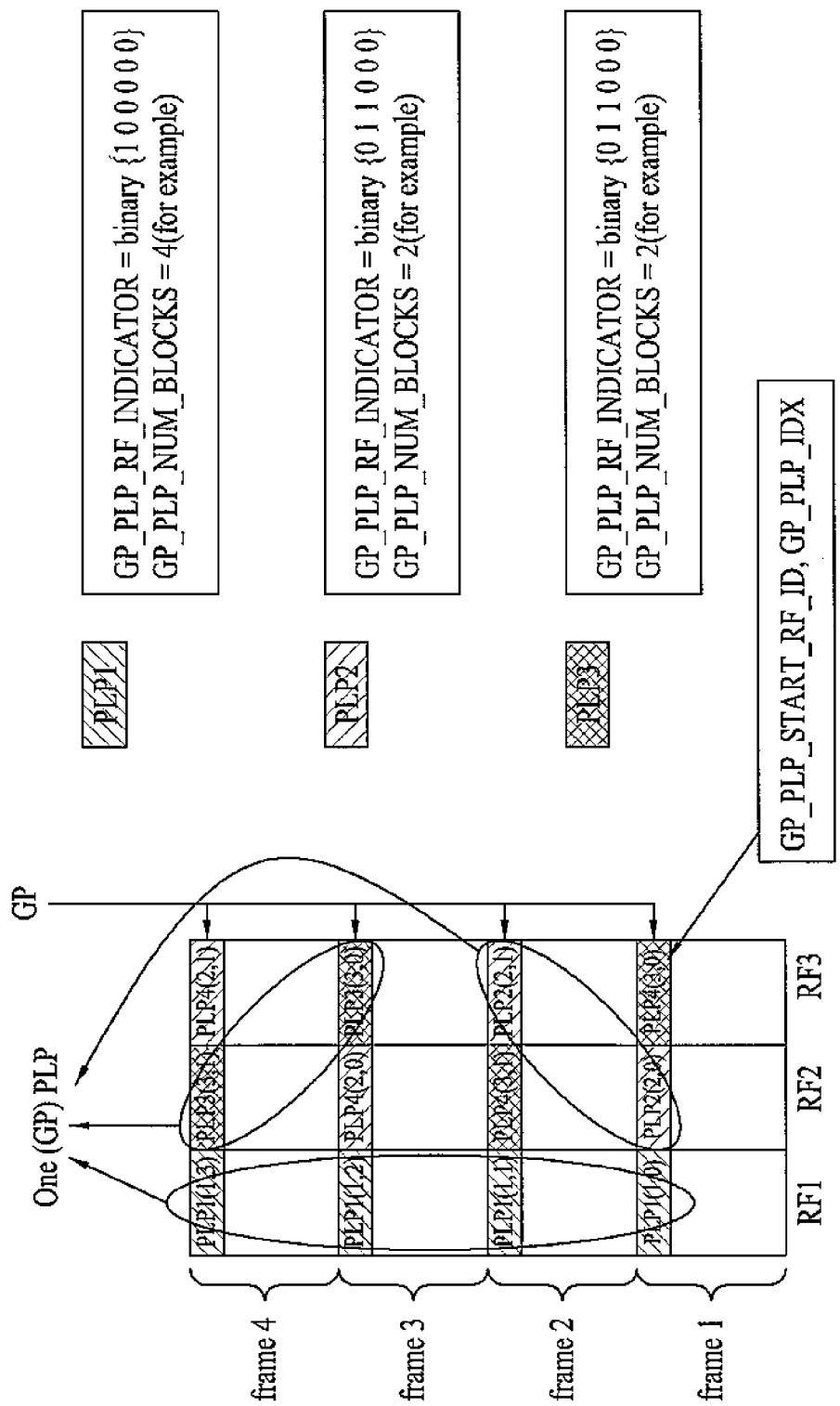
FIG. 68 is a view showing a super frame including a plurality of PLPs using scheduling information shown in FIG. 67.

FIG. 68 is a view showing a super frame including a plurality of PLPs using scheduling information shown in FIG. 67.

In this example, the super frame includes a signal frame 1, a signal frame 2, a signal frame 3 and a signal frame 4. Each of the signal frames are transmitted over three RF channels RF1, RF2 and RF3 and includes a plurality of PLPs. In a PLP X (A, B), X denotes the identifier of the PLP, A denotes the RF identifier (PLP_START_RF_ID) at which a first sub-PLP of the sub-PLPs included in the PLP is located, in a specific TFS signal frame, B denotes the identifier (PLP_IDX) of the sub-PLP included in the PLP.

For example, the RF1 channel includes PLP1(1,0), PLP1 (1,1), PLP1(1,2) and PLP1(1,3). That is, the starting sub-PLP of the sub-PLPs of the PLP1 is located at the RF1 (PLP_START_RF_ID) and the identifier of the sub-PLP included in the PLP1 is 0 to 4. It may be considered that the PLP1 in the signal frame is transmitted through the RF1 channel in the FF mode.

A PLP_RF_INDICATOR of the PLP1 is a binary {1 0 0 0 0 0}. Although the PLP_NUM_BLOCKS of the PLP1 indicating the number of error correction coded blocks included in the PLP1 is 4, it may be changed according to the embodiments.

A PLP_RF_INDICATOR of the PLP2 is a binary {0 1 1 0 0 0}. Although the PLP_NUM_BLOCKS of the PLP2 is 2, it may be changed according to the embodiments.

Since the PLP3 is transmitted to the RF3 and RF2, a PLP_RF_INDICATOR of the PLP3 is a binary {0 1 1 0 0 0}. Although the PLP_NUM_BLOCKS of the PLP3 is 2, it may be changed according to the embodiments.

If the RF channel identifier including a first sub-PLP of the sub-PLPs included in the PLP (or the GP-PLP) in the TFS signal frame in which the dynamic parameter of the layer-1 information is set like this embodiment, the signal receiving apparatus can efficiently and readily obtain the PLPs.

Similarly, the size of the time interleaving block or the size of the PLP (or the GP-PLP) may be computed by the values of the PLP_MOD (or the GP_PLP_MOD), the PLP_FEC_BLOCK (or GP_PLP_FEC_BLOCK) and the PLP_NUM_BLOCKS (or the GP_PLP_NUM_BLOCKS). If the RF channel identifier in which the PLP is started is used in a region in which the dynamic parameter of the layer-1 information is set like this embodiment, the signal receiving apparatus can efficiently and readily obtain the PLPs. If the RF_SHIFT and the PLP_START are used according to the sizes of the PLPs, the locations to which the PLPs are allocated can be continuously searched for from the signal frame.

Figure 69:
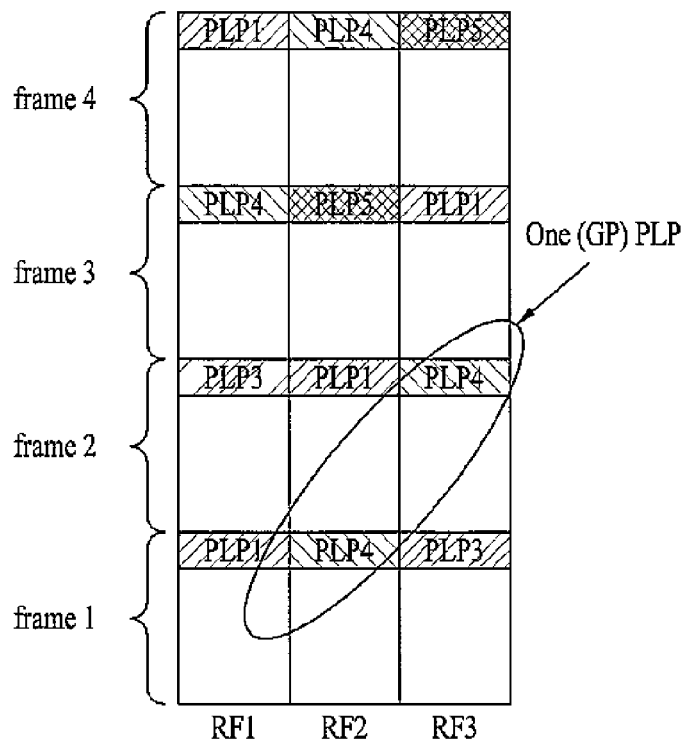
FIG. 69 is a view showing an example of obtaining PLPs according to the scheduling method.

FIG. 69 is a view showing an example of obtaining PLPs according to the scheduling methods. In this drawing, the super frame transmitted over three RF channels includes four signal frames and the PLPs divided in the signal frame are transmitted in the TFS mode. In this drawing, one PLP (PLP1) is transmitted over four signal frames and two PLPs (PLP2 and PLP3) are transmitted over to two signal frames. The PLP1 is transmitted to all the RF channels and two sub-PLPs are transmitted to the frame 1 and the frame 4 in the RF1. The PLP2 and PLP3 are transmitted over two RF channels of three RF channels. That is, the number of sub-PLPs included in each PLP (or the sub-PLPs of the GP-PLP) may be greater or less than the number of RFs.

As described in the above embodiment, if the layer-1 information includes the RF identifier (RF_ID) or the RF index which is currently received, in the TFS signal frame, it is possible to efficiently obtain the PLP using the layer-1 information.

As another embodiment, even when the configurable parameter applied to the super frame includes the RF channel identifier (PLP_START_RF_ID) of a first signal frame including the PLP in the super frame of the TFS structure, it is possible to efficiently obtain the PLP using the layer-1 information.

As another embodiment, even when the dynamic parameter applied to each signal frame includes the identifier (PLP_START_RF_ID) of the RF identifier at which the first sub-PLP is located in the TFS signal frame, it is possible to efficiently obtain the PLP using the layer-1 information.

Figure 70:
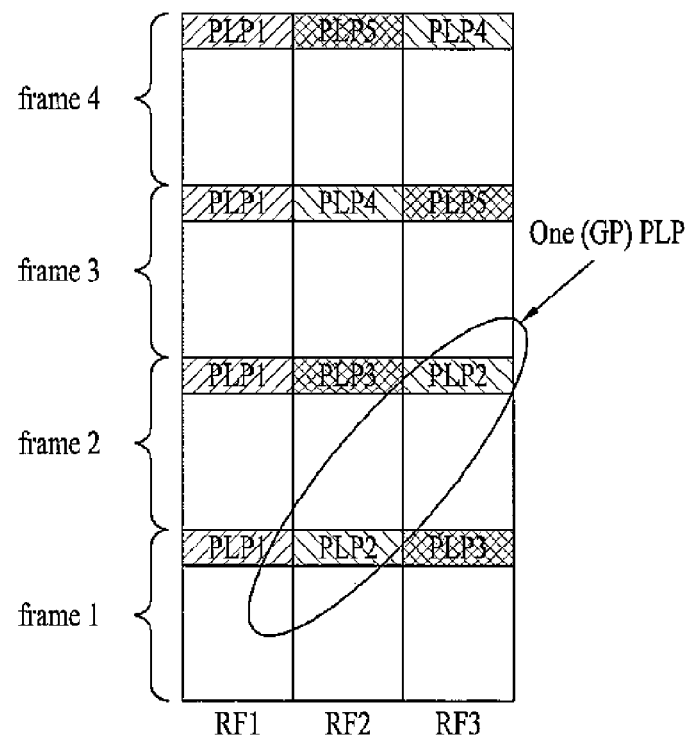
FIG. 70 is a view showing another example of obtaining PLPs according to the scheduling method.

FIG. 70 is a view showing another example of obtaining PLPs according to the scheduling method. In this drawing, a super frame transmitted over three RF channels includes four signal frames. In this drawing, one PLP (PLP1) is transmitted over four signal frames of one RF channel in the FF mode. Two PLPs (PLP1 and PLP3) are transmitted over two signal frames of two RF channel in the TFS mode. The PLP1 is transmitted to one RF channel RF1. The PLP2 and PLP3 are transmitted over two RF channels. That is, the number of sub-PLPs included in each PLP is greater or less than the number of RFs, and the FF mode and the TFS mode may be used together. That is, the PLP may be transmitted in at least one of the FF mode and the TFS mode.

As described in the above embodiment, if the layer-1 information includes the RF identifier (RF_ID) or the RF index which is currently received in the TFS signal frame, it is possible to efficiently obtain the PLP using the layer-1 information.

As another embodiment, even when the configurable parameter applied to the super frame includes the RF channel identifier (PLP_START_RF_ID) of a first signal frame including the PLP in the super frame of the TFS structure, it is possible to efficiently obtain the PLP using the layer-1 information.

As another embodiment, even when the dynamic parameter applied to each signal frame includes the identifier (PLP_START_RF_ID) of the RF at which the first sub-PLP is located in the TFS signal frame, it is possible to efficiently obtain the PLP using the layer-1 information.

FIG. 71 is a view showing another example of obtaining PLPs according to the scheduling method. In this example, a super frame transmitted over three RF channels includes eight signal frames. In order to represent sub-PLPs included in the PLP, X of the PLP X(A, B) denote the identifier of the PLP, A denotes the ID of the RF, at which the first sub-PLP is located, of the sub-PLPs included in the PLP, and B denotes the identifier (PLP_IDX) of the sub-PLP included in the PLP. As shown in this drawing, the PLPs include different numbers of sub-PLPs and are randomly distributed in a plurality of frames.

Even in this case, it is possible to efficiently obtain PLPs using the identifier (PLP_START_RF_ID) of the RF, at which the first sub-PLP is located in the TFS signal frame, in the dynamic parameter of the layer-1 information.

An example of obtaining several PLPs of the PLPs shown in the drawing will be described.

For example, in the PLP1, PLP1(1,0), PLP1(1,1), PLP1(1,2) and PLP1(1,3) may be identified using the identifier (PLP_START_RF_ID) of the RF at which the first sub-PLP is located in the TFS signal frame and the identifier (PLP_IDX) of the sub-PLP included in the PLP.

If the location of a second sub-PLP is searched for from a first sub-PLP belonging to the PLP, it is possible to search for the location, to which the PLP is allocated, from the signal frame using the RF_SHIFT and the PLP_START.

Accordingly, after the PLP1 (1,0) is obtained using the PLP_START_RF_ID and the PLP_START, the PLP1(1,1) can be obtained using the RF_SHIFT, the PLP_START and the PLP_IDX. Similarly, the PLP1(1,2) and the PLP(1,3) may be searched for using the layer-1 information. The value of the PLP_RF_INDICATOR of the PLP1 is {1 1 1 0 0 0}.

The PLP2(2,0) and the PLP2(2,1) included in the PLP2 can be searched for from the frame 1 of the RF2 and the frame 3 of the RF3 using the identifier (PLP_START_RF_ID) of the RF at which the first sub-PLP is located in the TFS signal frame and the identifier (PLP_IDX) of the sub-PLP included in the PLP. The value of the PLP_RF_INDICATOR of the PLP2 is {0 1 1 0 0 0}. Similarly, the PLP2(2,1) can be searched for from the PLP2(2,0) using the RF_SHIFT and the PLP_START.

The PLP3(1,0) and the PLP3(1,1) included in the PLP3 can be searched for from the frame 5 of the RF1 and the frame 6 of the RF2 using the identifier (PLP_START_RF_ID) of the RF at which the first sub-PLP is located and the identifier (PLP_IDX) of the sub-PLP included in the PLP. The value of the PLP_RF_INDICATOR of the PLP3 is {1 1 0 0 0 0}.

The embodiment of transmitting and receiving the layer-1 information will be described with reference to the above drawings.

The frame builder 130 of FIG. 4 inserts the first pilot signal and the second pilot signal including the layer-1 information, in which the scheduling information is set, into the preamble of the frame. Alternatively, the frame builder 133 of FIG. 7 receives the second pilot signal including the layer-1 information, in which the scheduling information is set, from the signaling information unit 135 and arranges the received second pilot signal in the preamble of the signal frame.

The layer-1 information may include the RF identifier (RF_ID) or the RF index in which the current sub-PLP is transmitted in the TFS frame. And, the layer-1 information may include the identifier (PLP_START_RF_ID) of the RF channel including the first sub-PLP of the PLPs in the configurable parameter applied to the super frame of the TFS structure. And, the layer-1 information may include the identifier (PLP_START_RF_ID) of the RF, at which the first sub_PLP is located in the TFS signal frame, in the dynamic parameter applied to each signal frame.

The configurable parameter may be changed in the unit of super frames and the dynamic parameter may be changed in the unit of a signal frame of the super frame.

If the frame builders 130 and 133 do not insert the second pilot signal, the pilot symbol inserters 450 and 455 of FIG. 48 may insert the first pilot signal and the second pilot signal including the layer-1 information into the preamble of the signal frame. The pilot symbol inserters 450 and 455 insert the first pilot signal and the second pilot signal in the time domain. At this time, the first pilot signal and the second pilot signal are equal to those described above.

If the signal frame including at least one RF channel is received (i.e. the signal frame transmitted over at least one RF channel is received), the signaling-information extractor 227 of the demodulator of FIG. 37 may obtain the layer-1 information from the second pilot signal included in the signal frame.

The layer-1 information may include the RF identifier (RF_ID) or the RF index in which the current PLP is transmitted. And, the layer-1 information may include the identifier (PLP_START_RF_ID) of the RF channel including the first sub-PLP of the PLP in the configurable parameter. And, the layer-1 information may include the identifier (PLP_START_RF_ID) of the RF, at which the first sub-PLP is located, in the dynamic parameter.

If the signaling-information extractor 227 of the signal receiving apparatus obtains the layer-1 information, the signaling-information extractor 227 of the signal receiving apparatus (or the controller (not shown) of the signal receiving apparatus) decodes the obtained layer-1 information and obtains the scheduling information of the PLP to be output.

The frame parser 240 may parse only a desired PLP from the signal frame using the decoded scheduling information and output the parsed PLP. The output PLP may be symbol-demapped and error-correction-decoded by the decoding demodulator 250. The output processor 260 may output the transport stream included in the error-correction-decoded PLP.

Accordingly, even when the signal frame uses the TFS mode, the FF mode or both the TFS mode and the FF mode, it is possible to readily schedule the PLPs included in the signal frame. Although the number of PLPs is not equal to the number of RF channels, it is possible to readily schedule and receive the PLPs.

FIG. 72 is a view showing another embodiment of a method of transmitting a signal.

A service stream for delivering a service is converted to a PLP (S401). For example, this process can be described as follow.

The service stream is encoded by an error correction encoding scheme An error correction coding scheme may be changed according to service streams.

The error-correction-coded service stream is interleaved and mapped to symbols of a PLP. Then, the service stream can be converted to the PLP to be arranged in at least one signal frame.

The PLP is arranged in at least one time-frequency slicing (TFS) signal frame, and the layer-1 information is inserted in the preamble of the TFS signal frame. The layer 1 information including the ID of the current RF channel (or the RF index) within the TFS frame in which the PLP is transmitted, may be inserted into the preamble of the signal frame (S405). That is, the ID of the used RF for the current sub-PLP (or the RF index) within the TFS frame is arranged in the layer-1 information. The preamble may include the first pilot signal and the second pilot signal. The first pilot signal includes the cyclic prefix and cyclic suffix, to which the useful portion is frequency-shifted, and the ID of the signal frame. The second pilot signal may include the layer-1 information, and the layer-1 information may include the current RF ID (RF_ID) within the TFS frame for the PLP.

The TFS signal frame is modulated by the OFDM scheme (S407).

The modulated signal is transmitted via at least one RF band signal (S409).

FIG. 73 is a view showing another embodiment of a method of receiving a signal.

The signal is received from a specific frequency band over which the TFS signal frame is transmitted (S411). The signal frame may be transmitted over at least one frequency band and the signal may be received from a specific frequency.

The layer-1 information including the ID (or the RF index) of the current RF channel over which a PLP is transmitted within the TFS frame, from the preamble of the TFS signal frame (S413). That is, the layer-1 information including the ID of the used RF for the current sub-PLP is obtained. The preamble may include the first pilot signal and the second pilot signal. The first pilot signal includes the frequency-shifted cyclic prefix and cyclic suffix, to which the valid portion is frequency-shifted, and the identification information of the signal frame. The second pilot signal may include the layer-1 information, and the layer-1 information may include the current RF ID (RF_ID).

The TFS signal frame is parsed using the layer-1 information and the PLP is obtained (S415).

If the current RF identifier (RF_ID) for the PLP is used and the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to readily obtain the PLPs.

The PLP can be converted to a service stream (S417). Then a service can be provided by decoding the service stream.

FIG. 74 is a view showing another embodiment of a method of transmitting a signal.

A service stream for delivering a service is converted to a PLP (S421). For example, the service stream is encoded by an error correction encoding scheme. An error correction coding scheme may be changed according to service streams.

The error-correction-coded service stream is interleaved and mapped to symbols of a PLP.

The PLP is arranged in at least one (TFS) signal frame ... and the layer-1 information including the RF channel identifier (PLP_START_RF_ID) of the first TFS signal frame including the PLP in the super frame of TFS structure (on which RF channel the PLP occurs in the first TFS signal frame in the super frame) may be inserted into the first parameter part, which is applied to the super frame, of the layer-1 information of the preamble of the signal frame (S425). That is, as the configurable parameter of the layer-1 information, the ID of RF channel including the first sub-PLP for the PLP in the super frame of the TFS structure is inserted. The preamble may include the first pilot signal and the second pilot signal. The first pilot signal includes the cyclic prefix and cyclic suffix, to which the useful portion is frequency-shifted, and the ID of the signal frame. The second pilot signal may include the layer-1 information, and the layer-1 information may include the ID of the starting RF channel of the IDs of the RF channels in the super frame of the TFS structure.

The TFS signal frame is modulated by the OFDM scheme (S427).

The modulated signal is transmitted via at least one RF band signal (S429).

Figure 75:
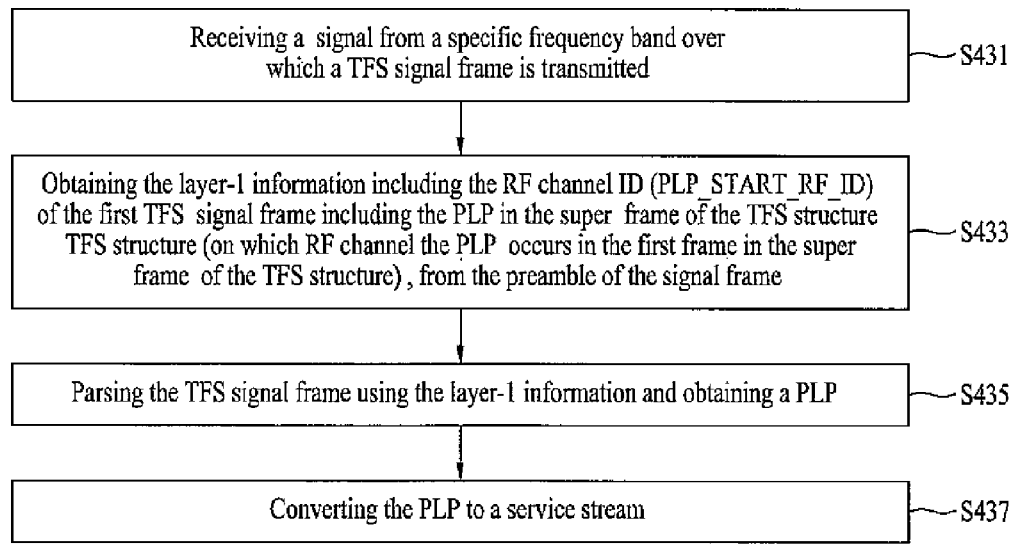
FIG. 75 is a view showing another embodiment of a method of receiving a signal.

FIG. 75 is a view showing another embodiment of a method of receiving a signal.

The signal is received from a specific frequency channel over which the TFS signal frame is transmitted (S431). The signal may be transmitted over at least one frequency band. The signal frame may be received from a specific frequency.

The RF channel ID (PLP_START_RF_ID) of the first TFS signal frame including the PLP in the super frame of the TFS structure (on which RF channel the PLP occurs in the first frame in the super frame of the TFS structure) is obtained from the first parameter part, which is applied to the super frame of the layer-1 information, set in the preamble of the TFS signal frame (S433). That is, the ID of RF channel including the first sub-PLP for the PLP is obtained from the layer-1 information. The preamble may include the first pilot signal and the second pilot signal. The first pilot signal includes the cyclic prefix and cyclic suffix of the useful portion, to which the useful portion is frequency-shifted, and the ID of the TFS signal frame. The second pilot signal may include the layer-1 information, and the layer-1 information may include the ID of the starting RF channel of the IDs of the RF channels.

The TFS signal frame is parsed using the layer-1 information and the PLP is obtained (S435).

If the RF identifier (PLP_START_RF_ID) of the first signal frame including the PLP in the super frame of the TFS structure is used and the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to readily obtain the PLPs.

The PLP can be converted to a service stream (S437).

Figure 76:
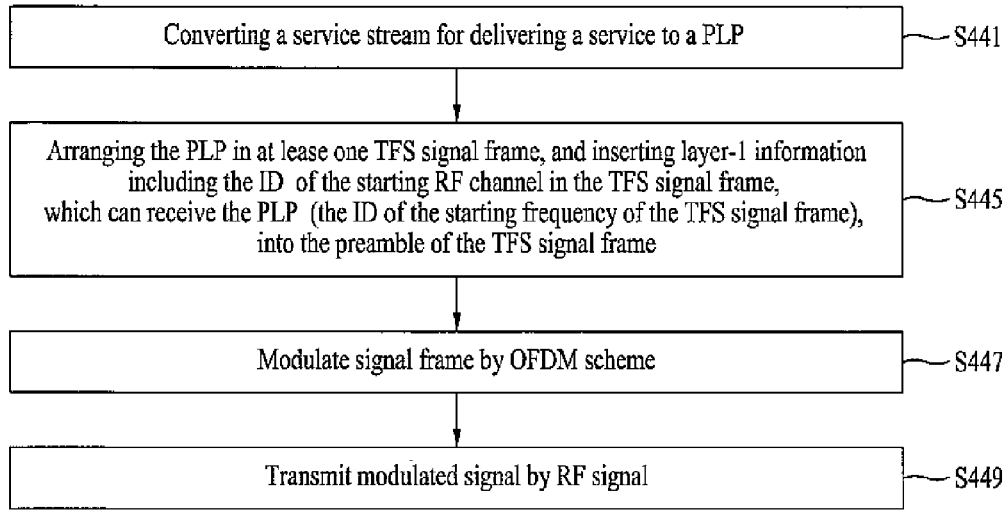
FIG. 76 is a view showing another embodiment of a method of transmitting a signal.

FIG. 76 is a view showing another embodiment of a method of transmitting a signal.

A service stream for delivering a service is converted to a PLP (S441). For example, the service stream is encoded by an error correction encoding scheme. An error correction coding scheme may be changed according to service streams.

The error-correction-coded service stream is interleaved and mapped to symbols of a PLP.

The PLP is arranged in at least one TFS signal frame, and the layer-1 information including the ID of the starting RF channel in the TFS signal frame, which can receive the PLP (the ID of the starting frequency of the TFS signal frame) may be inserted into the parameter part, which is applied to the signal frame of the layer-1 information, into the preamble of the TFS signal frame (S445). That is, as the dynamic parameter of the layer-1 information, the ID of RF channel including the first sub-PLP for the PLP in the TFS signal frame is inserted.

The preamble may include the first pilot signal and the second pilot signal. The first pilot signal includes the frequency-shifted cyclic prefix and cyclic suffix of the valid portion and the ID of the signal frame. The second pilot signal may include the layer-1 information, and the dynamic parameter, which may be changed according to the signal frames, of the layer-1 information may include the ID of the starting RF channel of the IDs of the RF channels and the ID of the PLP.

The TFS signal frame is modulated by the OFDM scheme (S447).

The modulated signal is transmitted via at least one RF band signal (S449).

Figure 77:
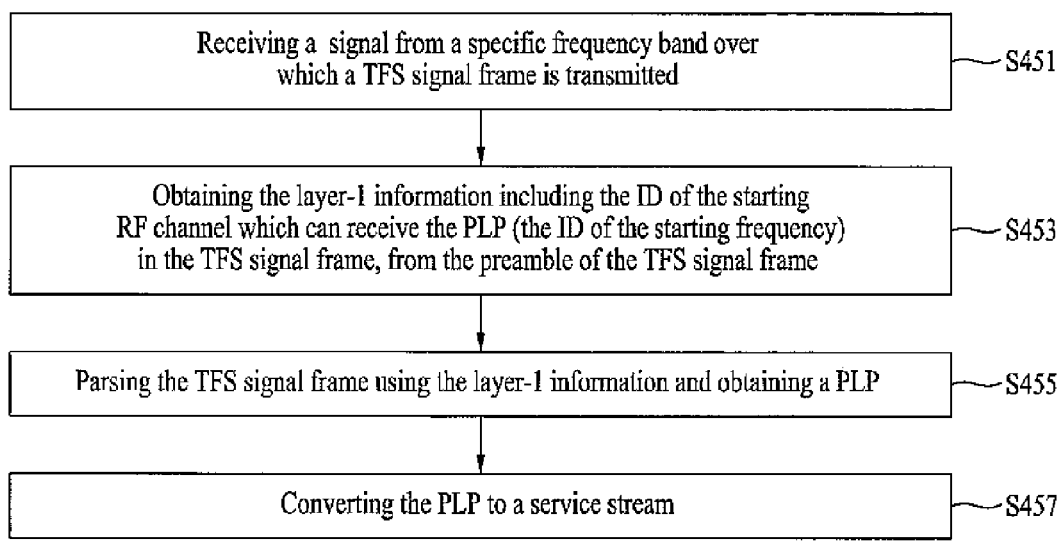
FIG. 77 is a view showing another embodiment of a method of receiving a signal.

FIG. 77 is a view showing another embodiment of a method of receiving a signal.

The signal is received from a specific frequency channel over which the TFS signal frame is transmitted (S451). The signal frame may be transmitted over at least one frequency band. The signal may be received from a specific frequency.

The ID of the starting RF channel which can receive the PLP (the ID of the starting frequency) in the TFS signal frame and the ID of the PLP are obtained from the parameter for the TFS signal frame of the layer-1 information set in the preamble of the TFS signal frame (S453). That is, the ID of the RF channel including the first sub-PLP for the PLP in the TFS signal frame is obtained from the dynamic parameter of the layer-1 information.

The preamble may include the first pilot signal and the second pilot signal. The first pilot signal includes the cyclic prefix and cyclic suffix of the valid portion, to which the useful portion is frequency-shifted, and the ID of the signal frame. The second pilot signal may include the layer-1 information, and the parameter which may be changed according to the signal frame in the layer-1 information may include the ID of the starting RF channel of the IDs of the RF channels in the TFS signal frame.

The TFS signal frame is parsed using the layer-1 information and the PLP is obtained (S455).

If the starting RF channel ID (PLP_START_RF_ID) including the PLP in the TFS signal frame is used and the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to readily obtain the PLPs.

The PLP can be converted to a service stream (S457).

Meanwhile, if at least two of the current RF ID (RF_ID) for the PLP in the TFS frame of the layer-1 information, the ID of the RF channel of the first signal frame including the PLP in the super frame of the TFS structure of the configurable parameter and the ID of the starting RF channel of the dynamic parameter in the TFS signal frame are used, it is possible to more readily obtain the PLPs. Accordingly, if at least two pieces of layer-1 information are used when the signal is transmitted, it is possible to efficiently schedule the PLPs of the signal frame and efficiently obtain the PLPs.

Figure 78:
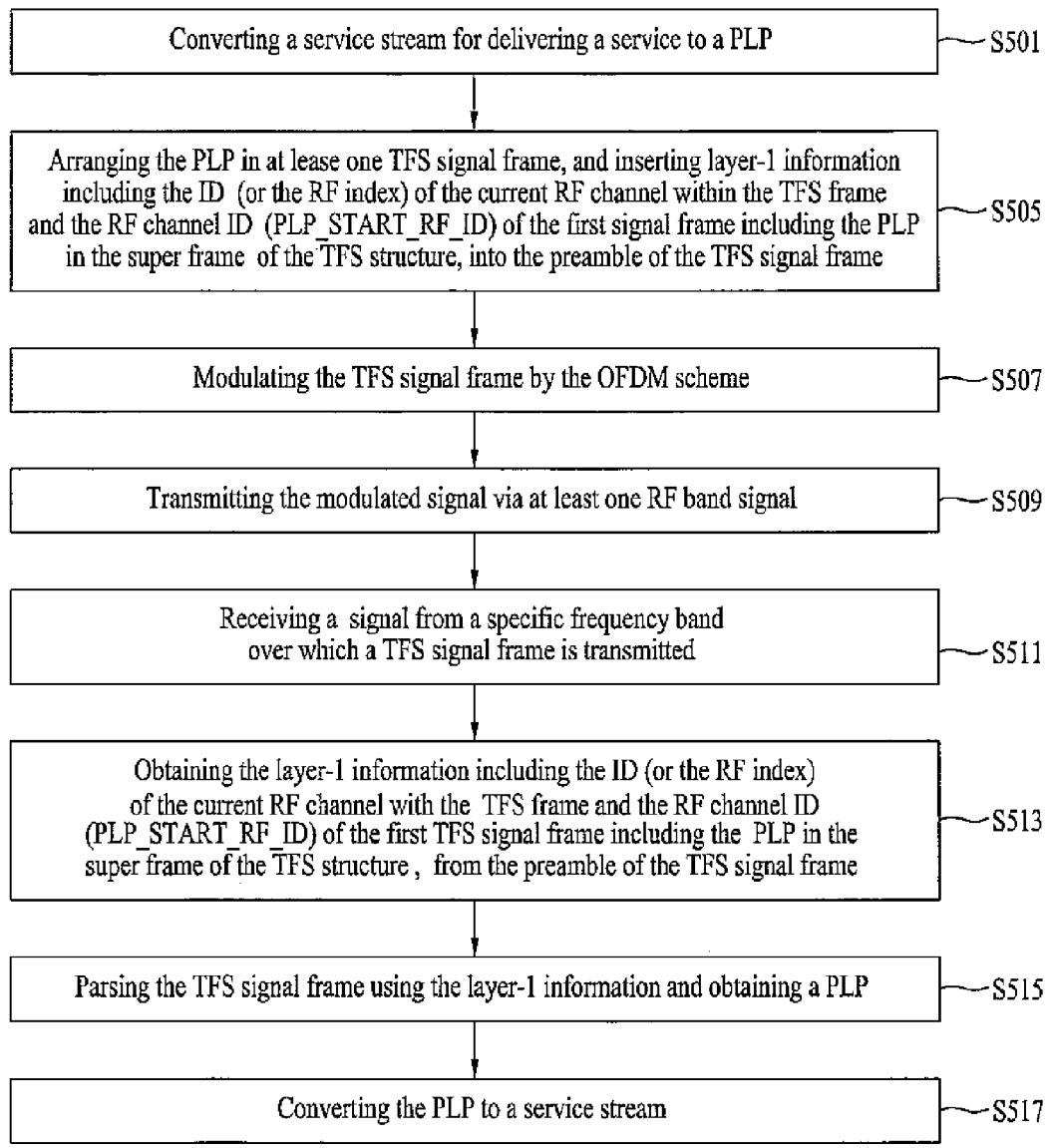
FIG. 78 is a view showing another embodiment of a method of transmitting and receiving a signal.

FIG. 78 is a view showing another embodiment of a method of transmitting and receiving a signal.

A service stream for delivering a service is converted to a PLP (S501). The service stream is encoded by an error correction encoding scheme.

The error-correction-coded service stream is interleaved and mapped to symbols, and the symbols of a PLP are output.

The PLP is arranged in at least one time-frequency slicing (TFS) signal frame, and the layer-1 information including the ID (or the RF index) of the current RF channel within the TFS frame and the RF channel ID (PLP_START_RF_ID) of the first signal frame including the PLP in the super frame of the TFS structure can be inserted into the preamble of the TFS signal frame (S505).

The TFS signal frame is modulated by the OFDM scheme (S507).

The modulated signal is transmitted via at least one RF band signal (S509).

When the signal is received, the signal is received from a specific frequency band over which the TFS signal frame is transmitted (S511).

The layer-1 information including the ID (or the RF index) of the current RF channel with the TFS frame and the RF channel ID (PLP_START_RF_ID) of the first TFS signal frame including the PLP in the super frame of the TFS structure the is obtained from the preamble of the TFS signal frame (S513).

The TFS signal frame is parsed using the layer-1 information and the PLP is obtained (S515).

If the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to identify the information corresponding to each PLP. If the current RF ID (RF_ID) with the TFS frame is used, the ID of the RF channel which is currently received can be obtained. If the RF channel ID (PLP_START_RF_ID) of the first signal frame including the PLP in the super frame is used, it is possible to obtain the RF ID of the first signal frame at which the PLP to be searched for is located in the super frame of the TFS structure. Accordingly, if the layer-1 information is used, it is possible to more readily search for the PLP.

The PLP can be converted to a service stream (S517). For example, the symbols of the PLP are demapped to bits, and the bits are decoded to a service stream by an error correction decoding scheme.

According to this embodiment, the receiver can check the current RF channel and identify and search for a desired PLP in the super frame using the RF channel.

Figure 79:
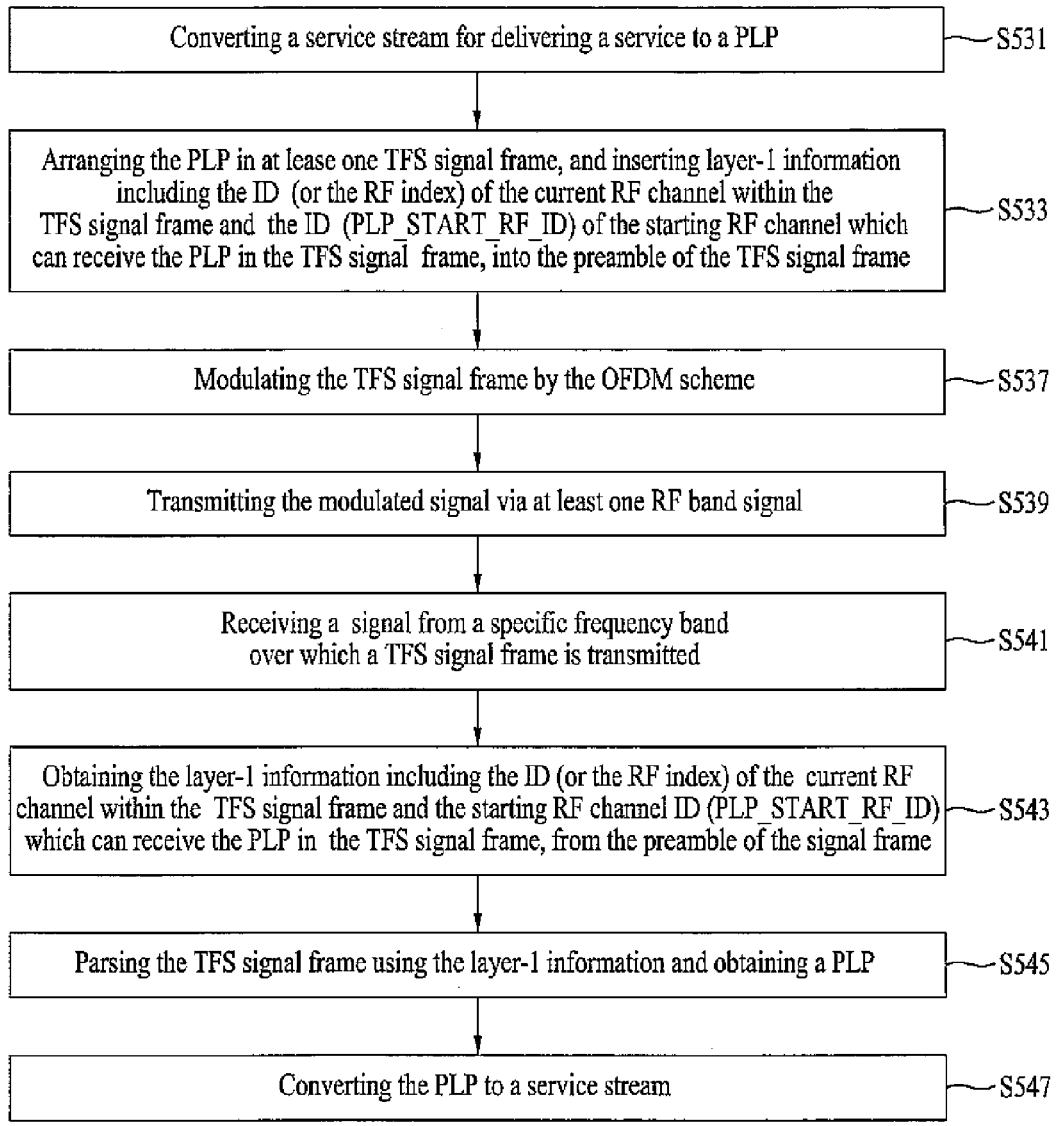
FIG. 79 is a view showing another embodiment of a method of transmitting and receiving a signal.

FIG. 79 is a view showing another embodiment of a method of transmitting and receiving a signal.

A service stream for delivering a service is converted to a PLP (S531). For example, the service stream is encoded by an error correction encoding scheme. An error correction coding scheme may be changed according to service streams.

The error-correction-coded service stream is interleaved and mapped to symbols of a PLP.

The error-correction-coded service stream is interleaved and mapped to symbols, and a PLP symbol stream is output.

The PLP is arranged in at least one TFS signal frame, and the layer-1 information including the ID (or the RF index) of the current RF channel within the TFS signal frame and the ID (PLP_START_RF_ID) of the starting RF channel which can receive the PLP in the TFS signal frame is inserted into the preamble of the TFS signal frame (S535).

The TFS signal frame is modulated by the OFDM scheme (S537).

The modulated signal is transmitted by at least one RF band signal (S539).

When the signal is received, the signal is received from a specific frequency band over which the TFS signal frame is transmitted (S541).

The layer-1 information including the ID (or the RF index) of the current RF channel within the TFS signal frame and the starting RF channel ID (PLP_START_RF_ID) which can receive the PLP in the TFS signal frame is obtained from the preamble of the signal frame (S543).

The TFS signal frame is parsed using the layer-1 information and the PLP is obtained (S545).

If the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to identify the information corresponding to each PLP. If the RF channel which is currently received is identified from the current RF ID (RF_ID) within the TFS signal frame and the ID of the starting RF channel which can receive the PLP in the TFS signal frame is used, it is possible to obtain the ID of the starting RF at which a PLP to be searched for is located in the signal frame. If the layer-1 information is used, it is possible to more readily search for the PLP. It is possible to continuously search for the PLP in the super frame or the signal frame using the RF_SHIFT and the PLP_START information of the layer-1 information.

The PLP can be converted to a service stream (S547).

According to this embodiment, the receiver can search check the current RF channel and identify and search for the channel for transmitting a PLP to be searched for in the signal frame.

Figure 80:
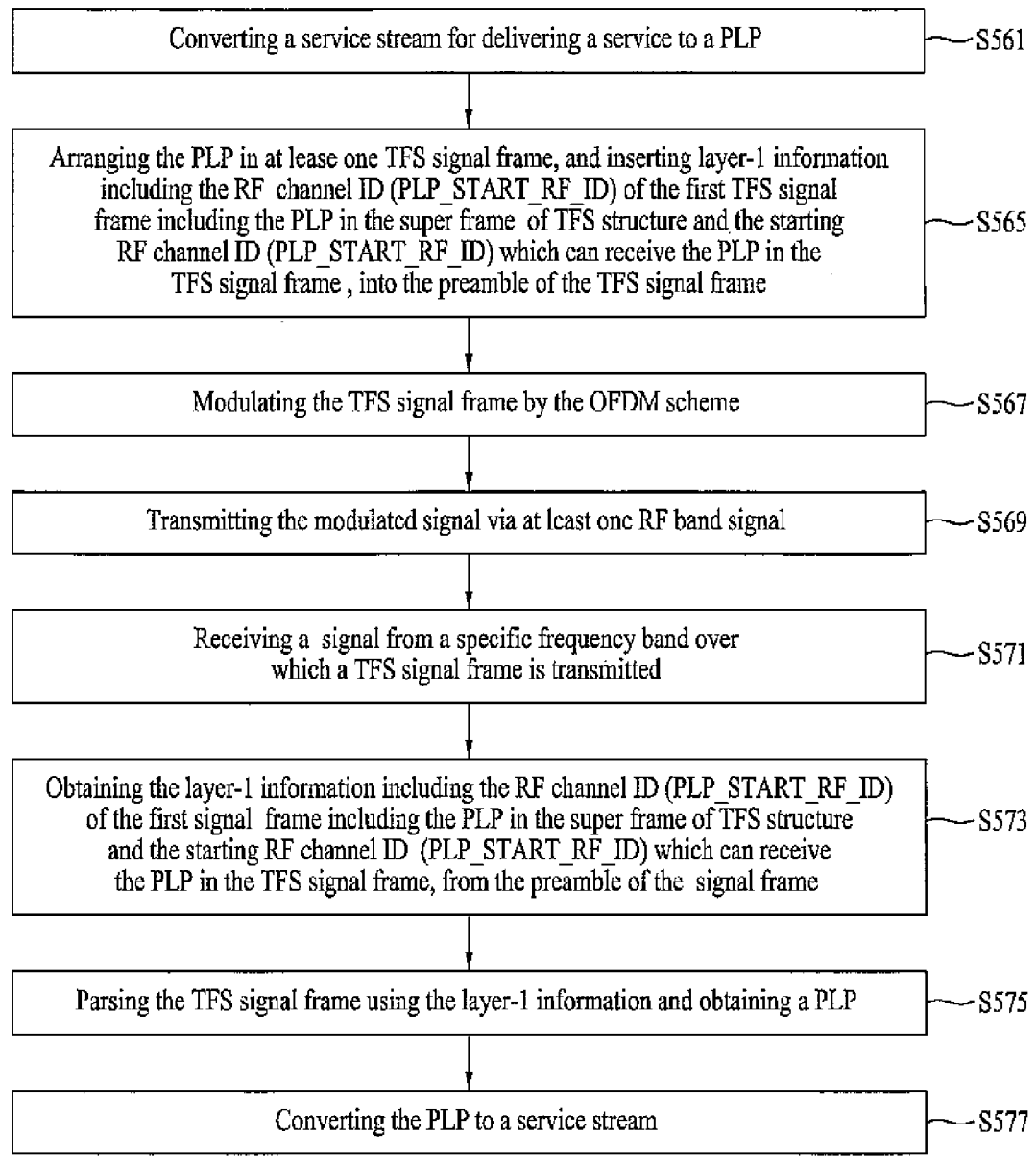
FIG. 80 is a view showing another embodiment of a method of transmitting and receiving a signal.

FIG. 80 is a view showing another embodiment of a method of transmitting and receiving a signal.

A service stream for delivering a service is converted to a PLP (S561). The service stream is encoded by an error correction encoding scheme.

The error-correction-coded service stream is interleaved and mapped to symbols, and a PLP symbol stream is output).

The PLP is arranged in at least one TFS signal frame, and the layer-1 information including the RF channel ID (PLP_START_RF_ID) of the first TFS signal frame including the PLP in the super frame of TFS structure and the starting RF channel ID (PLP_START_RF_ID) which can receive the PLP in the TFS signal frame is inserted into the preamble of the TFS signal frame (S565).

The TFS signal frame is modulated by the OFDM scheme (S567).

The modulated signal is transmitted via at least one RF band signal (S569).

When the signal is received, the signal is received from a specific frequency band included in the signal frame (S571).

The layer-1 information including the RF channel ID (PLP_START_RF_ID) of the first signal frame including the PLP in the super frame of TFS structure and the starting RF channel ID (PLP_START_RF_ID) which can receive the PLP in the TFS signal frame is obtained from the preamble of the signal frame (S573).

The TFS signal frame is parsed using the layer-1 information and PLP symbols are output (S575).

If the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to identify the information corresponding to each PLP. The RF ID of the first signal frame of the PLP to be searched for in the super frame is obtained from the RF channel ID (PLP_START_RF_ID) of the first signal frame including the PLP in the super frame of TFS structure. The ID of the starting RF at which the PLP to be searched for is located can be obtained using the ID of the starting RF channel which can receive the PLP in the TFS signal frame. Then, it is possible to accurately identify the RF channel in which the PLP is started and more readily search for the PLP. In addition, it is possible to continuously search for the PLP in the super frame or the signal frame using the RF_SHIFT and the PLP_START information of the layer-1 information.

The TFS signal frame is parsed using the layer-1 information and the PLP is obtained (S577).

The PLP can be converted to a service stream (S579).

According to this embodiment, the receiver can check the channel for transmitting the PLP to be searched for and identify and search for the RF channel in the signal frame at which the PLP is located.

Figure 81:
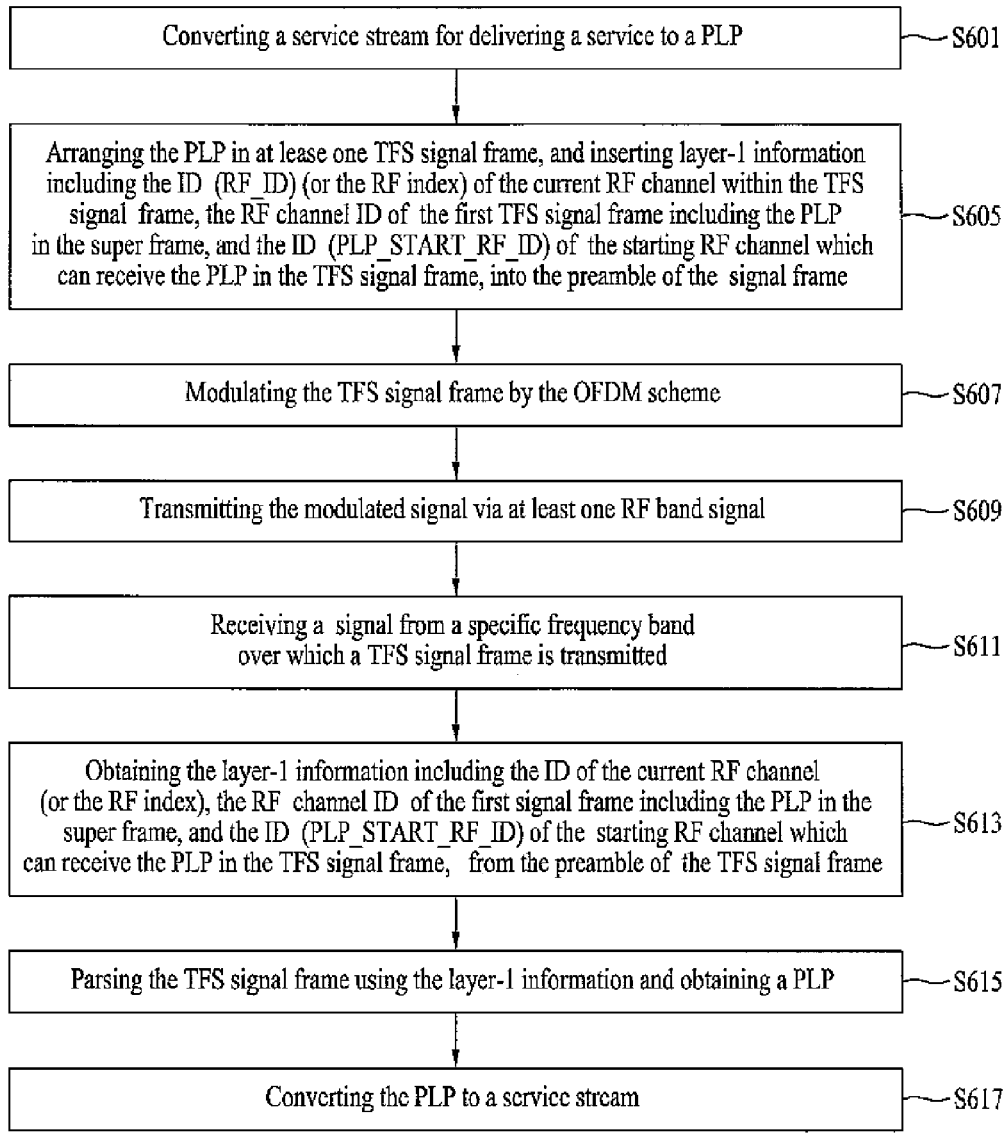
FIG. 81 is a view showing another embodiment of a method of transmitting and receiving a signal.

FIG. 81 is a view showing another embodiment of a method of transmitting and receiving a signal.

A service stream for delivering a service is converted to a PLP (S601). The service stream is encoded by an error correction encoding scheme.

The error-correction-coded transport stream is interleaved and mapped to symbols, and a PLP symbol stream is output (S603).

The PLP is arranged in at least one time-frequency slicing (TFS) signal frame, and the layer-1 information including the ID (RF_ID) (or the RF index) of the current RF channel within the TFS signal frame, the RF channel ID of the first TFS signal frame including the PLP in the super frame, and the ID (PLP_START_RF_ID) of the starting RF channel which can receive the PLP in the TFS signal frame, is inserted into the preamble of the signal frame (S605).

The signal frame is modulated by the OFDM scheme (S607).

The modulated signal is transmitted by at least one RF band signal (S609).

When the signal is received, the signal is received from a specific frequency band over which the TFS signal frame is transmitted (S611).

The layer-1 information including the ID of the current RF channel (or the RF index), the RF channel ID of the first signal frame including the PLP in the super frame, and the ID (PLP_START_RF_ID) of the starting RF channel which can receive the PLP in the TFS signal frame is obtained from the preamble of the TFS signal frame (S613).

The TFS signal frame is parsed using the layer-1 information and the PLP is obtained (S615).

If the layer-1 information such as the PLP_ID (PLP identifier), the PLP_CR (PLP coding rate), the PLP_MOD (PLP modulation), the PLP_NUM_BLOCKS (the number of error correction coded blocks included in the PLP) and the PLP_START (the start symbol address of the PLP) for each PLP is used, it is possible to identify the information corresponding to each PLP. The current RF channel is identified from the current RF ID. In addition, the RF ID of the first signal frame of the PLP to be searched for in the super frame is obtained from the RF channel ID (PLP_START_RF_ID) of the first signal frame including the PLP in the super frame. The ID of the starting RF at which the PLP to be searched for is located can be obtained using the ID of the starting RF channel which can receive the PLP in the signal frame. Then, it is possible to accurately identify the RF channel in which the PLP is started and more readily search for the PLP. In addition, it is possible to continuously search for the PLP in the super frame or the signal frame using the RF_SHIFT and the PLP_START information of the layer-1 information.

The PLP can be converted to a service stream (S617).

According to this embodiment, the receiver can check the current RF channel, check the RF channel, to which the PLP to be searched for is transmitted, in the super frame, and identify and search for the RF channel in the signal frame at which the PLP is located.

The example of transmitting and receiving the scheduling information of the PLP in order to readily obtain the PLP included in the signal frame is disclosed. Accordingly, even when the signal frame is in the TFS mode, the FF mode or a combination of the both modes, it is possible to readily search for the PLP. If the PLP is a PLP for providing a service or a GP-PLP, it is possible to efficiently search for the PLP using the layer-1 information.

Mode for the Invention

The embodiments of the invention are described in the best mode of the invention.

INDUSTRIAL APPLICABILITY

A method of transmitting/receiving a signal and an apparatus for transmitting/receiving a signal of the present invention can be used in broadcast and communication fields.

The invention claimed is:

1. A method of transmitting a signal, the method comprising:
converting a service stream for delivering a service to a physical layer pipe (PLP);
building a time-frequency slicing (TFS) signal frame comprising the PLP and layer-1 information;
modulating the TFS signal frame by an orthogonal frequency division multiplexing (OFDM) scheme in order to output a modulated signal; and
transmitting the modulated signal via at least one radio frequency (RF) band signal,
wherein the layer-1 information includes an identifier (ID) of a radio frequency (RF) channel that includes the PLP in a first ($1^{st}$) TFS signal frame of a super frame of a TFS structure, an ID of a starting RF channel of the TFS signal frame, and an index of a current RF channel within the TFS signal frame,
wherein the ID of the RF channel is included in a configurable part of the layer-1 information,
wherein the configurable part is changed in unit of the super frame,
wherein the TFS signal frame further comprises signal frame identification information that comprises a portion, a cyclic prefix obtained by frequency-shifting a first part of the portion, and a cyclic suffix obtained by frequency-shifting a second part of the portion, and
wherein the first part of the portion is a foremost part of the portion and the second part of the portion is a rearmost part of the portion.

2. A method of receiving a signal, the method comprising:
receiving the signal of a frequency band;
obtaining layer-1 information from a time-frequency slicing (TFS) signal frame of the received signal, the layer-1 information including an identifier (ID) of a radio frequency (RF) channel that includes a physical layer pipe (PLP) in a first ($1^{st}$) TFS signal frame of a super frame of a TFS structure, an ID of a starting RF channel of the TFS signal frame, and an index of a current RF channel within the TFS signal frame;
parsing the TFS signal frame using the layer-1 information;
obtaining the PLP; and
converting the PLP to a service stream,
wherein the ID of the RF channel is included in a configurable part of the layer-1 information,
wherein the configurable part is changed in unit of the super frame,
wherein the TFS signal frame includes signal frame identification information that comprises a portion, a cyclic prefix obtained by frequency-shifting a first part of the portion, and a cyclic suffix obtained by frequency-shifting a second part of the portion, and
wherein the first part of the portion is a foremost part of the portion and the second part of the portion is a rearmost part of the portion.

3. An apparatus for transmitting a signal, the apparatus comprising:
a coding and modulation unit with circuitry to encode a service stream for delivering a service by an error-correction-encoding scheme and interleave the encoded service stream;
a mapper with circuitry to map bits of the interleaved service stream to symbols of a physical layer pipe (PLP);
a frame builder with circuitry to build a time-frequency slicing (TFS) signal frame including:
the PLP; and
layer-1 information including an identifier ID of a radio frequency (RF) channel that includes the PLP in a first ($1^{st}$) TFS signal frame of a super frame of a TFS structure, an ID of a starting RF channel of the TFS signal frame, and an index of a current RF channel within the TFS signal frame;
a modulator with circuitry to modulate the TFS signal frame by an orthogonal frequency division multiplexing (OFDM) scheme and output a modulated signal; and
a transmitter to transmit the modulated signal via at least one RF signal,
wherein the ID of the RF channel is included in a configurable part of the layer-1 information,
wherein the configurable part is changed in unit of the super frame,
wherein the TFS signal frame includes signal frame identification information that comprises a portion, a cyclic prefix obtained by frequency-shifting a first part of the portion, and a cyclic suffix obtained by frequency-shifting a second part of the portion, and
wherein the first part of the portion is a foremost part of the portion and the second part of the portion is a rearmost part of the portion.

4. An apparatus for receiving a signal, the apparatus comprising:
a receiver with circuitry to receive the signal of a frequency band;
a demodulator with circuitry to obtain layer-1 information from a time-frequency slicing (TFS) signal frame of the received signal, the layer-1 information including an identifier ID of a radio frequency (RF) channel that includes a physical layer pipe (PLP) in a first ($1^{st}$) TFS signal frame of a super frame of a TFS structure, an ID of a starting RF channel of the TFS signal frame, and an index of a current RF channel within the TFS signal frame;
a frame parser with circuitry to:
parse the TFS signal frame using the layer-1 information; and
obtain the PLP;
a symbol-demapper with circuitry to symbol-demap symbols of the PLP to bits of a service stream; and
a decoding demodulator with circuitry configured to:
deinterleave the bits of the service stream; and
decode the deinterleaved bits of the service stream by an error-correction decoding scheme,
wherein the ID of the RF channel is included in a configurable part of the layer-1 information, wherein the configurable part is changed in unit of the super frame, wherein the TFS signal frame includes signal frame identification information that comprises a portion, a cyclic prefix obtained by frequency-shifting a first part of the portion, and a cyclic suffix obtained by frequency-shifting a second part of the portion, and wherein the first part of the portion is a foremost part of the portion and the second part of the portion is a rearmost part of the portion.

* * * * *